(12) United States Patent
Nakagawa et al.

(10) Patent No.: US 7,382,067 B2
(45) Date of Patent: Jun. 3, 2008

(54) LINEAR ACTUATOR

(75) Inventors: Hiroshi Nakagawa, Ise (JP);
Kazumichi Kato, Watarai-gun (JP);
Toshio Miki, Ise (JP); Minoru Maeda, Taki-gun (JP); Takashi Fukunaga, Ise (JP); Kozo Furutani, Ise (JP); Toshiya Sugimoto, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 408 days.

(21) Appl. No.: 10/497,678

(22) PCT Filed: Nov. 26, 2002

(86) PCT No.: PCT/JP02/12320

§ 371 (c)(1),
(2), (4) Date: Nov. 3, 2004

(87) PCT Pub. No.: WO03/049263

PCT Pub. Date: Jun. 12, 2003

(65) Prior Publication Data

US 2005/0057101 A1    Mar. 17, 2005

(30) Foreign Application Priority Data

| Dec. 3, 2001 | (JP) | ............................. 2001-369378 |
| Dec. 17, 2001 | (JP) | ............................. 2001-383756 |
| Feb. 8, 2002 | (JP) | ............................. 2002-033064 |
| Feb. 8, 2002 | (JP) | ............................. 2002-033067 |
| Feb. 8, 2002 | (JP) | ............................. 2002-033068 |
| May 20, 2002 | (JP) | ............................. 2002-143954 |
| May 20, 2002 | (JP) | ............................. 2002-143955 |

(51) Int. Cl.
*H02K 33/16* (2006.01)
*H02K 33/00* (2006.01)
*F04B 17/04* (2006.01)

(52) U.S. Cl. ............................. 310/15; 310/17; 417/416
(58) Field of Classification Search ................. 310/15, 310/17
See application file for complete search history.

(56) References Cited

U.S. PATENT DOCUMENTS

| 3,461,806 A | | 8/1969 | Barthalon | |
| 3,864,808 A | * | 2/1975 | Doser | ............................. 419/48 |
| 4,761,960 A | * | 8/1988 | Higham et al. | .................. 62/6 |
| 5,654,596 A | * | 8/1997 | Nasar et al. | .................. 310/12 |

FOREIGN PATENT DOCUMENTS

| CN | 1215243 | | 4/1999 |
| DE | 19855750 A 1 | * | 6/2000 |
| JP | 45-8140 | | 3/1970 |
| JP | 57-52787 | | 3/1982 |
| JP | 61-106058 | | 5/1986 |
| JP | 0 319 096 A2 | | 11/1988 |
| JP | 64-044008 | | 2/1989 |
| JP | 1-194854 A | | 8/1989 |
| JP | 1-298945 A | | 12/1989 |
| JP | 05-036520 | | 2/1993 |
| JP | 2647973 B2 | | 8/1997 |
| JP | 09-261937 | | 10/1997 |
| JP | 2782830 B2 | | 8/1998 |
| JP | 11-98810 A | | 4/1999 |
| JP | 11-98813 A | | 4/1999 |
| JP | 11-187638 A | | 7/1999 |
| JP | 11-341778 | * | 10/1999 |
| JP | 2000-83364 A | | 3/2000 |
| JP | 2000-166209 A | | 6/2000 |
| JP | 2000-253640 | | 9/2000 |
| JP | 2001-28871 A | | 1/2001 |
| JP | 2001-078417 A | | 3/2001 |
| JP | 2001-286120 A | | 10/2001 |
| JP | 2001-286122 A | | 10/2001 |
| JP | 3216865 B2 | | 10/2001 |

OTHER PUBLICATIONS

Translation of Abe et al. (JP 2000-083364) Mar. 21, 2000.*
EPO Search Report, Application No. PCT/JP0212320, Jul. 31, 2007.*
Patent Abstracts of Japan for JP11-98810 published on Apr. 9, 1999.
Patent Abstracts of Japan for JP2647973 published on Aug. 27, 1997.

Patent Abstracts of Japan for JP2000-83364 published on Mar. 21, 2000.
Patent Abstracts of Japan for JP2000-166209 published on Jun. 16, 2000.
Patent Abstracts of Japan for JP11-98813 published on Apr. 9, 1999.
Patent Abstracts of Japan for JP2001-286120 published on Oct. 12, 2001.
Patent Abstracts of Japan for JP3216865 published on Oct. 9, 2001.
Patent Abstracts of Japan for JP11-187638 published on Jul. 9, 1999.
Patent Abstracts of Japan for JP1-194854 published on Aug. 4, 1989.
Patent Abstracts of Japan for JP2782830 published on Aug. 6, 1998.
Patent Abstract of Japan for JP1-298945 published on Dec. 1, 1989.
Patent Abstracts of Japan for JP2001-286122 published on Oct. 12, 2001.
Patent Abstracts of Japan for JP2001-28871 published on Jan. 30, 2001.

* cited by examiner

*Primary Examiner*—Burton Mullins
(74) *Attorney, Agent, or Firm*—Darby & Darby PC

(57) ABSTRACT

An object of the present invention is to provide a linear actuator in which reliability is improved, and performance is also easily improved. The present invention provides a linear actuator including a stator, a movable element having an iron member, and being reciprocatable with respect to the stator, a permanent magnet fixed to the stator so as to be opposed to the iron member, and a coil fixed to the stator. Because both the coil and the permanent magnet are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element. The permanent magnets may be a pair in which the directions the magnetic poles thereof differ from each other, and two pairs of permanent magnets may be provided. The number of magnetic fluxes that run through the magnetic pole elements and the iron member can be increased by providing a magnetic reluctance section around the permanent magnets.

10 Claims, 55 Drawing Sheets

LINEAR ACTUATOR

CROSS-REFERENCE TO PRIOR APPLICATION

This is a U.S. national phase application under 35 U.S.C. §371 of International Patent Application No. PCT/JP02/12320 filed Nov. 26, 2002, and claims the benefit of Japanese Patent Application Nos. 2001-369378 filed Dec. 3, 2001; 2001-383756 filed Dec. 17, 2001; 2002-33064 filed Feb. 8, 2002; 2002-33067 filed Feb. 8, 2002; 2002-33068 filed Feb. 8, 2002; 2002-143954 filed May 20, 2002 and 2002-143955 filed May 20, 2002 which are incorporated by reference herein. The International Application was published in Japanese on Jun. 12, 2003 as WO 03/049263 A1 under PCT Article 21(2).

TECHNICAL FIELD

The present invention relates to a linear actuator, and in particular, relates to improvements in reliability and performance of a linear actuator.

BACKGROUND ART

Because linear actuators can be driven with little loss by employing a spring therein for utilizing a resonance phenomenon, they have been used as compressor motors. Because the compressors employing such linear motors exhibit excellent performance such as high efficiency, it is expected that such compressors will be used for refrigerators, freezers, and air conditioners.

As a linear actuator, a voice coil motor is known. In the voice coil motor, electrical current is made to flow through a coil within a magnetic field formed by permanent magnets so that a force to drive the voice coil motor is applied to the coil. Such a voice coil motor is referred to as a movable coil type in which a movable element including a coil is moved.

Another type of linear actuator is also known, in which the permanent magnets and the coil are switched with each other in contrast to the above-mentioned movable coil type, and which is referred to as a movable magnet type in which a movable element including a permanent magnet is moved.

In the linear actuator of movable coil type, a problem is encountered in that reliability is inferior because the movable element includes a coil, electrical current must be supplied to the movable element, and feeder lines may be cut due to the movement of the movable element.

In addition, in the linear actuator of movable magnet type, a problem is encountered in that it is difficult to improve performance because the weight of the permanent magnet is increased when high magnetic flux density is to be obtained, and the weight of the movable element is increased.

DISCLOSURE OF THE INVENTION

Accordingly, an object of the present invention is to provide a linear actuator in which reliability is improved, and performance is also easily improved.

In order to achieve the above object, a first aspect of the present invention provides a linear actuator including: a stator; a movable element having an iron member, and being reciprocatable with respect to the stator; a permanent magnet fixed to the stator so as to be opposed to the iron member; and a coil fixed to the stator.

Accordingly, the iron member is fixed to the movable element, the permanent magnet fixed to the stator so as to be opposed to the iron member, the coil fixed to the stator, and the iron member, i.e., the movable element is reciprocated by moving magnetic fluxes running through the iron member using the coil fixed to the stator, in which the direction of current is alternated, and the permanent magnet. Because both the coil and the permanent magnet are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element.

In the above linear actuator, the permanent magnet may be fixed to the stator in such a manner that magnetic poles thereof are arranged side be side in a direction of reciprocation, and a pair of magnetic pole elements is provided at both sides of the permanent magnet in the direction of reciprocation.

Accordingly, when the direction of electrical current flowing through the coil fixed to the stator is alternated, the entry of the magnetic fluxes into the iron member is alternated by the outer magnetic poles which are disposed at both sides of the permanent magnet in which the magnetic poles are arranged side by side in the direction of reciprocation of the movable element, and as a result, the iron member, i.e., the movable element reciprocates.

In the above linear actuator, a set of the permanent magnet and the pair of magnetic pole elements may be disposed at only one side of the iron member.

Because the set of permanent magnet and pair of magnetic pole elements is disposed at only one side of the iron member, the overall weight can be reduced.

In the above linear actuator, the iron member may have a cylindrical shape, and a set of the permanent magnet and the pair of magnetic pole elements may be disposed only radially outside the iron member.

Because the set of permanent magnet and pair of magnetic pole elements is disposed only radially outside the iron member, the radius of the iron member, i.e., the radius of the movable element, can be reduced, and, in particular, the weight of the movable element can be reduced.

In the above linear actuator, the iron member may have a cylindrical shape, and a set of the permanent magnet and the pair of magnetic pole elements may be disposed only radially inside the iron member.

Because the set of permanent magnet and pair of magnetic pole elements is disposed only radially inside the iron member, the radiuses of the permanent magnet and the pair of magnetic poles can be reduced, and the weights thereof are also reduced, and thus the overall weight can be reduced.

In the above linear actuator, two sets of the permanent magnet and the pair of magnetic pole elements may be disposed at both sides of the iron member.

Because two sets of the permanent magnet and the pair of magnetic pole elements are disposed at both sides of the iron member, a stronger magnetic field due to the permanent magnets and a greater magnetomotive force due to electrical current can be obtained.

In the above linear actuator, a magnetic pole element, which is opposed to the iron member and is disposed at a position opposite to the permanent magnet, may be integrally formed in the stator.

Because the magnetic pole element, which is opposed to the iron member and is disposed at a position opposite to the permanent magnet, is integrally formed in the stator, a connecting operation after forming separately doe not have to be performed.

In the above linear actuator, the movable element may be formed using a synthetic resin insert formation method in which the iron member is used as an insert.

Because the movable element is formed using a synthetic resin insert formation method in which the iron member is used as an insert, the movable element including the iron member can be easily manufactured and can be made light.

In the above linear actuator, the movable element may be supported on the stator using a bushing.

Because the movable element is supported on the stator using a bushing, the movable element reciprocates accurately.

In the above linear actuator, plural permanent magnets arranged in the direction of reciprocation may be fixed to the stator, and plural iron members arranged in the direction of reciprocation may be fixed to the movable element.

Because plural permanent magnets arranged in the direction of reciprocation are fixed to the stator, and plural iron members arranged in the direction of reciprocation are fixed to the movable element, a greater thrust can be applied to the movable element.

In the above linear actuator, the stator may include a sintered element.

Because the stator consists of a sintered element, cost can be reduced, performance can be improved (iron loss can be reduced), and mechanical strength can be increased.

In order to achieve the above object, a second aspect of the present invention provides a linear actuator including: a stator; a movable element having an iron member, and being reciprocatable with respect to the stator; a pair of permanent magnets fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other; and a coil fixed to the stator.

Accordingly, because the iron member is fixed to the movable element, the coil is fixed to the stator, and the pair of permanent magnets fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other, when the direction of the electrical current flowing through the coil fixed to the stator is alternated, magnetic fluxes run through the pair of permanent magnets alternatingly, and as a result, the iron member, i.e., the movable element reciprocates. Because both the coil and the permanent magnets are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element.

In the above linear actuator, the pair of permanent magnets may be disposed at only one side of the iron member.

Because the pair of permanent magnets is disposed at only one side of the iron member, the overall weight can be reduced.

In the above linear actuator, a magnetic pole element, which is opposed to the iron member and is disposed at a position opposite to the permanent magnets, may be integrally formed in the stator.

Because the magnetic pole element, which is opposed to the iron member and is disposed at a position opposite to the permanent magnets, is integrally formed in the stator, a connecting operation after forming separately doe not have to be performed.

In the above linear actuator, the pair of permanent magnets may be disposed at both sides of the iron member.

Because the pair of permanent magnets is disposed at both sides of the iron member, a stronger magnetic field due to the permanent magnets and a greater magnetomotive force due to electrical current can be obtained.

In the above linear actuator, the iron member may have a cylindrical shape, and the coil may be disposed radially outside the iron member.

Because the coil is disposed radially outside the iron member, the radius of the iron member, i.e., the radius of the movable element, can be reduced, and, in particular, the weight of the movable element can be reduced.

In the above linear actuator, the iron member may have a cylindrical shape, and the coil may be disposed radially inside the iron member.

Because the coil is disposed radially inside the iron member, the weight of the coil can be reduced, and thus the overall weight can be reduced.

In the above linear actuator, the movable element may be formed using a synthetic resin insert formation method in which the iron member is used as an insert.

Because the movable element is formed using a synthetic resin insert formation method in which the iron member is used as an insert, the movable element including the iron member can be easily manufactured and can be made light.

In the above linear actuator, the movable element may be supported on the stator using a bushing.

Because the movable element is supported on the stator using a bushing, the movable element reciprocates accurately.

In the above linear actuator, plural sets of the pair of permanent magnets arranged in the direction of reciprocation may be fixed to the stator, and plural iron members arranged in the direction of reciprocation may be fixed to the movable element.

Because plural sets of the pair of permanent magnets arranged in the direction of reciprocation are fixed to the stator, and plural iron members arranged in the direction of reciprocation are fixed to the movable element, a greater thrust can be applied to the movable element.

In the above linear actuator, the stator may include a sintered element.

Because the stator consists of a sintered element, cost can be reduced, performance can be improved (iron loss can be reduced), and mechanical strength can be increased.

In order to achieve the above object, a third aspect of the present invention provides a linear actuator including: a stator; a movable element having an iron member at at least a portion thereof, and being reciprocatable with respect to the stator; a first pair of permanent magnets fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other; a second pair of permanent magnets fixed to the stator in such a manner that a position thereof in the direction of reciprocation coincides with the first pair of permanent magnets, the permanent magnets are arranged side by side in the direction of reciprocation while being opposed to the iron member, magnetic poles thereof are arranged in a direction perpendicular to the direction of reciprocation, and orientations of the magnetic poles thereof differ from each other; and a coil fixed to the stator, wherein the magnetic pole, which faces the iron member, of one of the first pair of permanent magnets and the magnetic pole, which faces the iron member, of one of the second pair of permanent magnets that is disposed at the same position in the direction of reciprocation as the one of the first pair of permanent magnets differ from each other.

Accordingly, when electrical current flows through the coil fixed to the stator in a direction, for example, magnetic flux loops, which run through the stator, one of the first pair of permanent magnets, the iron member, one of the second pair of permanent magnets that is disposed at the same position, in the direction of reciprocation, as the one of the first pair of permanent magnets, and the stator, are formed, and when the direction of electrical current flowing through the coil fixed to the stator is switched to the opposite direction, magnetic flux loops, which run through the stator, the other of the second pair of permanent magnets, the iron member, the other of the first pair of permanent magnets, and the stator, are formed. Accordingly, when the direction of electrical current flowing through the coil fixed to the stator is alternated, the entries of the magnetic fluxes into the iron member are alternated in the direction of reciprocation in the first pair of permanent magnets fixed to the stator and the second pair of permanent magnets fixed to the stator, and as a result, the iron member, i.e., the movable element reciprocates. Because both the coil and the permanent magnets are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element. In addition, because the movable element is reciprocated using the above-mentioned magnetic flux loops, a portion of the stator as a back yoke does not have to be disposed at a position opposite to the movable element with respect to the permanent magnets.

In the above linear actuator, plural sets of the first pair of permanent magnets and the second pair of permanent magnets may be provided so that positions thereof in the direction of reciprocation coincide with each other.

Because plural sets of the first pair of permanent magnets and the second pair of permanent magnets are provided so that positions thereof in the direction of reciprocation coincide with each other, a stronger magnetic field due to the permanent magnets and a greater magnetomotive force due to electrical current can be obtained.

In the above linear actuator, plural sets of the first pair of permanent magnets and the second pair of permanent magnets may be arranged side by side in the direction of reciprocation, and the iron member includes plural projecting portions which project toward the permanent magnets, and which may be arranged side by side in the direction of reciprocation.

Because plural sets of the first pair of permanent magnets and the second pair of permanent magnets are arranged side by side in the direction of reciprocation, and the iron member includes plural projecting portions which project toward the permanent magnets, and which are arranged side by side in the direction of reciprocation, the thrust force can be increased in proportion with the number of teeth even though the stroke is reduced.

In the above linear actuator, at least one of the stator and the movable element may be made of stacked steel sheets which are stacked in the direction of reciprocation.

Because at least one of the stator and the movable element is made of stacked steel sheets which are stacked in the direction of reciprocation, eddy current loss can be reduced when compared with the case in which the stator and the movable element are made of a solid material by machining, and hysteresis loss can be reduced when compared with the case in which the stator and the movable element are made of a sintering material or compacted iron powder. In addition, in particular, when a large stator is to be formed, it is easier to manufactures the same when compared with the case in which the stator and the movable element are made of a solid material or a sintering material.

In the above linear actuator, the stator may include windows at positions near the movable element, and the first pair of permanent magnets and the second pair of permanent magnets may be accommodated in the windows. It is more preferable that the size of the windows be determined such that each of the permanent magnets can be fixed thereto just by insertion.

When such a structure is employed, because the permanent magnets are mechanically restrained in the windows in contrast to the case in which the permanent magnets are fixed to the surface of the stator using adhesive, reliability regarding retention of the permanent magnets is improved. Moreover, because the size of the gaps between the stator and the movable element is not affected by positional variation of the permanent magnets due to thickness variation of adhesive, accuracy of the gaps is improved. Furthermore, even when foreign particles are jammed in the gaps, the permanent magnets will not be broken.

In order to achieve the above object, a fourth aspect of the present invention provides a linear actuator including: a stator; a movable element having an iron member at at least a portion thereof, and being reciprocatable with respect to the stator; at least one first pair of permanent magnets fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other; at least one second pair of permanent magnets disposed adjacent to the first pair of permanent magnets in the direction of reciprocation and fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other; and a coil fixed to the stator, wherein an arrangement direction of the magnetic poles of one of the first pair of permanent magnets coincides with an arrangement direction of the magnetic poles of one of the second pair of permanent magnets that is disposed adjacent to the one of the first pair of permanent magnets.

Accordingly, when electrical current flows through the coil fixed to the stator in a direction, for example, magnetic flux loops, which run through the iron member, one of the first pair of permanent magnets that is disposed away from the second pair of permanent magnets, the stator, one of the second pair of permanent magnets that faces the first pair of permanent magnets, and the iron member, are formed, and when the direction of electrical current flowing through the coil fixed to the stator is switched to the opposite direction, magnetic flux loops, which run through the iron member, the other of the second pair of permanent magnets, the stator, the other of the first pair of permanent magnets, and the iron member, are formed. Accordingly, when the direction of electrical current flowing through the coil fixed to the stator is alternated, the entries of the magnetic fluxes into the iron member are alternated in the direction of reciprocation in the first pair of permanent magnets fixed to the stator and the second pair of permanent magnets fixed to the stator, and as a result, the iron member, i.e., the movable element reciprocates. Because both the coil and the permanent magnets are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element. In addition, because the movable element is reciprocated using the above-mentioned magnetic flux loops, a portion of the stator as a back yoke does not have to be disposed at a position opposite to the movable element with respect to the permanent magnets.

In the above linear actuator, a magnetic gap may be provided in the stator at a position adjacent to a boundary between the first pair of permanent magnets and the second pair of permanent magnets.

Because the magnetic gap is provided in the stator at a position adjacent to a boundary between the first pair of permanent magnets and the second pair of permanent magnets, the formation of magnetic fluxes through the stator and the iron member via the first pair of permanent magnets and the formation of magnetic fluxes through the stator and the iron member via the second pair of permanent magnets are ensured.

In the above linear actuator, the permanent magnets of the first pair of permanent magnets and of the second pair of permanent magnets adjacent to each other may be a single common permanent magnet.

Because the permanent magnets of the first pair of permanent magnets and of the second pair of permanent magnets adjacent to each other are a single common permanent magnet, the number of parts can be reduced.

In the above linear actuator, a magnetic gap may be provided in the stator at a position adjacent to a middle point of the common permanent magnet in the direction of reciprocation.

Because the magnetic gap is provided in the stator at a position adjacent to a middle point of the common permanent magnet in the direction of reciprocation, even when the single common permanent magnet is used, the formation of magnetic fluxes through the stator and the iron member via the first pair of permanent magnets and the formation of magnetic fluxes through the stator and the iron member via the second pair of permanent magnets are ensured.

In the above linear actuator, the iron member may include a pair of projecting portions which project toward the permanent magnets, and which are arranged side by side in the direction of reciprocation.

Because the iron member includes a pair of projecting portions which project toward the permanent magnets, and which are arranged side by side in the direction of reciprocation, attracting force can be efficiently applied to the end faces of the projection portions during both movements in the reciprocation.

Another object of the present invention is to provide a linear actuator in which magnetic flux generated by a permanent magnet can be efficiently used for moving a movable element, and sufficient and stable thrust force can be applied to the movable element.

In order to achieve the above object, a fifth aspect of the present invention provides a linear actuator including: a stator; a movable element having an iron member, and being reciprocatable with respect to the stator; a permanent magnet fixed to the stator so as to be opposed to the iron member, whose magnetic poles are arranged in the direction of reciprocation; a pair of magnetic pole elements provided at both sides of the permanent magnet in the direction of reciprocation; and a coil fixed to the stator, wherein a magnetic reluctance section is provided, which acts as a magnetic reluctance against magnetic flux loops that are generated by the magnetic force of the permanent magnet and run through the stator, the permanent magnet, and the pair of magnetic pole elements.

Because the magnetic reluctance section acts as a magnetic reluctance against magnetic flux loops that are generated by the magnetic force of the permanent magnet and run through the stator, the permanent magnet, and the pair of magnetic pole elements, the number of magnetic fluxes that are generated by the permanent magnet and run through the magnetic pole elements and the iron member can be increased.

In the above linear actuator, the magnetic reluctance section may be a magnetic gap formed between the magnetic pole elements and the stator.

Because the magnetic reluctance section is a magnetic gap formed between the magnetic pole elements and the stator, a magnetic reluctance can be applied, with a simple structure, to the magnetic flux loops that are generated by the magnetic force of the permanent magnet and run through the stator, the permanent magnet, and the pair of magnetic pole elements.

In the above linear actuator, the magnetic reluctance section may be a concave portion formed in the magnetic pole elements at a position near the stator.

Because the magnetic reluctance section is a concave portion formed in the magnetic pole elements at a position near the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator.

In the above linear actuator, the magnetic reluctance section may be a hole formed in the magnetic pole elements at a position near the stator.

Because the magnetic reluctance section is a hole formed in the magnetic pole elements at a position near the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator.

In the above linear actuator, the magnetic reluctance section may be formed by making the magnetic pole elements thinner as the magnetic pole elements extend toward the stator.

Because the magnetic reluctance section is formed by making the magnetic pole elements thinner as the magnetic pole elements extend toward the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator.

In the above linear actuator, plural sets of the pair of magnetic pole elements arranged in the direction of reciprocation may be fixed to the stator, and plural iron members arranged in the direction of reciprocation may be fixed to the movable element.

Because plural sets of the pair of magnetic pole elements arranged in the direction of reciprocation are fixed to the stator, and plural iron members arranged in the direction of reciprocation are fixed to the movable element, a greater thrust can be applied to the movable element.

BEST MODE FOR CARRYING OUT THE INVENTION

Figure 1:
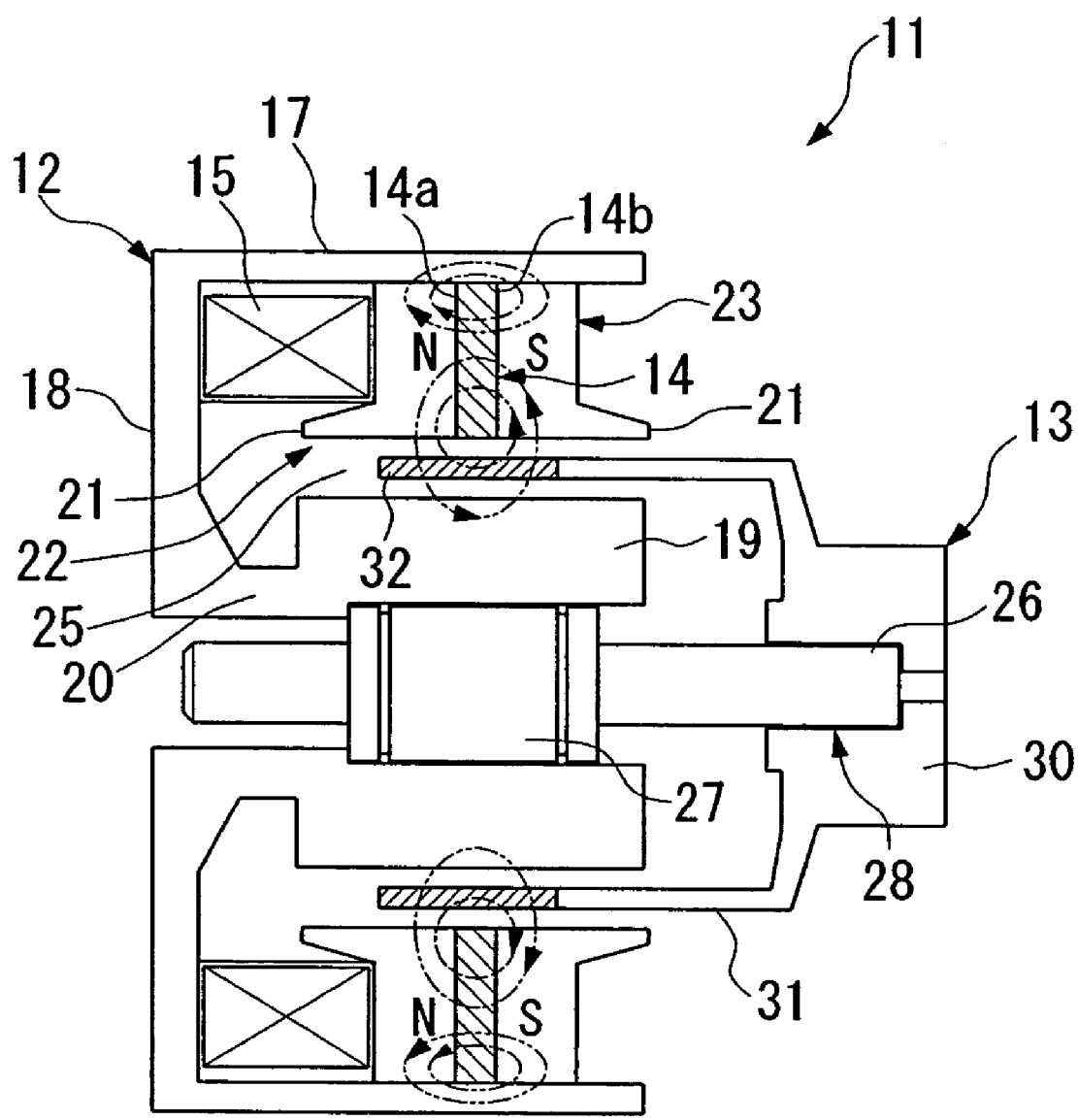
FIG. 1 is a side cross-sectional view showing a first embodiment of the liner actuator according to the present invention, in which magnetic fluxes under the condition in which electrical current does not flow through a coil are indicated by the two-dot chain lines.

A first embodiment of the linear actuator according to the present invention will be explained below with reference to FIGS. 1 to 4.

A linear actuator 11 according to the first embodiment includes a yoke (stator) 12, a movable element 13 which is reciprocatable with respect to the yoke 12, a permanent magnet 14 fixed to the yoke 12, and a coil 15 fixed to the yoke 12.

The yoke 12 includes an outer cylindrical portion 17 having a cylindrical shape, a bottom plate 18 having a thin ring shape and disposed at one side in the axial direction with respect to the outer cylindrical portion 17, a ring-shaped connection portion 20 extending in the axial direction from an inner portion of the bottom plate 18 toward the same side as the outer cylindrical portion 17 extends, a cylindrical inner magnetic pole (magnetic pole element) 19 provided on the connection portion 20 so as to be coaxial with the outer cylindrical portion 17.

The yoke 12 including the outer cylindrical portion 17, the bottom plate 18, the connection portion 20, and the inner magnetic pole 19 is integrally formed by sintering a sintering material which is a common magnetic material.

The coil 15 has a ring shape, and is fixed to the yoke 12 so as to be coaxial therewith in an inside corner portion where the bottom plate 18 merges with the outer cylindrical portion 17.

The permanent magnet 14 having a thin ring shape is made of a ferrite magnet, in which two magnetic poles, i.e., an N-pole 14a and an S-pole 14b are arranged side by side in the axial direction. At both sides in the axial direction with respect to the permanent magnet 14, there are disposed an annular-shaped outer magnetic pole (magnetic pole element) 22 having L-shaped cross section and an annular-shaped outer magnetic pole (magnetic pole element) 23 having L-shaped cross section, which respectively include cylindrical-shaped projecting portions 21 at radially inner portion thereof that opposingly project in the axial direction. The pair of outer magnetic pole 22 and outer magnetic pole 23 is also made of the sintering material. The permanent magnet 14 and the pair of outer magnetic poles 22 and 23 are coaxially fixed to the yoke 12 at radially outer portion of the yoke 12 in such a manner that the permanent magnet 14 is sandwiched by the pair of annular-shaped outer magnetic poles 22 and 23 at the both sides thereof in a direction along which the magnetic poles 14a and 14b are arranged, and the permanent magnet 14 and the pair of outer magnetic poles 22 and 23 are pressed into the outer cylindrical portion 17 of the yoke 12.

In this fixed state, the N-pole 14a of the permanent magnet 14 is disposed so as to face the bottom plate 18, and the outer magnetic pole 22 is located adjacent to the coil 15 in the axial direction. Moreover, in this fixed state, the permanent magnet 14 and the pair of outer magnetic poles 22 and 23, as a whole, are coaxially disposed outside the cylindrical-shaped inner magnetic pole 19 while having the same length as that of the inner magnetic pole 19, so as to form an annular gap 25 with the inner magnetic pole 19.

Radially inside the inner magnetic pole 19 of the yoke 12, a bushing 28, which supports a shall 26 in a movable manner using a bushing 27, is coaxially fixed thereto at the bushing 27. The movable element 13 is fixed to the shaft 26 which is supported by the bushing 27 in a movable manner. The shaft 26 and the movable element 13 together reciprocate along the axial direction with respect to the bushing 27 that is fixed to the yoke 12.

The movable element 13 includes a base portion 30, a cylindrical portion 31, and an iron member 32. The base portion 30 has a substantially circular plate shape and is fixed to the shaft 26. The cylindrical portion 31 is disposed in the gap 25 in a state in which the base plate 30 is fixed to the shaft 26. The iron member 32, as a movable magnetic pole, has the same diameter as that of the cylindrical portion 31, and is coaxially fixed to the cylindrical portion 31 at a position opposite to the base portion 30. Accordingly, the iron member 32 of the movable element 13 is coaxially disposed in the gap 25, and the central position of the iron member 32 in the axial direction substantially coincides with the central position of the permanent magnet 14.

In the movable element 13, the base portion 30 and the cylindrical portion 31 are made of synthetic resin such as an engineering plastic, which is a non-magnetic material, and the iron member 32 is made of a sintering and magnetic material which has not been magnetized. The movable element 13 is made using a synthetic resin insert formation method in which the iron member 32 is used as an insert.

As a result, the movable element 13 having the iron member 32 is supported by the yoke 12 in a manner reciprocatable along the axial direction (i.e., the right-and-left direction in the drawings), and the permanent magnet 14 is fixed to the yoke 12 in such a manner that the permanent magnet 14 is disposed radially outside the iron member 32 of the movable element 13, and the magnetic poles 14a and 14b are arranged side by side in the direction of reciprocation of the movable element 13. The pair of outer magnetic poles 22 and 23 is disposed at both sides of the permanent magnet 14 in the direction of reciprocation of the movable element 13, and the inner magnetic pole 19, which is disposed so as to be opposed to the iron member 32 and is disposed at a position opposite to the permanent magnet 14, is integrally formed in the yoke 12. Moreover, the set of permanent magnet 14 and pair of outer magnetic poles 22 and 23 is disposed at only one side of the iron member 32, and more specifically, the set of permanent magnet 14 and pair of outer magnetic poles 22 and 23 is disposed only radially outside the cylindrical-shaped iron member 32.

Figure 2:
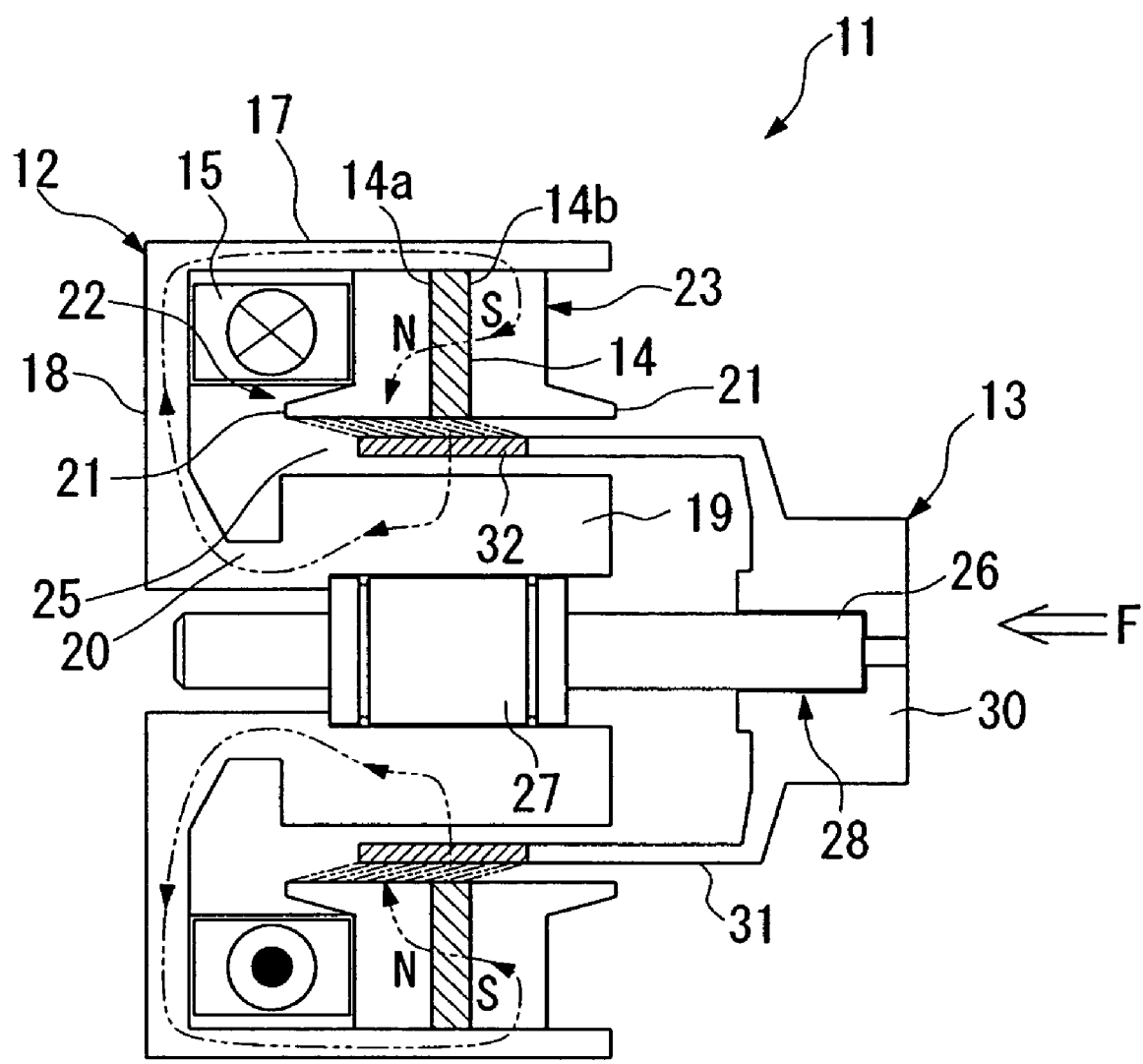
FIG. 2 is a side cross-sectional view showing the first embodiment of the liner actuator according to the present invention, in which magnetic fluxes under the condition in which electrical current flows through the coil in one direction are indicated by the two-dot chain lines.
Figure 3:
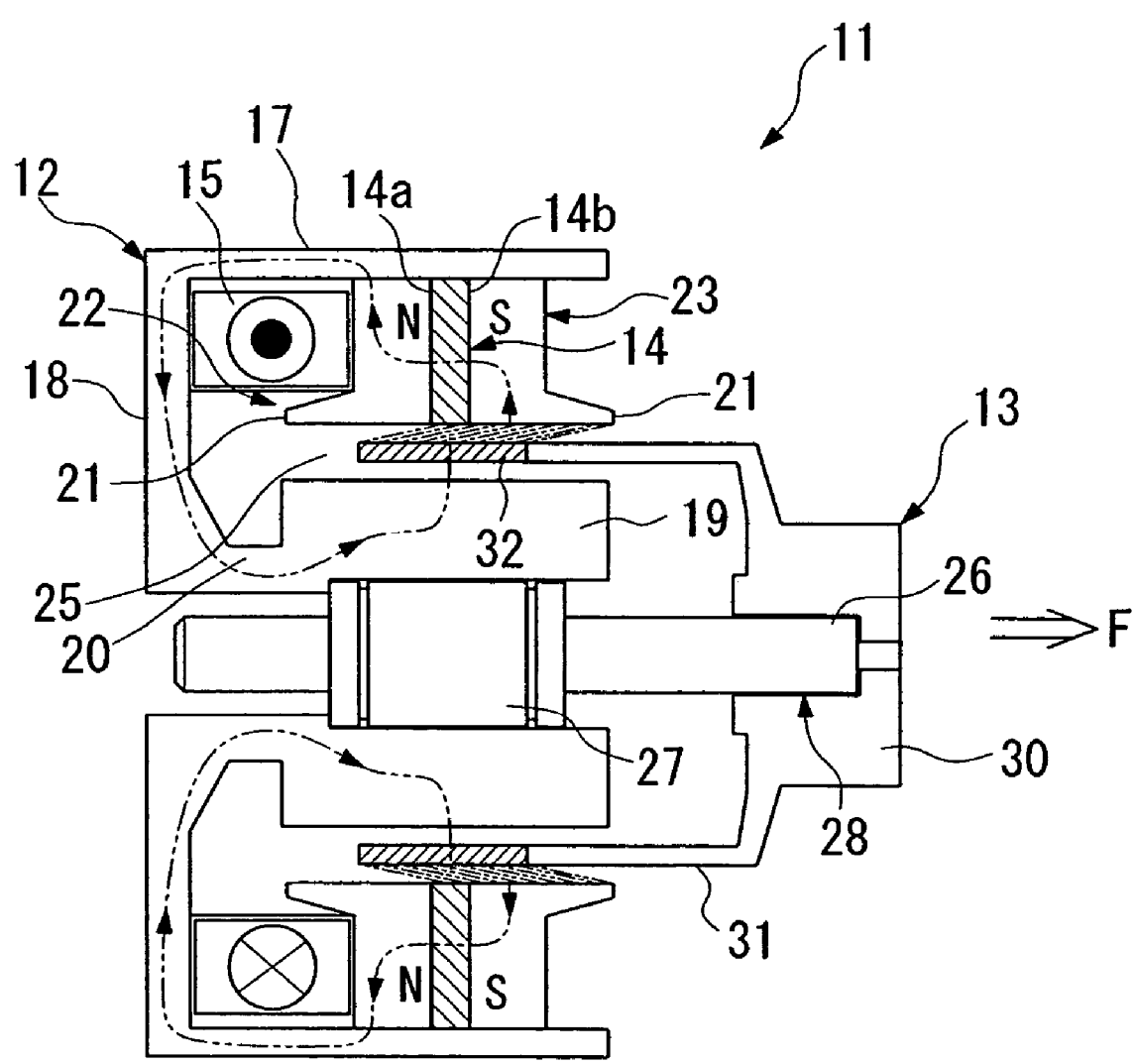
FIG. 3 is a side cross-sectional view showing the first embodiment of the liner actuator according to the present invention, in which magnetic fluxes under the condition in which electrical current flows through the coil in the opposite direction are indicated by the two-dot chain lines.

In the linear actuator 11 having the above structure, when alternating current (sinusoidal wave current or rectangular wave current) is supplied to the coil 15, and when the current flows through the coil 15 in a predetermined direction, due to the magnetic fluxes running from the S-pole 14b to the N-pole 14a in the permanent magnet 14 as indicated by the two-dot chain lines in FIG. 2, magnetic flux loops, which run through the outer cylindrical portion 17 of the yoke 12, the outer magnetic pole 23, the permanent magnet 14, the outer magnetic pole 22, the iron member 32 of the movable element 13, the inner magnetic pole 19 of the yoke 12, the connection portion 20, the bottom plate 18, and the outer cylindrical portion 17 in this order, are formed. As a result, a force F is applied to the movable element 13 to move the same toward the outer magnetic pole 22. On the other hand, when the current flows through the coil 15 in a direction opposite to the predetermined direction, due to the magnetic fluxes running from the S-pole 14b to the N-pole 14a in the permanent magnet 14 as indicated by the two-dot chain lines in FIG. 3, magnetic flux loops, which run through the outer cylindrical portion 17 of the yoke 12, the bottom plate 18, the connection portion 20, the inner magnetic pole 19, the iron member 32 of the movable element 13, the outer magnetic pole 23, the permanent magnet 14, the outer magnetic pole 22, and the outer cylindrical portion 17 in this order, are formed. As a result, a force F is applied to the movable element 13 to move the same toward the outer magnetic pole 23, in contrast to the above case.

Because the direction of the current supplied to the coil 15 is alternated, such an operation is repeated, and the movable element 13 reciprocates with respect to the yoke 12 in the axial direction.

According to the linear actuator 11 of the first embodiment explained above, the iron member 32 is provided in the movable element 13, the permanent magnet 14 is provided in the yoke 12 so as to be opposed to the iron member 32, the coil 15 is provided in the yoke 12, and the magnetic fluxes running through the iron member 32 are moved using the coil 15 of the yoke 12, in which the direction of the electrical current is alternated, and the permanent magnet 14, and as a result, the iron member 32, i.e., the movable element 13 reciprocates.

As explained above, because the coil 15 is provided not in the movable element 13, but in the yoke 12, electrical current does not have to be supplied to the movable element 13; therefore, the feeder lines connected to the coil 15 will not be broken due to the movement of the movable element 13. Accordingly, reliability in a continuous operation or the like can be improved.

Moreover, because the permanent magnet 14 is also provided not in the movable element 13, but in the yoke 12, the weight of the movable element 13 will not be increased even when the weigh of the permanent magnet 14 is increased in order to obtain high magnetic flux density for improvement in performance. Accordingly, it is easy to obtain improved performance (increased thrust). In addition, in order to increase the magnetic flux density in the gap 25, just the size of the magnet in the radial direction should be increased, which does not affect on the gap 25 (i.e., the gap 25 does not have to be increased), and thus higher performance and increased design freedom can be obtained. Furthermore, because the permanent magnet 14 is not disposed in the gap 25, just iron members are opposed to each other in the gap 25; therefore, the length of magnetic path is reduced, magnetomotive force is reduced, and thus efficiency is improved. In addition, because the permanent magnet 14 is employed, the linearity of the magnetic path is superior.

In addition, because the movable element 13 does not include a magnet, a magnetizing operation does not have to be applied to the movable element 13. Moreover, because the iron member 32 does not exhibit attracting force during a manufacturing process, it is easy to integrally form the movable element 13. Accordingly, the manufacturing process is simplified, which leads to reduction in cost. Moreover, if the movable element 13 is made using a synthetic resin insert formation method in which the iron member 32 is used as an insert, the movable element 13 does not include a magnet; therefore an additional machining can be applied. In addition, because the gap 25 does not include a magnet therein either, an additional machining can be applied, and the coaxial accuracy of the linear actuator 11 can be improved. As a result, a load applied to the bearing, i.e., to the bushing 28, can be reduced, and the operation life of the bushing 28 can be increased.

Specifically, when the direction of the electrical current flowing through the coil 15 of the yoke 12 is alternated, the entry of the magnetic fluxes into the iron member 32 is alternated by the outer magnetic poles 22 and 23 which are disposed at both sides of the permanent magnet 14 in which the magnetic poles 14a and 14b are arranged side by side in the direction of reciprocation of the movable element 13, and as a result, the iron member 32, i.e., the movable element 13 reciprocates. Accordingly, the movable element 13 can be reciprocated in a simple structure, the manufacturing process is simplified, and thus further reduction in cost can be achieved.

Moreover, because the set of permanent magnet 14 and pair of outer magnetic poles 22 and 23 is disposed at only one side of the cylindrical-shaped iron member 32, reduction in overall weight can be achieved.

In addition, because the set of permanent magnet 14 and pair of outer magnetic poles 22 and 23 is disposed only radially outside the iron member 32, the radius of the iron member 32, i.e., the radius of the movable element 13, can be reduced, and, in particular, the weight of the movable element 13 can be reduced.

Furthermore, because the inner magnetic pole 19, which is disposed so as to be opposed to the iron member 32 and is disposed at a position opposite to the permanent magnet 14, is integrally formed in the yoke 12, a connecting operation after forming separately doe not have to be performed. Accordingly, the manufacturing process is further simplified.

In addition, because the movable element 13 is made using a synthetic resin insert formation method in which the iron member 32 is used as an insert, the movable element 13 including the iron member 32 can be easily manufactured and can be made light.

Furthermore, because the movable element 13 is supported by the yoke 12 having the bushing 28 intervening therebetween, the movable element 13 reciprocates accurately.

In addition, the yoke 12 is made of a sintering material, cost can be reduced, performance can be improved (iron loss can be reduced), and mechanical strength can be increased. When the yoke 12 is made of compacted iron powder, the same effects can be obtained.

The base portion 30 and the cylindrical portion 31 of the movable element 13 do not have to be made of synthetic resin, and may be made of aluminum die-cast, non-magnetic stainless steel, etc., as long as non-magnetic material is used. In this case, a merit is obtained in that stiffness can be increased. However, it is preferable to use synthetic resin is terms of weight reduction.

For the permanent magnet 14, in addition to a ferrite magnet, a magnet made of rare earth element such as neodymium or samarium cobalt, or plastic magnet may be used; however, it is preferable to use the ferrite magnet in terms of reduction in cost.

In addition, the bearing for the movable element 13 may be, in addition to the bushing, an air gearing (a gas bearing), a sliding bearing, etc. However, it is preferable to use a bushing 28 because it makes it possible to reciprocate the movable element 13 more accurately.

Moreover, the linear actuator 11 may further include a spring provided on the movable unit, or the linear actuator 11 may be used with a spring disposed outside thereof for utilizing a resonance phenomenon, which are general practice of usage; however, the linear actuator 11 may be used as it is.

The linear actuator 11 may be used as a linear servo actuator, which is capable of controlling speed and position, by providing position and speed sensors thereon, and by executing a closed-loop control.

The end portions of the inner magnetic pole 19 and the outer magnetic poles 22 and 23 may be chamfered in order to improve performance such as displacement characteristics.

In addition, the inner magnetic pole 19, outer magnetic poles 22 and 23, and the iron member 32 may be made of stacked electrical steel sheets, instead of the sintering material, in order to reduce iron loss during a high speed operation.

Figure 4:
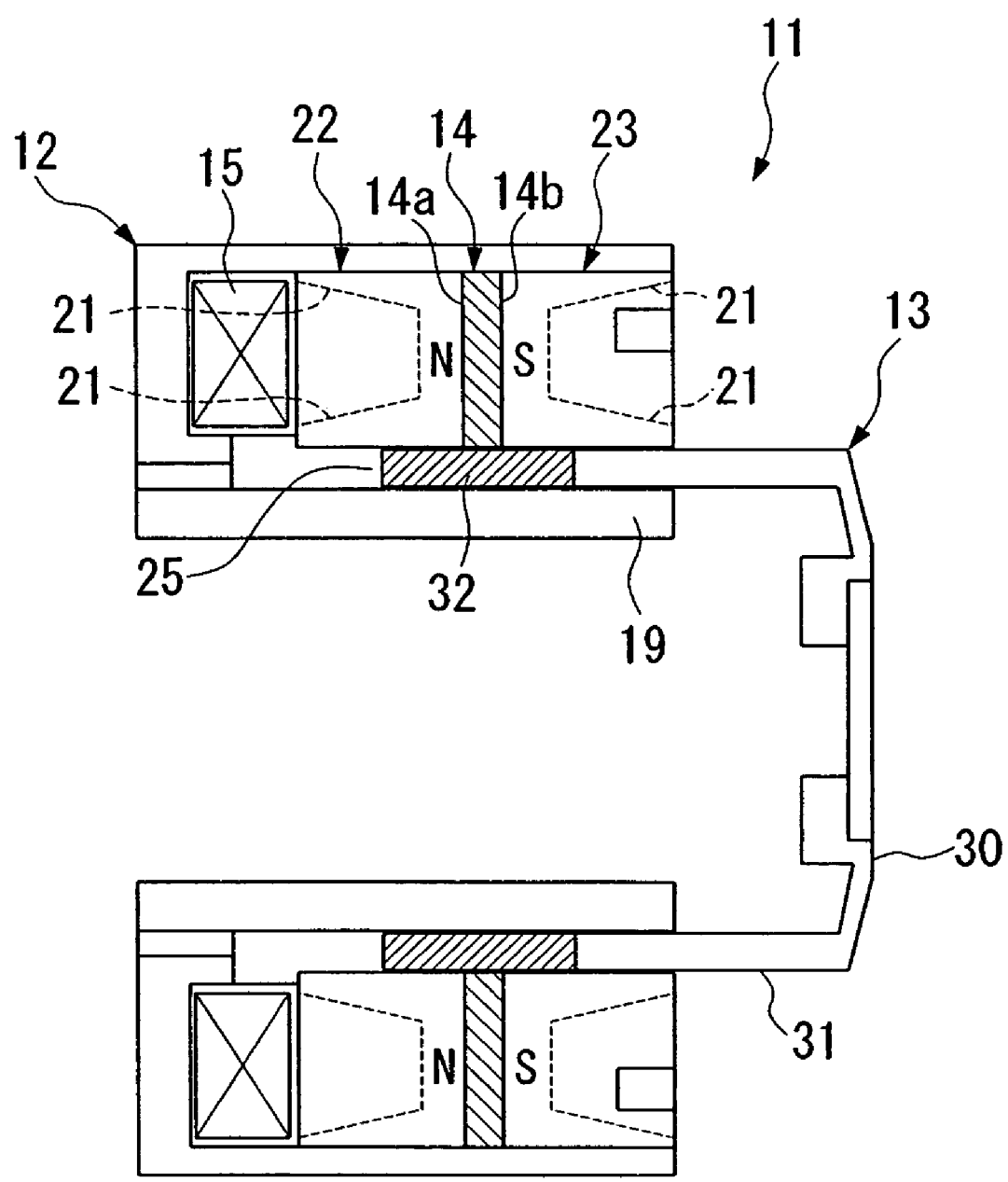
FIG. 4 is a side cross-sectional view showing an alternate example of the first embodiment of the liner actuator according to the present invention.

Furthermore, the outer magnetic poles 22 and 23 may be formed in a short cylindrical shape without having projecting portions as indicated by the solid line in FIG. 4, or the projecting portions 21 may be provided at both the radially inner and outer portions thereof as indicated by the broken line in FIG. 4. In addition, as shown in FIG. 4, a structure may be employed in which the movable element 13 is not supported by the yoke 12 using the bushing 28 or the like.

Figure 5:
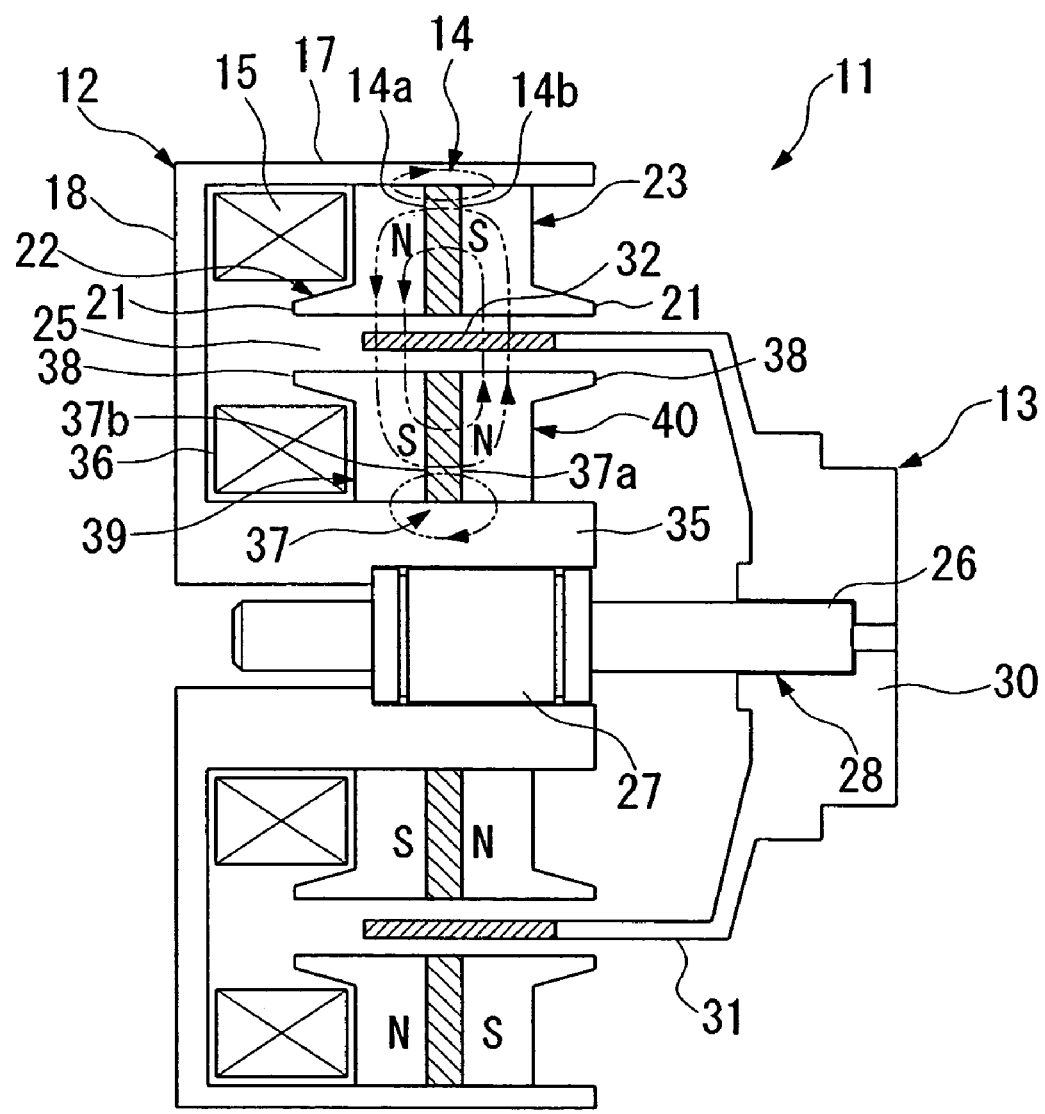
FIG. 5 is a side cross-sectional view showing a second embodiment of the liner actuator according to the present invention, in which magnetic fluxes under the condition in which electrical current does not flow through a coil are indicated by the two-dot chain lines.

Next, a second embodiment of the linear actuator according to the present invention will be explained below with reference to FIG. 5. The same reference symbols are applied to the elements similar to that in the first embodiment, and explanations thereof are omitted.

In the linear actuator 11 of the second embodiment, instead of the connection portion 20 and the inner magnetic pole 19, an inner cylindrical portion 35, which is disposed so as to be coaxial with the outer cylindrical portion 17, is integrally formed at the radially inner portion of the yoke 12. Moreover, in addition to the outer portion, at the inner portion as well, a coil 36 is fixed to the yoke 12 so as to be coaxial therewith in an inside corner portion where the bottom plate 18 merges with the inner cylindrical portion 35.

In addition to at the outer portion, at the inner portion as well, there are provided a permanent magnet 37 having a thin ring shape and made of a ferrite magnet or the like, in which two magnetic poles, i.e., an N-pole 37a and an S-pole 37b are arranged side by side in the axial direction, and annular-shaped inner magnetic poles (magnetic pole elements) 39 and 40 having L-shaped cross section and made of sintering material which are disposed at both sides in the axial direction with respect to the permanent magnet 37, and which respectively include projecting portions 38 at radially outer portion thereof that opposingly project in the axial direction. The permanent magnet 37 and the pair of inner magnetic poles 39 and 40 are coaxially fixed to the yoke 12 in such a manner that and the permanent magnet 37 is sandwiched by the annular-shaped inner magnetic poles 39 and 40 at the both sides thereof in a direction along which the magnetic poles 37a and 37b are arranged, and the pair of inner magnetic poles 39 and 40 are pressed onto the inner cylindrical portion 35 of the yoke 12.

In this fixed state, the S-pole 37b of the permanent magnet 37 is disposed so as to face the bottom plate 18, and the inner magnetic pole 39 is located adjacent to the coil 36 in the axial direction. Moreover, in this fixed state, the permanent magnet 37 and the pair of inner magnetic poles 39 and 40, as a whole, are coaxially disposed inside the pair of outer magnetic poles 22 and 23, and in addition, the permanent magnet 37 and the outer permanent magnet 14, the inner magnetic pole 39 and the outer magnetic pole 22, the inner magnetic pole 40 and the outer magnetic pole 23, the coil 36 and the outer coil 15 have the same length, respectively, and are disposed at the same location in the axial direction, respectively. The gap 25 is formed between the permanent magnet 37 and the pair of inner magnetic poles 39 and 40, and the permanent magnet 14 and the pair of outer magnetic poles 22 and 23.

Radially inside the inner cylindrical portion 35 of the yoke 12, the bushing 28, which support the shaft 26 in a movable manner using the bushing 27, is coaxially fixed thereto at the bushing 27. The iron member 32, as a cylindrical-shaped movable magnetic pole, of the movable element 13 which is fixed to the shaft 26 of the bushing 28, is disposed in the annular gap 25 formed between the permanent magnet 37 and the pair of inner magnetic poles 39 and 40, and the permanent magnet 14 and the pair of outer magnetic poles 22 and 23, as in the first embodiment.

The linear actuator 11 in the second embodiment explained above achieves the same effects as that achieved by the linear actuator 11 in the first embodiment. In addition, because the permanent magnet 14 and the pair of outer magnetic poles 22 and 23 and the permanent magnet 37 and the pair of inner magnetic poles 39 and 40 are disposed at both sides with respect to the iron member 32, respectively, a stronger magnetic field due to the permanent magnets and a greater magnetomotive force due to electrical current can be obtained.

Figure 6:
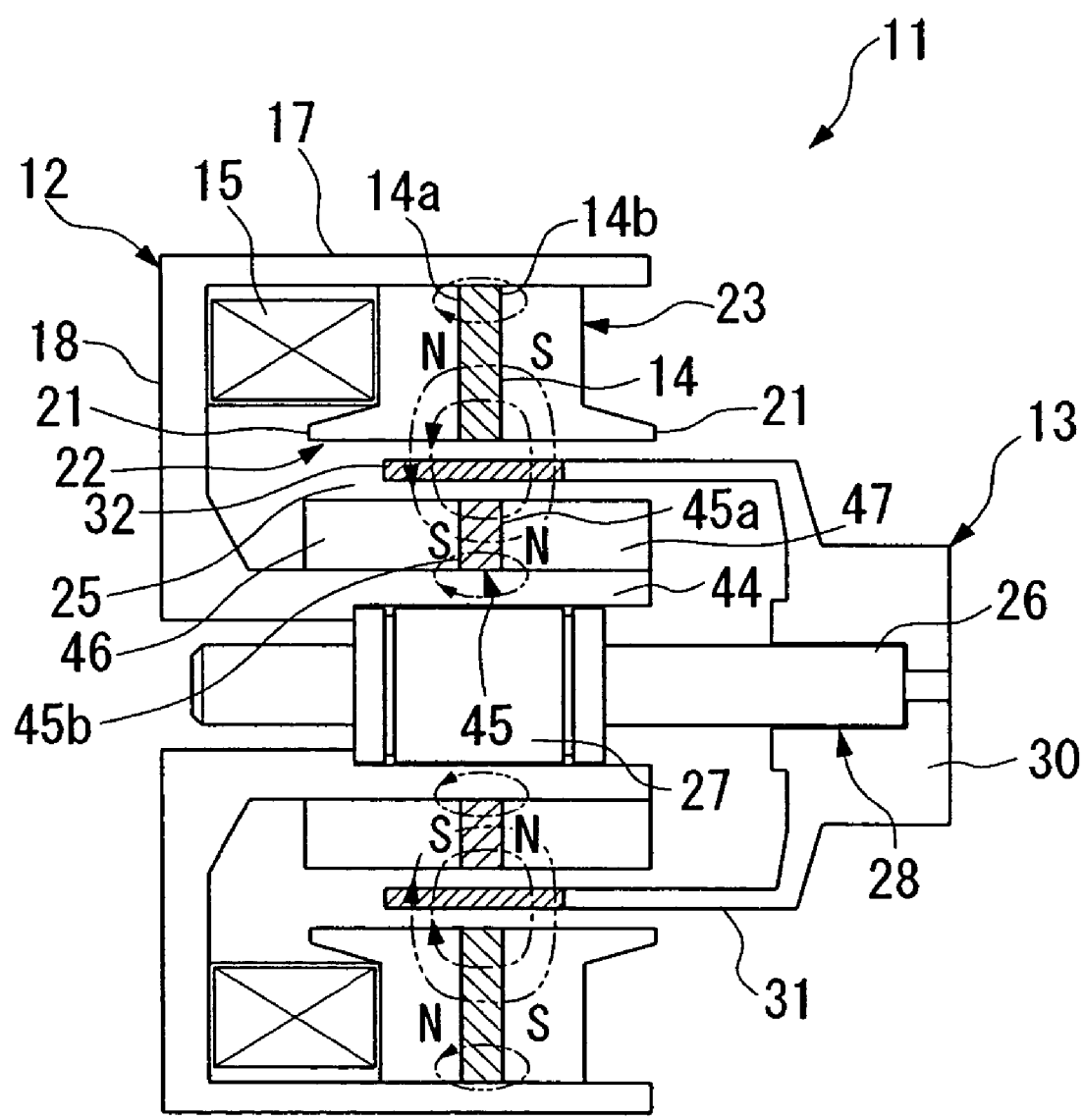
FIG. 6 is a side cross-sectional view showing a third embodiment of the liner actuator according to the present invention, in which magnetic fluxes under the condition in which electrical current does not flow through a coil are indicated by the two-dot chain lines.

Next, a third embodiment of the linear actuator according to the present invention will be explained below with reference to FIG. 6. The same reference symbols are applied to the elements similar to that in the first embodiment, and explanations thereof are omitted.

In the linear actuator 11 of the third embodiment, instead of the connection portion and the inner magnetic pole 19, an inner cylindrical portion 44, which is disposed so as to be coaxial with the outer cylindrical portion 17, is integrally formed at the radially inner portion of the yoke 12.

In addition to at the outer portion, at the inner portion as well, there are provided a permanent magnet 45 having a thin ring shape and made of a ferrite magnet or the like, in which two magnetic poles, i.e., an N-pole 45a and an S-pole 45b are arranged side by side in the axial direction, and a pair of cylindrical-shaped inner magnetic poles (magnetic pole elements) 46 and 47 made of sintering material which are disposed at both sides in the axial direction with respect to the permanent magnet 45. The permanent magnet 45 and the pair of inner magnetic poles 46 and 47 are coaxially fixed to the yoke 12 in such a manner that and the permanent magnet 45 is sandwiched by the annular-shaped inner magnetic poles 46 and 47 at the both sides thereof in a direction along which the magnetic poles 45a and 45b are arranged, and the permanent magnet 45 and the pair of inner magnetic poles 46 and 47 are pressed onto the inner cylindrical portion 44 of the yoke 12.

In this fixed state, the S-pole 45b of the permanent magnet 45 is disposed so as to face the bottom plate 18. Moreover, in this fixed state, the permanent magnet 45 and the pair of inner magnetic poles 46 and 47, as a whole, are coaxially disposed inside the pair of outer magnetic poles 22 and 23, and in addition, the permanent magnet 45 and the outer permanent magnet 14, the inner magnetic pole 46 and the outer magnetic pole 22, the inner magnetic pole 47 and the outer magnetic pole 23 have the same length, respectively, and are disposed at the same location in the axial direction, respectively. The gap 25 is formed between the permanent magnet 45 and the pair of outer magnetic poles 22 and 23, and the permanent magnet 45 and the pair of inner magnetic poles 46 and 47.

Radially inside the inner cylindrical portion 44 of the yoke 12, the bushing 28, which support the shaft 26 in a movable manner using the bushing 27, is coaxially fixed thereto at the bushing 27. The iron member 32, as a cylindrical-shaped movable magnetic pole, of the movable element 13 which is fixed to the shaft 26 of the bushing 28, is disposed in the annular gap 25 formed between the permanent magnet 14 and the pair of outer magnetic poles 46 and 47, and the permanent magnet 45 and the pair of outer magnetic poles 46 and 47, as in the first embodiment. In this case, a magnet made of rare earth element is preferably used for the inner permanent magnet 45.

The linear actuator 11 in the third embodiment explained above achieves the same effects as that achieved by the linear actuator 11 in the first embodiment. In addition, in the third embodiment, because the permanent magnet 14 and the pair of outer magnetic poles 22 and 23 and the permanent magnet 45 and the pair of inner magnetic poles 46 and 47 are disposed at both sides with respect to the iron member 32, respectively, a stronger magnetic field due to the permanent magnets and a greater magnetomotive force due to electrical current can be obtained.

Figure 7:
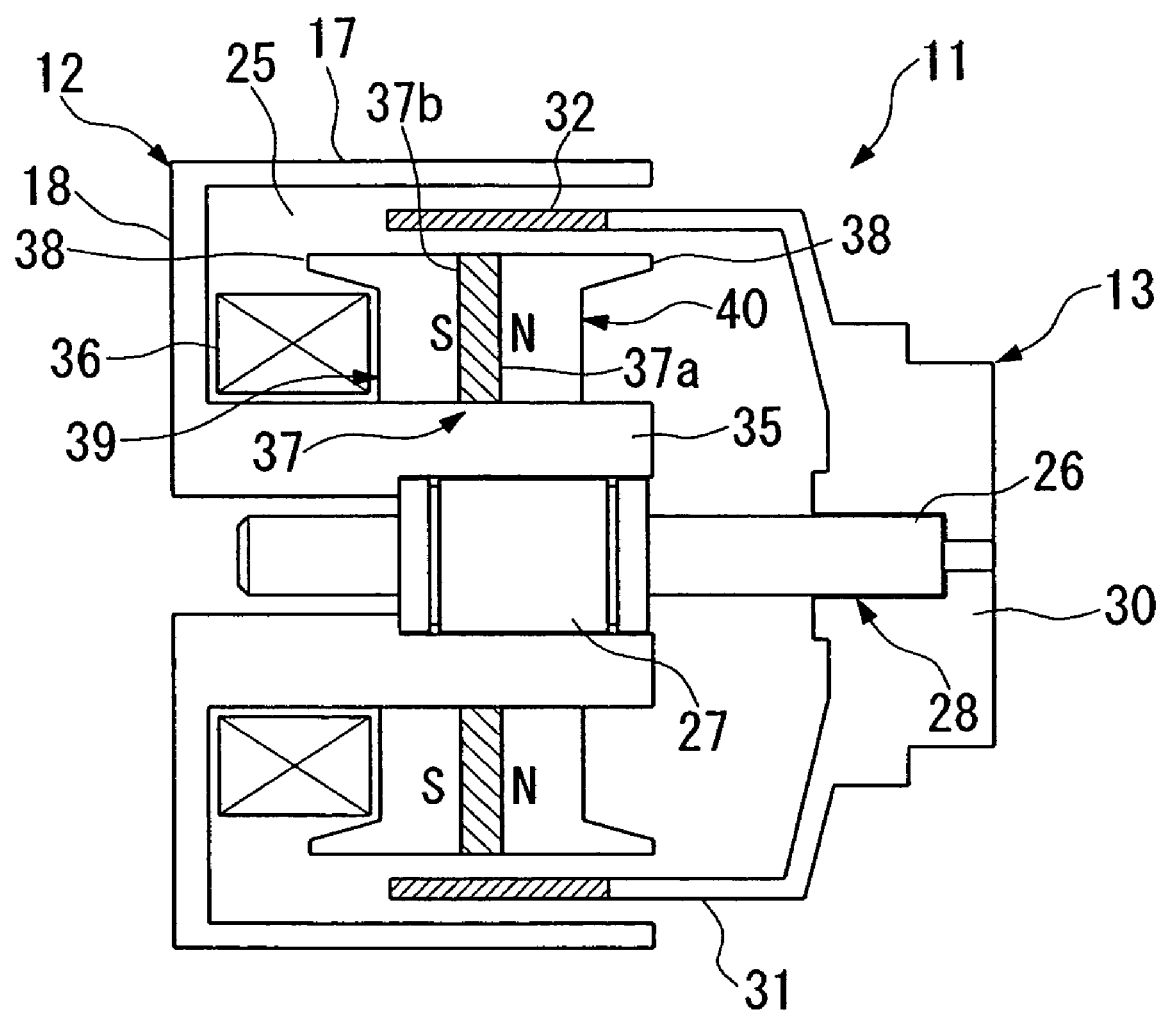
FIG. 7 is a side cross-sectional view showing a fourth embodiment of the liner actuator according to the present invention.
Figure 8:
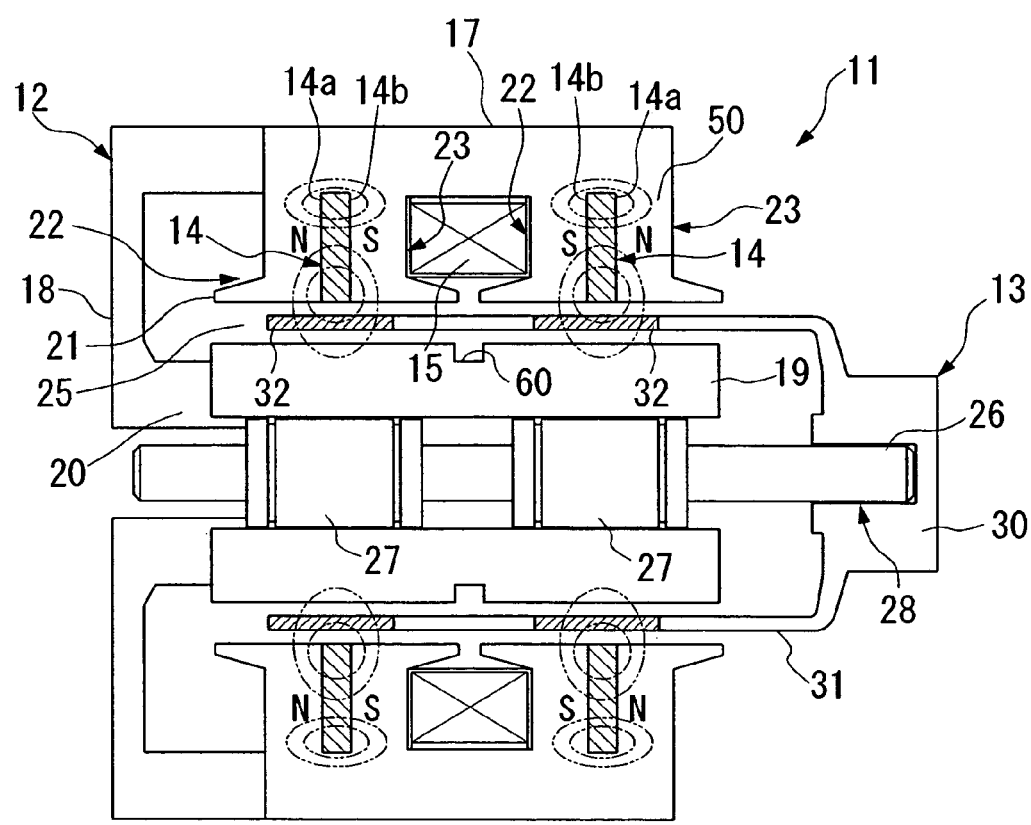
FIG. 8 is a side cross-sectional view showing a fifth embodiment of the liner actuator according to the present invention, in which magnetic fluxes under the condition in which electrical current does not flow through a coil are indicated by the two-dot chain lines.

Next, a fourth embodiment of the linear actuator according to the present invention will be explained below with reference to FIG. 7. The same reference symbols are applied to the elements similar to that in the first embodiment, and explanations thereof are omitted.

In the linear actuator 11 of the fourth embodiment, instead of the connection portion and the inner magnetic pole 19, an inner cylindrical portion 35, which is disposed so as to be coaxial with the outer cylindrical portion 17, is integrally formed at the radially inner portion of the yoke 12. Moreover, instead of the outer coil 15, at the inner portion, a ring-shaped coil 36 is fixed to the yoke 12 so as to be coaxial therewith in an inside corner portion where the bottom plate 18 merges with the inner cylindrical portion 35.

Instead of at the outer portion, at the inner portion, there are provided a permanent magnet 37 having a thin ring shape and made of a ferrite magnet or the like, in which two magnetic poles, i.e., an N-pole 37a and an S-pole 37b are arranged side by side in the axial direction, and annular-shaped inner magnetic poles (magnetic pole elements) 39 and 40 having L-shaped cross section and made of sintering material which are disposed at both sides in the axial direction with respect to the permanent magnet 37, and which respectively include projecting portions 38 at radially outer portion thereof that opposingly project in the axial direction. The permanent magnet 37 and the pair of inner magnetic poles 39 and 40 are coaxially fixed to the yoke 12 in such a manner that the permanent magnet 37 is sandwiched by the annular-shaped inner magnetic poles 39 and 40 at the both sides thereof in a direction along which the magnetic poles 37a and 37b are arranged, and the permanent magnet 37 and the pair of inner magnetic poles 39 and 40 are pressed onto the inner cylindrical portion 35 of the yoke 12.

In this fixed state, the S-pole 37b of the permanent magnet 37 is disposed so as to face the bottom plate 18, and the inner magnetic pole 39 is located adjacent to the coil 36 in the axial direction. The gap 25 is formed between the permanent magnet 37 and the pair of inner magnetic poles 39 and 40, and the outer cylindrical portion 17.

Radially inside the inner cylindrical portion 35 of the yoke 12, the bushing 28, which support the shaft 26 in a movable manner using the bushing 27, is coaxially fixed thereto at the bushing 27. The iron member 32, as a cylindrical-shaped movable magnetic pole, of the movable element 13 which is fixed to the shaft 26 of the bushing 28, is disposed in the annular gap 25 formed between the permanent magnet 37 and the outer cylindrical portion 17, as in the first embodiment. As a result, the set of permanent magnet 37 and pair of inner magnetic poles 39 and 40 is disposed only radially inside the cylindrical-shaped iron member 32.

The linear actuator 11 in the fourth embodiment explained above achieves the same effects as that achieved by the linear actuator 11 in the first embodiment. In addition, in the fourth embodiment, because the set of permanent magnet 37 and pair of inner magnetic poles 39 and 40 is disposed only radially inside the iron member 32, the radiuses of the permanent magnet 37 and the pair of inner magnetic poles 39 and 40 can be reduced, and the weights thereof are also reduced, and thus the overall weight can be reduced.

Next, a fifth embodiment of the linear actuator according to the present invention, in particular, the difference from the first embodiment, will be mainly explained below with reference to FIGS. 8 to 11. The same reference symbols are applied to the elements similar to that in the first embodiment, and explanations thereof are omitted.

In the fifth embodiment, plural sets, more specifically, two set of the permanent magnet 14 and the pair of outer magnetic poles 22 and 23 are provided along the direction of reciprocation of the movable element 13, and in addition, the outer cylindrical portion 17 of the yoke 12 and two pairs of outer magnetic poles 22 and 23 are integrally formed by sintering a sintering material which is a common magnetic material.

The permanent magnets 14 are arranged such that the directions of magnetic pole thereof are different from each other. More specifically, with regard to the permanent magnet 14 near the bottom plate 18, the N-pole 14a is disposed so as to face the bottom plate 18, and the S-pole 14b is disposed so as to face a direction opposite to the bottom plate 18, and with regard to the permanent magnet 14 disposed away from the bottom plate 18, the N-pole 14a is disposed so as to face a direction opposite to the bottom plate 18, and the S-pole 14b is disposed so as to face the bottom plate 18.

One of the iron members 32 is disposed so as to be opposite to one of the two permanent magnet 14 and pair of outer magnetic poles 22 and 23, and the other of the iron members 32 is disposed so as to be opposite to the other of the two sets of permanent magnet 14 and pair of outer magnetic poles 22 and 23.

In addition, the coil 15 is disposed between the two sets of permanent magnet 14 and pair of outer magnetic poles 22 and 23, i.e., the coil 15 is disposed between the outer magnetic pole 23, which is included in the pair of outer magnetic poles 22 and 23 disposed near the bottom plate 18 and which is disposed away from the bottom plate 18, and the outer magnetic pole 22, which is included in the pair of outer magnetic poles 22 and 23 disposed away from the bottom plate 18 and which is disposed so as to face the bottom plate 18.

Moreover, at the radially outer portion of the inner magnetic pole 19, between the permanent magnets 14 in the direction of reciprocation of the movable element 13 and between two sets of the pair of outer magnetic poles 22 and 23, there is formed an annular groove 60 that is stepped so as to be concave. In addition, the bushing 28 includes plural bushings 27, and more specifically, two bushings 27.

Figure 9:
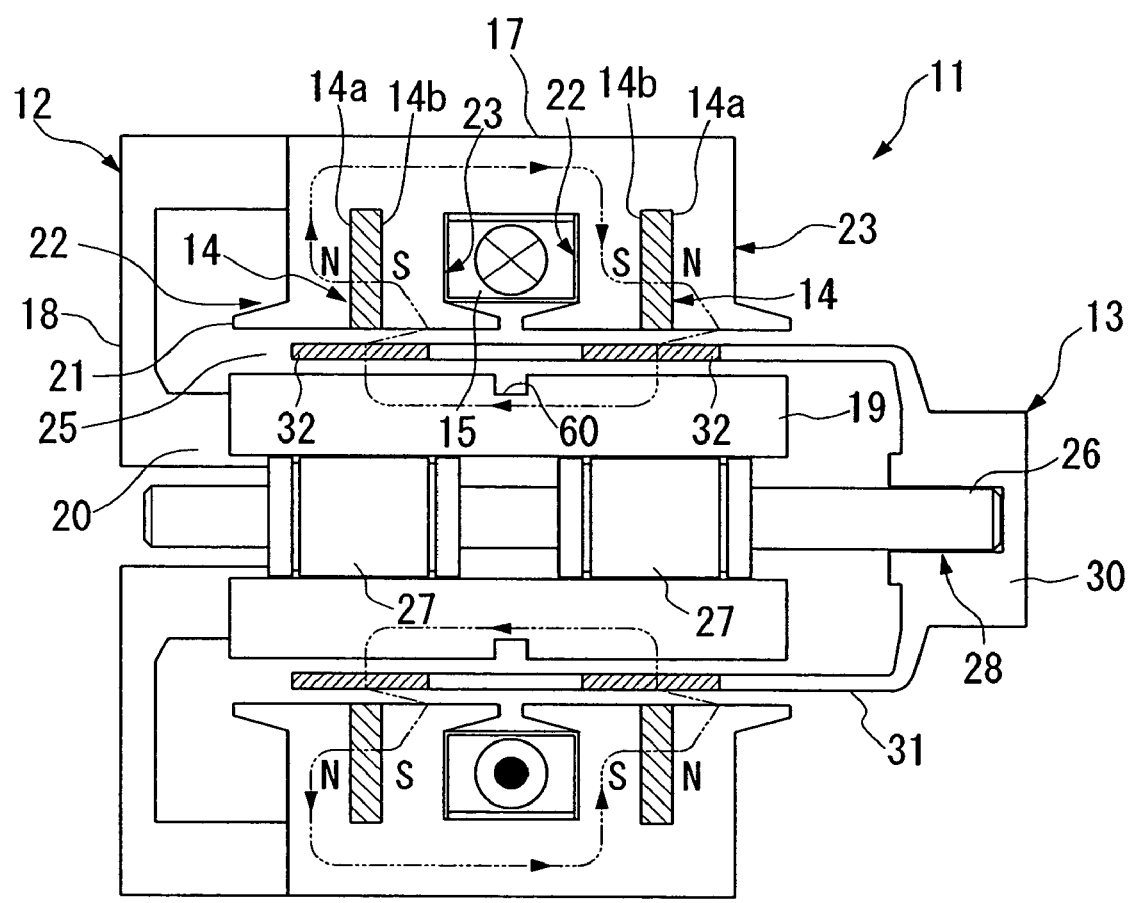
FIG. 9 is a side cross-sectional view showing the fifth embodiment of the liner actuator according to the present invention, in which magnetic fluxes under the condition in which electrical current flows through the coil in one direction are indicated by the two-dot chain lines.
Figure 10:
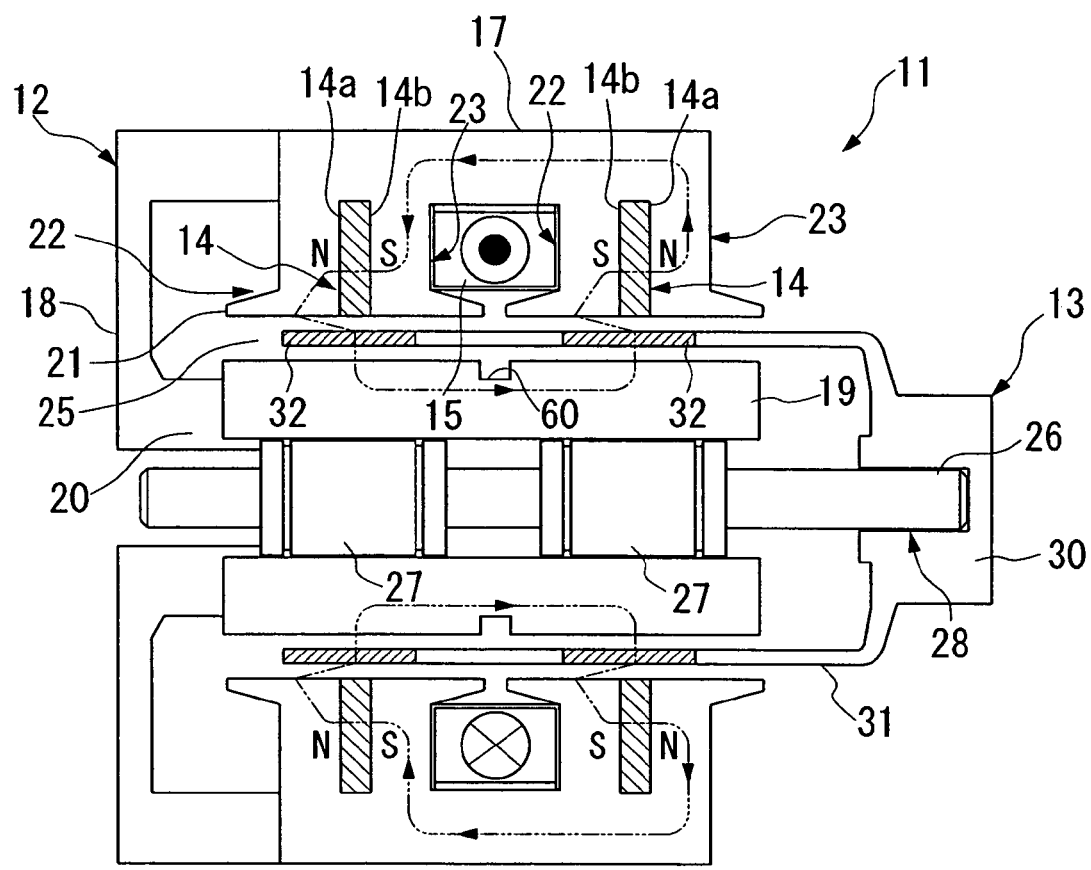
FIG. 10 is a side cross-sectional view showing the fifth embodiment of the liner actuator according to the present invention, in which magnetic fluxes under the condition in which electrical current flows through the coil in the opposite direction are indicated by the two-dot chain lines.

In the fifth embodiment, when alternating current (sinusoidal wave current or rectangular wave current) is supplied to the coil 15, and when the current flows through the coil 15 in a predetermined direction, as indicated by the two-dot chain lines in FIG. 9, magnetic flux loops, which run through the outer cylindrical portion 17 of the yoke 12, the outer magnetic pole 23 which is included in the pair of outer magnetic poles 22 and 23 disposed away from the bottom plate 18 and which faces the bottom plate 18, one of the permanent magnets 14 that is disposed away from the bottom plate 18, the outer magnetic pole 23 which is included in the pair of outer magnetic poles 22 and 23 disposed away from the bottom plate 18 and which is disposed away from the bottom plate 18, one of the iron members 32 of the movable element 13 that is disposed away from the bottom plate 18, the inner magnetic pole 19 of the yoke 12, the other of the iron members 32 of the movable element 13 that faces the bottom plate 18, the outer magnetic pole 23 which is included in the pair of outer magnetic poles 22 and 23 disposed near the bottom plate 18 and which is disposed away from the bottom plate 18, the other of the permanent magnets 14 that faces the bottom plate 18, the outer magnetic pole 22 which is included in the pair of outer magnetic poles 22 and 23 disposed near the bottom plate 18 and which faces the bottom plate 18, and the outer cylindrical portion 17 in this order, are formed. As a result, a force F is applied to the movable element 13 to move the same away from the bottom plate 18. On the other hand, when the current flows through the coil 15 in a direction opposite to the predetermined direction, as indicated by the two-dot chain lines in FIG. 10, magnetic flux loops, which run through the outer cylindrical portion 17 of the yoke 12, the outer magnetic pole 23 which is included in the pair of outer magnetic poles 22 and 23 disposed near the bottom plate 18 and which is disposed away from the bottom plate 18, one of the permanent magnets 14 that faces the bottom plate 18, the outer magnetic pole 22 which is included in the pair of outer magnetic poles 22 and 23 disposed near the bottom plate 18 and which faces the bottom plate 18, one of the iron members 32 of the movable element 13 that faces the bottom plate 18, the inner magnetic pole 19 of the yoke 12, the other of the iron members 32 of the movable element 13 that is disposed away from the bottom plate 18, the outer magnetic pole 22 which is included in the pair of outer magnetic poles 22 and 23 disposed away from the bottom plate 18 and which faces the bottom plate 18, the other of the permanent magnets 14 that is disposed away from the bottom plate 18, the outer magnetic pole 23 which is included in the pair of outer magnetic poles 22 and 23 disposed away from the bottom plate 18 and which is disposed away from the bottom plate 18, and the outer cylindrical portion 17 in this order, are formed. As a result, a force F is applied to the movable element 13 to move the same toward the bottom plate 18.

Because the direction of the current supplied to the coil 15 is alternated, such an operation is repeated, the movable element 13 reciprocates with respect to the yoke 12 in the axial direction.

According to the fifth embodiment explained above, because the plural sets of permanent magnet 14 and outer magnetic poles 22 and 23 arranged in the direction of reciprocation of the movable element 13 are provided in the yoke 12, and plural iron members 32 arranged in the direction of reciprocation of the movable element 13 are provided in the movable element 13, a greater thrust can be applied to the movable element 13.

Moreover, because, at the radially outer portion of the inner magnetic pole 19 and between the permanent magnets 14 in the direction of reciprocation of the movable element 13, there is formed the annular groove 60 that is stepped so as to be concave, a further greater thrust can be applied to the movable element 13.

Figure 11:
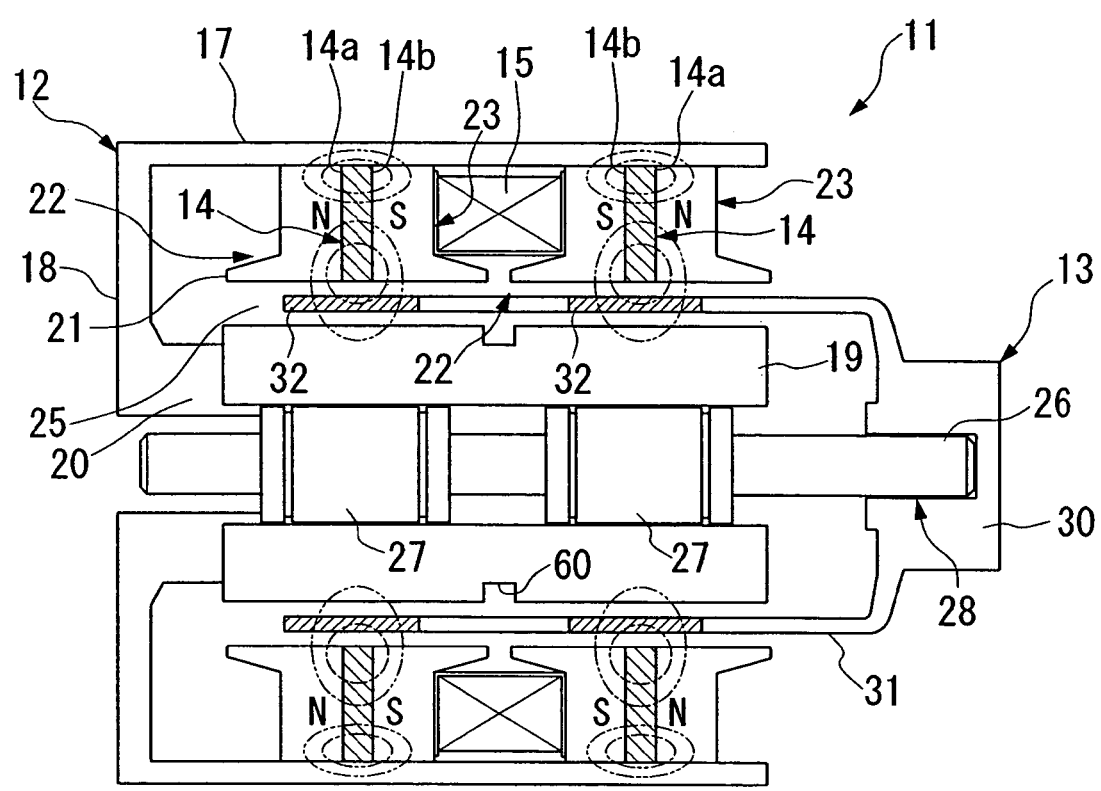
FIG. 11 is a side cross-sectional view showing an alternate example of the fifth embodiment of the liner actuator according to the present invention.

As shown in FIG. 11, the outer magnetic poles 22 and 23 may be formed separately from the outer cylindrical portion 17, and may be pressed into the outer cylindrical portion 17 with the permanent magnet 14.

In the fifth embodiment, plural sets of permanent magnet 14 and pair of outer magnetic poles 22 and 23 according to the first embodiment are arranged in the direction of reciprocation of the movable element 13, and plural iron members 32 arranged in the direction of reciprocation of the movable element 13 are provided in the movable element 13; however, plural sets of permanent magnets 14 and 37, outer magnetic poles 22 and 23, and inner magnetic poles 39 and 40 according to the second embodiment may be arranged in the direction of reciprocation of the movable element 13, and plural iron members 32 arranged in the direction of reciprocation may be provided in the movable element 13; plural sets of permanent magnets 14 and 45, outer magnetic poles 22 and 23, and inner magnetic poles 46 and 47 according to the third embodiment may be arranged in the direction of reciprocation of the movable element 13, and plural iron members 32 arranged in the direction of reciprocation may be provided in the movable element 13; or plural sets of pair of permanent magnets 37 and inner magnetic poles 39 and 40 according to the fourth embodiment may be arranged in the direction of reciprocation of the movable element 13, and plural iron members 32 arranged in the direction of reciprocation may be provided in the movable element 13.

Figure 12:
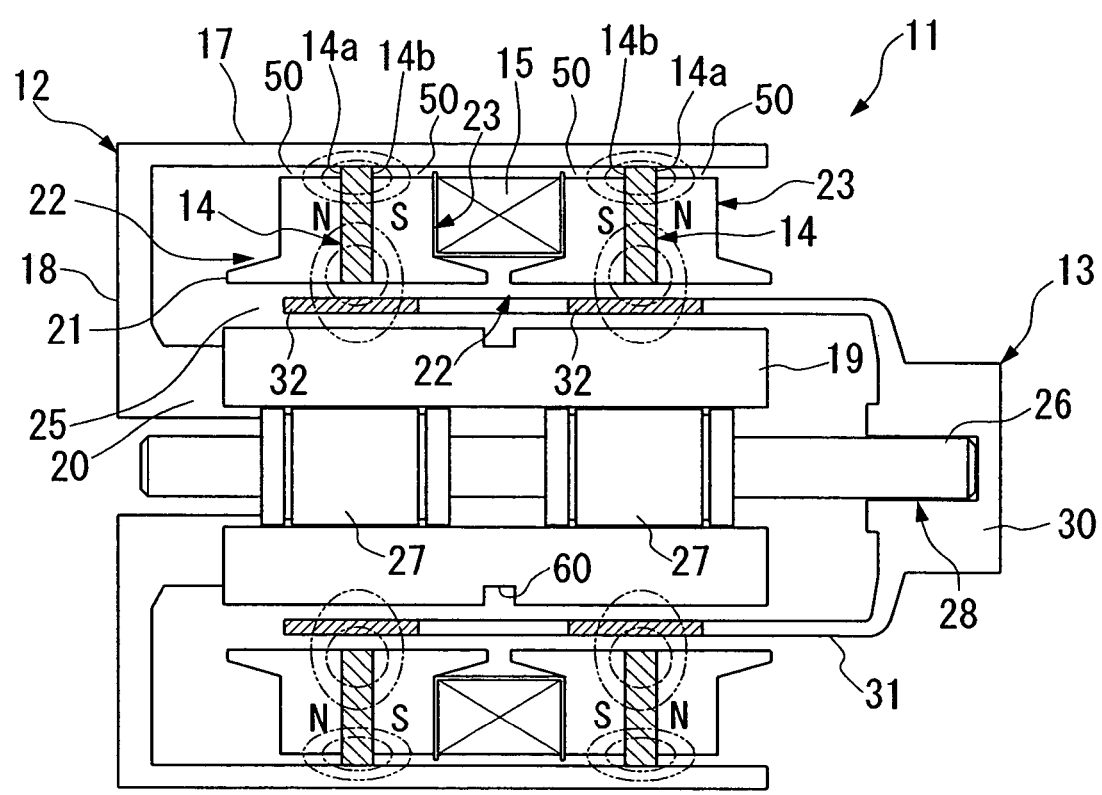
FIG. 12 is a side cross-sectional view showing a sixth embodiment of the liner actuator according to the present invention, in which magnetic fluxes under the condition in which electrical current does not flow through a coil are indicated by the two-dot chain lines.
Figure 13:
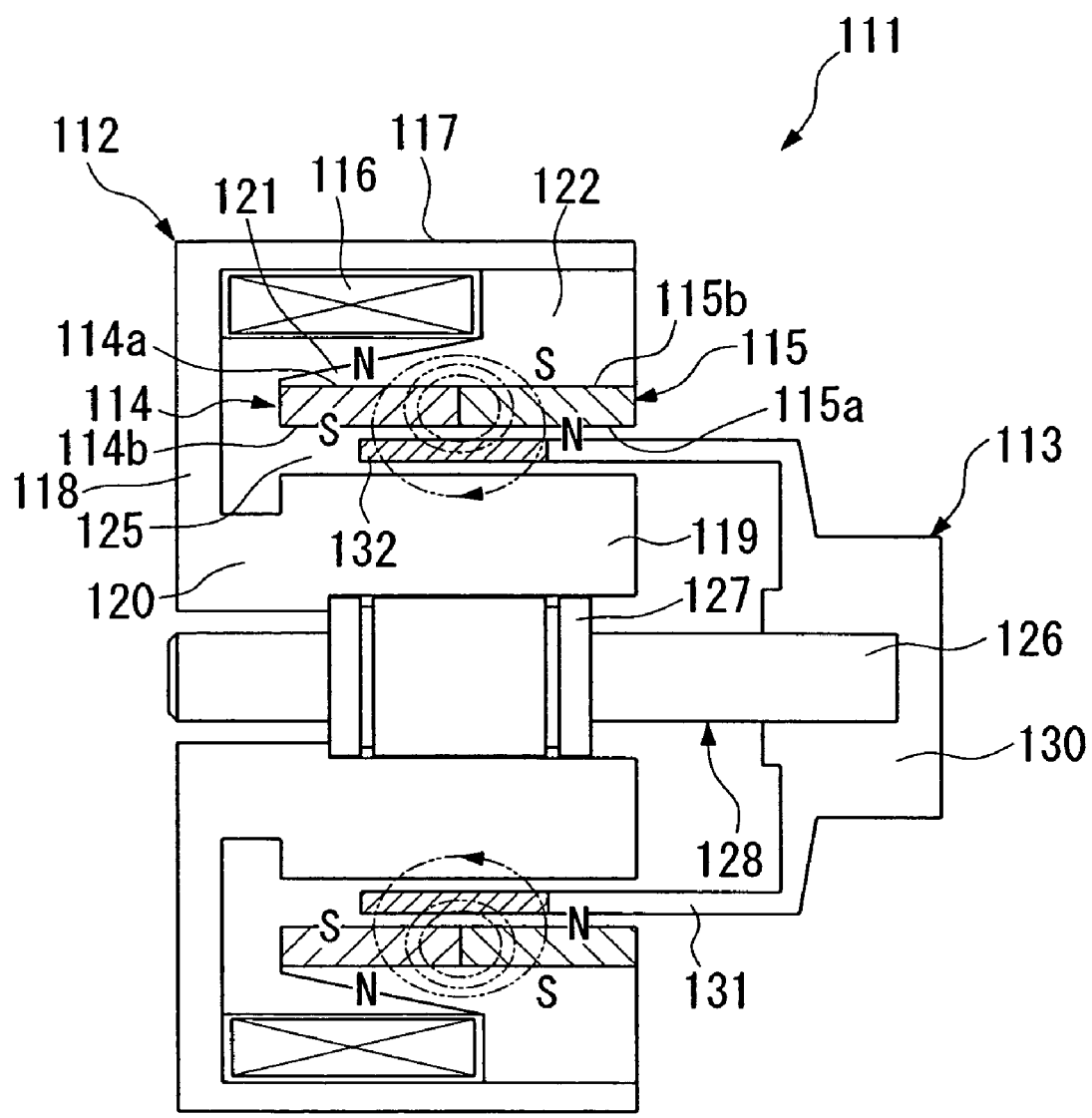
FIG. 13 is a side cross-sectional view showing a seventh embodiment of the liner actuator according to the present invention, in which magnetic fluxes under the condition in which electrical current does not flow through a coil are indicated by the two-dot chain lines.

Next, a sixth embodiment of the linear actuator according to the present invention, in particular, the difference from the fifth embodiment, will be mainly explained below with reference to FIG. 12. The same reference symbols are applied to the elements similar to that in the fifth embodiment, and explanations thereof are omitted.

In the sixth embodiment, with regard to the plural sets of permanent magnet 14 and pair of outer magnetic poles 22 and 23 arranged in the direction of reciprocation of the movable element 13, the outer diameters of the outer magnetic poles 22 and 23 are set to be less than that of the permanent magnet 14, and as a result, between the outer magnetic pole 22 and the outer cylindrical portion 17 of the yoke 12, and between the outer magnetic pole 23 and the outer cylindrical portion 17 of the yoke 12, there are formed annular gaps (magnetic gaps) 50 which are magnetic reluctance sections that act as magnetic reluctance against the magnetic flux loops which are formed by the magnetic force of the permanent magnet 14 through the outer cylindrical portion 17 of the yoke 12, the permanent magnet 14, and the pair of outer magnetic poles 22 and 23.

According to the sixth embodiment explained above, because the gaps 50 act as magnetic reluctance against the magnetic flux loops which are formed by the magnetic force of the permanent magnet 14 through the outer cylindrical portion 17 of the yoke 12, the permanent magnet 14, and the pair of outer magnetic poles 22 and 23, the number of magnetic fluxes generated by the permanent magnet 14 and running across the outer magnetic poles 22 and 23 and the iron member 32 can be increased. Accordingly, the magnetic fluxes generated by the permanent magnet 14 can be efficiently used for moving the iron member 32, i.e., for moving the movable element 13, and a sufficient and stable thrust can be applied to the movable element 13.

It is sufficient for the gaps 50 to be magnetic gaps between the outer magnetic poles 22 and 23 and the outer cylindrical portion 17 of the yoke 12; therefore, the gaps 50 may be air gaps or non-magnetic spacers. If non-magnetic spacers as the magnetic gaps are interposed between the outer magnetic poles 22 and 23 and the outer cylindrical portion 17, the outer magnetic poles 22 and 23 can be mechanically fixed to the outer cylindrical portion 17 by the non-magnetic spacers. The spacers may be made of plastic, aluminum, stainless steel, copper, or the like.

A seventh embodiment of the linear actuator according to the present invention will be explained below with reference to FIGS. 13 to 16.

A linear actuator 111 according to the seventh embodiment includes a yoke (stator) 112, a movable element 113 which is reciprocatable with respect to the yoke 112, a pair of permanent magnets 114 and 115 fixed to the yoke 112, and a coil 116 fixed to the yoke 112.

The yoke 112 includes an outer cylindrical portion 117 having a cylindrical shape, a bottom plate 118 having a thin ring shape and disposed at one side in the axial direction with respect to the outer cylindrical portion 117, a ring-shaped connection portion 120 extending in the axial direction from an inner portion of the bottom plate 118 toward the same side as the outer cylindrical portion 117 extends, a cylindrical inner magnetic pole (magnetic pole element) 119 provided on the connection portion 120 so as to be coaxial with the outer cylindrical portion 117.

The yoke 112 including the outer cylindrical portion 117, the bottom plate 118, the connection portion 120, and the inner magnetic pole 119 is integrally formed by sintering a sintering material which is a common magnetic material.

The coil 116 has a ring shape, and is fixed to the yoke 112 so as to be coaxial therewith in an inside corner portion where the bottom plate 118 merges with the outer cylindrical portion 117.

The permanent magnets 114 and 115 are cylindrical-shaped ferrite ring magnets whose axes, diameters, and lengths coincide with each other, and arranged side by side in the axial direction. The permanent magnets 114 and 115 are of radially anisotropic type having magnetic poles perpendicular to the axial direction, and the orientations of the magnetic poles thereof differ from each other. More specifically, with regard to the permanent magnet 114, the N-pole 114a is disposed radially outside, and the S-pole 114b is disposed radially inside, and with regard to the permanent magnet 115, the N-pole 115a is disposed radially inside, and the S-pole 115b is disposed radially outside. Radially outside the permanent magnets 114 and 115, there is disposed an annular-shaped outer magnetic pole (magnetic pole element) 122 having L-shaped cross section, which includes a cylindrical-shaped projecting portion 121 at radially inner portion thereof that projects in the axial direction, and which holds the permanent magnets 114 and 115 radially inside thereof. The outer magnetic pole 122 holding the permanent magnets 114 and 115 is, at the outer surface thereof, pressed into inside the outer cylindrical portion 117 of the yoke 112, so that the permanent magnets 114 and 115 and the outer magnetic pole 122 are fixed to the yoke 112 in a coaxial manner.

In this fixed state, the permanent magnets 114 and 115 are disposed at middle position in the radial direction of the yoke 112. The permanent magnet 114 is disposed near the bottom plate 118, and the permanent magnet 115 is disposed away from the bottom plate 118. The coil 116 is disposed adjacent to the outer magnetic pole 122 in the axial direction. In this fixed state, the permanent magnets 114 and 115, as a whole, are coaxially disposed outside the cylindrical-shaped inner magnetic pole 119 while being located at the same axial position as the inner magnetic pole 119b and having the same length as that of the inner magnetic pole 119, so as to form an annular gap 125 with the inner magnetic pole 119.

Radially inside the inner magnetic pole 119 of the yoke 112, a bushing 128, which supports a shaft 126 in a movable manner using a bushing 127, is coaxially fixed thereto at the bushing 127. The movable element 113 is fixed to the shaft 126 which is supported by the bushing 127 in a movable manner. The shaft 126 and the movable element 113 together reciprocate along the axial direction with respect to the bushing 127 that is fixed to the yoke 112.

The movable element 113 includes a base portion 130, a cylindrical portion 131, and an iron member 132. The base portion 30 has a substantially circular plate shape and is fixed to the shaft 26. The cylindrical portion 131 is disposed in the gap 125 in a state in which the base plate 130 is fixed to the shaft 126. The iron member 132, as a movable magnetic pole, has the same diameter as that of the cylindrical portion 131, and is coaxially fixed to the cylindrical portion 131 at a position opposite to the base portion 130. Accordingly, the iron member 132 of the movable element 113 is coaxially disposed in the gap 125, and the central position of the iron member 132 in the axial direction substantially coincides with the boundary between the permanent magnets 114 and 115.

In the movable element 113, the base portion 130 and the cylindrical portion 131 are made of synthetic resin such as an engineering plastic, which is a non-magnetic material, and the iron member 132 is made of a sintering and magnetic material which has not been magnetized. The movable element 113 is made using a synthetic resin insert formation method in which the iron member 132 is used as an insert.

As a result, the movable element 113 having the iron member 132 is supported by the yoke 112 in a manner recipocatable along the axial direction (i.e., the right-and-left direction in the drawings), and the pair of permanent magnets 114 and 115 fixed to the yoke 112 in such a manner that the permanent magnets 114 and 115 are arranged side by side in the direction of reciprocation of the movable element 113 while being opposed to the iron member 132, magnetic poles thereof are arranged in a direction perpendicular to the direction of reciprocation, and orientations of the magnetic poles thereof differ from each other. The outer magnetic pole 122 is disposed at outside the movable element 113, and the inner magnetic pole 119, which is disposed so as to be opposed to the iron member 132 and is disposed at a position opposite to the permanent magnets 114 and 115, is integrally formed in the yoke 112. Moreover, the pair of permanent magnets 114 and 115 is disposed at only one side of the iron member 132, and more specifically, the pair of permanent magnets 114 and 115 is disposed only radially outside the cylindrical-shaped iron member 132. Furthermore, the coil 116 is disposed radially outside the cylindrical-shaped iron member 132 and the pair of permanent magnets 114 and 115.

Figure 14:
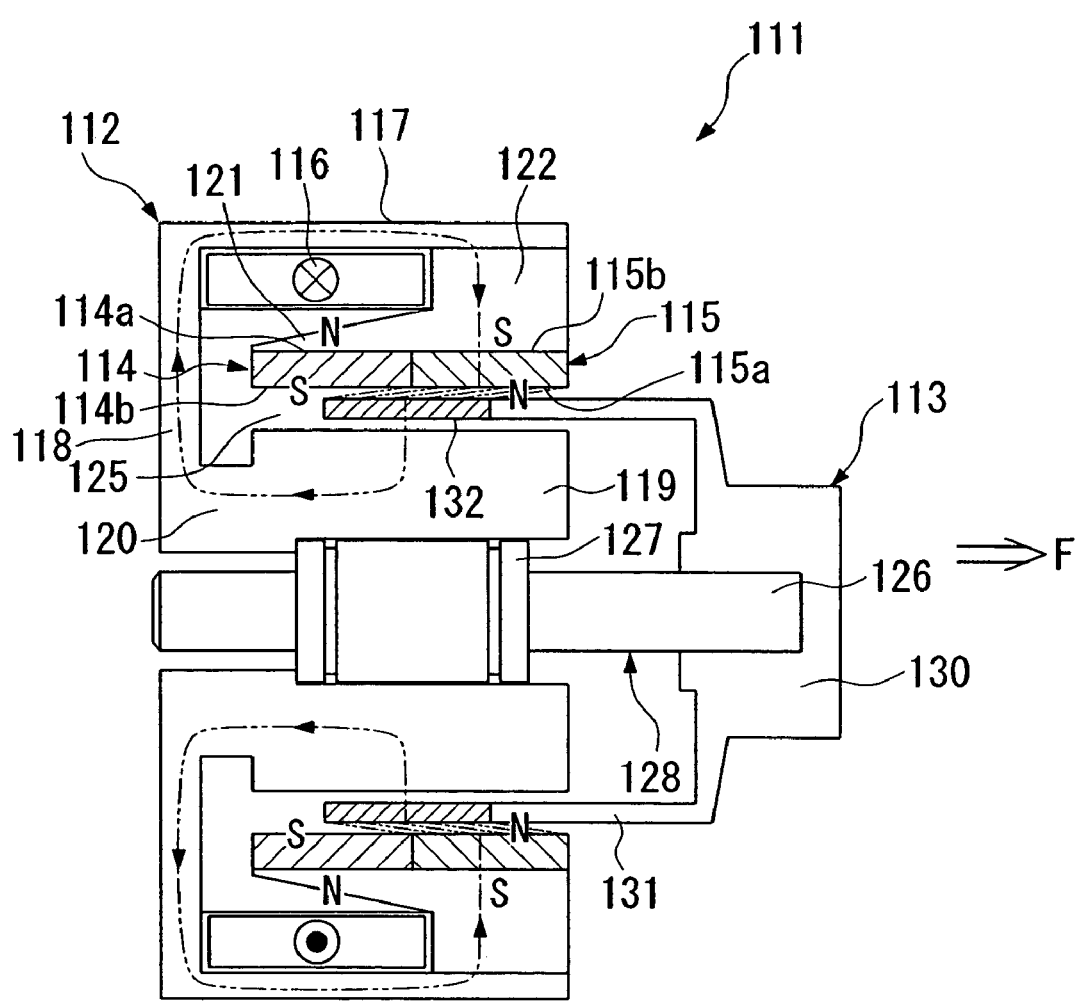
FIG. 14 is a side cross-sectional view showing the seventh embodiment of the liner actuator according to the present invention, in which magnetic fluxes under the condition in which electrical current flows through the coil in one direction are indicated by the two-dot chain lines.
Figure 15:
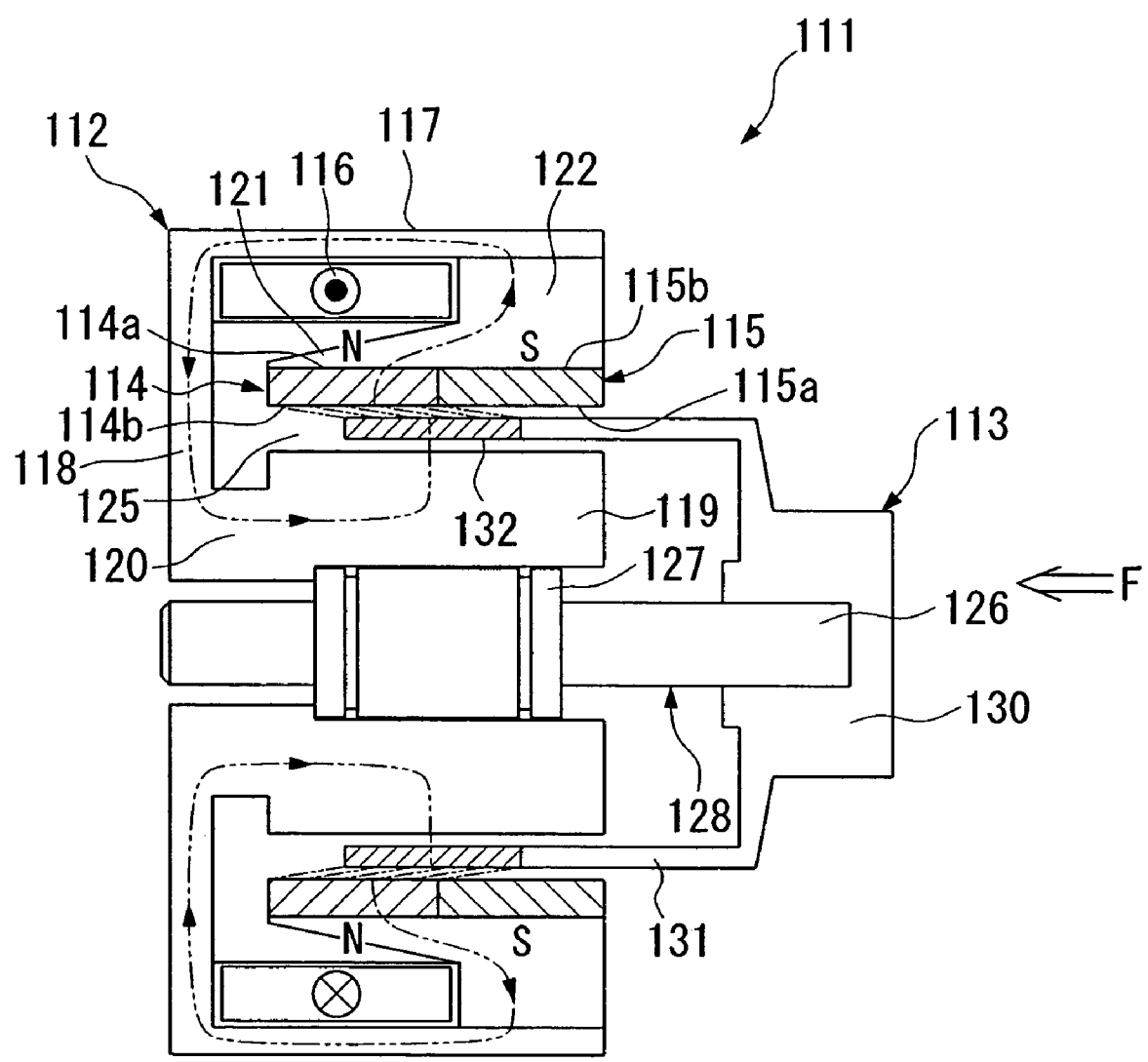
FIG. 15 is a side cross-sectional view showing the seventh embodiment of the liner actuator according to the present invention, in which magnetic fluxes under the condition in which electrical current flows through the coil in the opposite direction are indicated by the two-dot chain lines.

In the linear actuator 111 having the above structure, when alternating current (sinusoidal wave current or rectangular wave current) is supplied to the coil 116, and when the current flows through the coil 116 in a predetermined direction, due to the magnetic fluxes running from the S-pole 115b to the N-pole 115a in the permanent magnet 115 as indicated by the two-dot chain lines in FIG. 14, magnetic flux loops, which run through the outer cylindrical portion 117 of the yoke 112, the outer magnetic pole 122, the permanent magnet 115, the iron member 132 of the movable element 113, the inner magnetic pole 119 of the yoke 112, the connection portion 120, the bottom plate 118, and the outer cylindrical portion 117 in this order, are formed. As a result, a force F is applied to the movable element 113 to move the same toward the permanent magnet 115. On the other hand, when the current flows through the coil 116 in a direction opposite to the predetermined direction, due to the magnetic fluxes running from the S-pole 114b to the N-pole 114a in the permanent magnet 114 as indicated by the two-dot chain lines in FIG. 15, magnetic flux loops, which run through the outer cylindrical portion 117 of the yoke 112, the bottom plate 118, the connection portion 120, the inner magnetic pole 119, the iron member 132 of the movable element 113, the permanent magnet 114, the outer magnetic pole 122, and the outer cylindrical portion 117 in this order, are formed. As a result, a force F is applied to the movable element 113 to move the same toward the permanent magnet 114, in contrast to the above case.

Because the direction of the current supplied to the coil 116 is alternated, such an operation is repeated, and the movable element 113 reciprocates with respect to the yoke 112 in the axial direction.

According to the linear actuator 111 of the seventh embodiment explained above, the iron member 132 is provided in the movable element 113, the coil 116 is provided in the yoke 112, the pair of permanent magnets 114 and 115 fixed to the yoke 112 in such a manner that the permanent magnets 114 and 115 are arranged side by side in the direction of reciprocation of the movable element 113 while being opposed to the iron member 132, magnetic poles thereof are arranged in a direction perpendicular to the direction of reciprocation, and orientations of the magnetic poles thereof differ from each other, and when the direction of electrical current flowing through the coil 116 fixed to the yoke 112 is alternated, the entries of the magnetic fluxes into the iron member 132 are alternated in the pair of permanent magnets 114 and 115, the iron member 132, i.e., the movable element 113 reciprocates. As a result, the movable element 113 can be reciprocated with a simple structure.

As explained above, because the coil 115 is provided not in the movable element 113, but in the yoke 112, electrical current does not have to be supplied to the movable element 113; therefore, the feeder lines connected to the coil 116 will not be broken due to the movement of the movable element 113. Accordingly, reliability in a continuous operation or the like can be improved.

Moreover, because the permanent magnets 114 and 115 are also provided not in the movable element 113, but in the yoke 112, the weight of the movable element 113 will not be increased even when the weighs of the permanent magnets 114 and 115 are increased in order to obtain high magnetic flux density for improvement in performance. Accordingly, it is easy to obtain improved performance (increased thrust). In addition, in order to increase the magnetic flux density in the gap 125, just the size of the magnet in the radial direction should be increased, which does not affect on the gap 125 (i.e., the gap 125 does not have to be increased), and thus higher performance and increased design freedom can be obtained.

In addition because the movable element 113 does not include a magnet, a magnetizing operation does not have to be applied to the movable element 113. Moreover, because the iron member 132 does not exhibit attracting force during a manufacturing process, it is easy to integrally form the movable element 113. Accordingly, the manufacturing process is simplified, which leads to reduction in cost. Moreover, if the movable element 113 is made using a synthetic resin insert formation method in which the iron member 132 is used as an insert, the movable element 113 does not include a magnet; therefore an additional machining can be applied, and the coaxial accuracy of the linear actuator 111 can be improved. As a result, a load applied to the bearing, i.e., to the bushing 128, can be reduced, and the operation life of the bushing 128 can be increased.

Moreover, because the pair of permanent magnets 114 and 115 is disposed at only one side of the iron member 132, the overall weight can be reduced.

In addition, because the coil 116 is disposed radially outside the cylindrical iron member 132 and the pair of permanent magnets 114 and 115, the radius of the iron member 132, i.e., the radius of the movable element 113 can be reduced, and in particular, the weight of the movable element 113 can be reduced.

Furthermore, because the inner magnetic pole 119, which is disposed so as to be opposed to the iron member 132 and is disposed at a position opposite to the permanent magnets 114 and 115, is integrally formed in the yoke 112, a connecting operation after forming separately doe not have to be performed. Accordingly, the manufacturing process is further simplified.

In addition, because the movable element 113 is made using a synthetic resin insert formation method in which the iron member 132 is used as an insert, the movable element 113 including the iron member 132 can be easily manufactured and can be made light.

Furthermore, because the movable element 113 is supported by the yoke 112 having the ball bushing 128 intervening therebetween, the movable element 113 reciprocates accurately.

In addition, the yoke 112 is made of a sintering material, cost can be reduced, performance can be improved (iron loss can be reduced), and mechanical strength can be increased. When the yoke 112 is made of compacted iron powder, the same effects can be obtained.

The base portion 130 and the cylindrical portion 131 of the movable element 113 do not have to be made of synthetic resin, and may be made of aluminum die-cast, non-magnetic stainless steel, etc., as long as non-magnetic material is used. In this case, a merit is obtained in that stiffness can be increased. However, it is preferable to use synthetic resin is terms of weight reduction.

For the permanent magnets 114 and 115, in addition to a ferrite magnet, a magnet made of rare earth element such as neodymium or samarium cobalt, or plastic magnet may be used; however, it is preferable to use the ferrite magnet in terms of reduction in cost.

In addition, the bearing for the movable element 113 may be, in addition to the bushing, an air gearing (a gas bearing), a sliding bearing, etc. However, it is preferable to use a bushing 28 because it makes it possible to reciprocate the movable element 113 more accurately.

Moreover, the linear actuator 111 may further include a spring provided on the movable unit, or the linear actuator 111 may be used with a spring disposed outside thereof for utilizing a resonance phenomenon, which are general practice of usage; however, the linear actuator 111 may be used as it is.

The linear actuator 111 may be used as a linear servo actuator, which is capable of controlling speed and position, by providing position and speed sensors thereon, and by executing a closed-loop control.

The end portions of the inner magnetic pole 119 and the outer magnetic pole 122 may be chamfered in order to improve performance such as displacement characteristics.

In addition, the inner magnetic pole 119, outer magnetic pole 122, and the iron member 132 may be made of stacked electrical steel sheets, instead of the sintering material, in order to reduce iron loss during a high speed operation.

Figure 16:
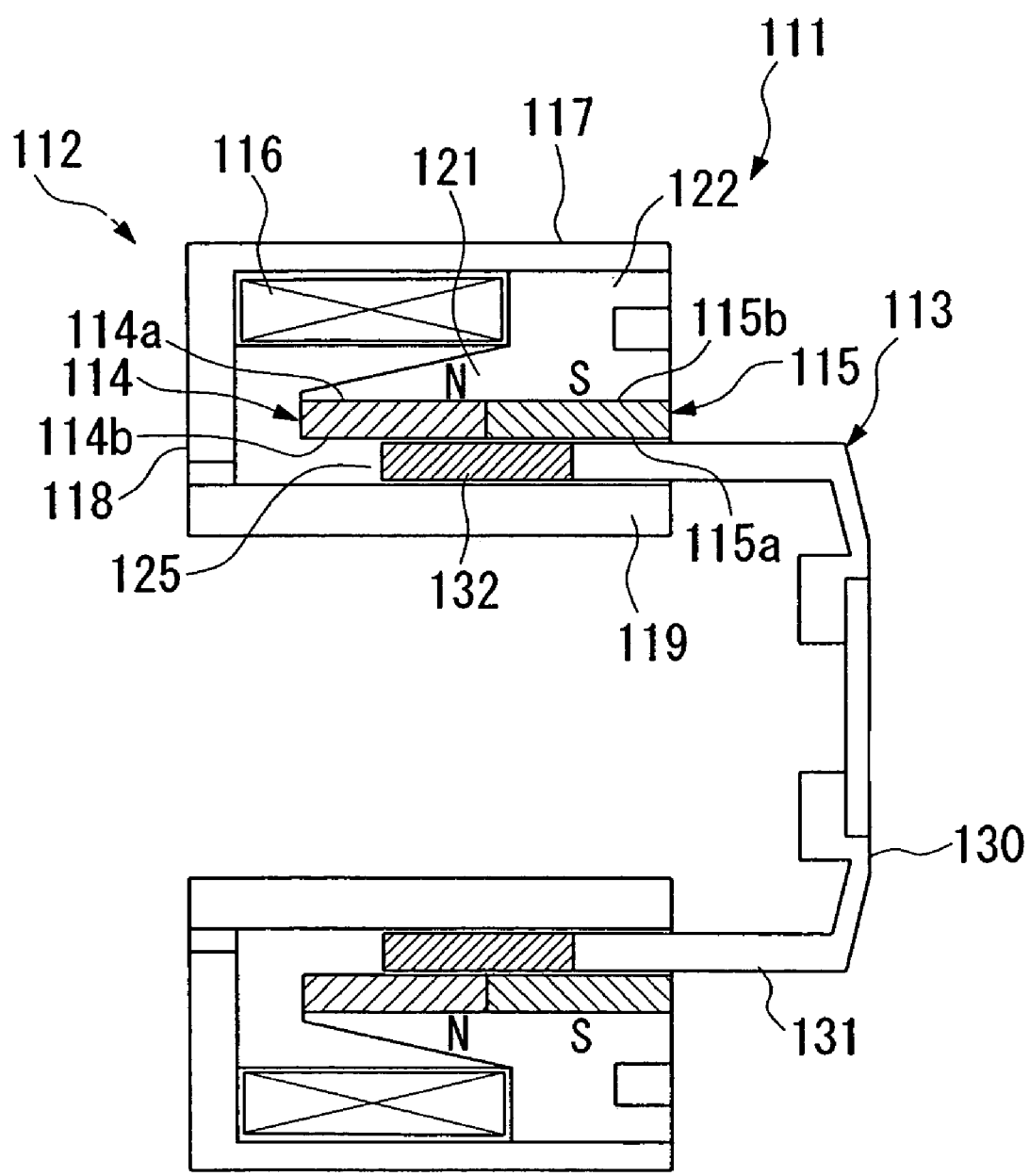
FIG. 16 is a side cross-sectional view showing an alternate example of the seventh embodiment of the liner actuator according to the present invention.

Furthermore, as shown in FIG. 16, a structure may be employed in which the movable element 113 is not supported by the yoke 112 using the bushing 128 or the like.

Figure 17:
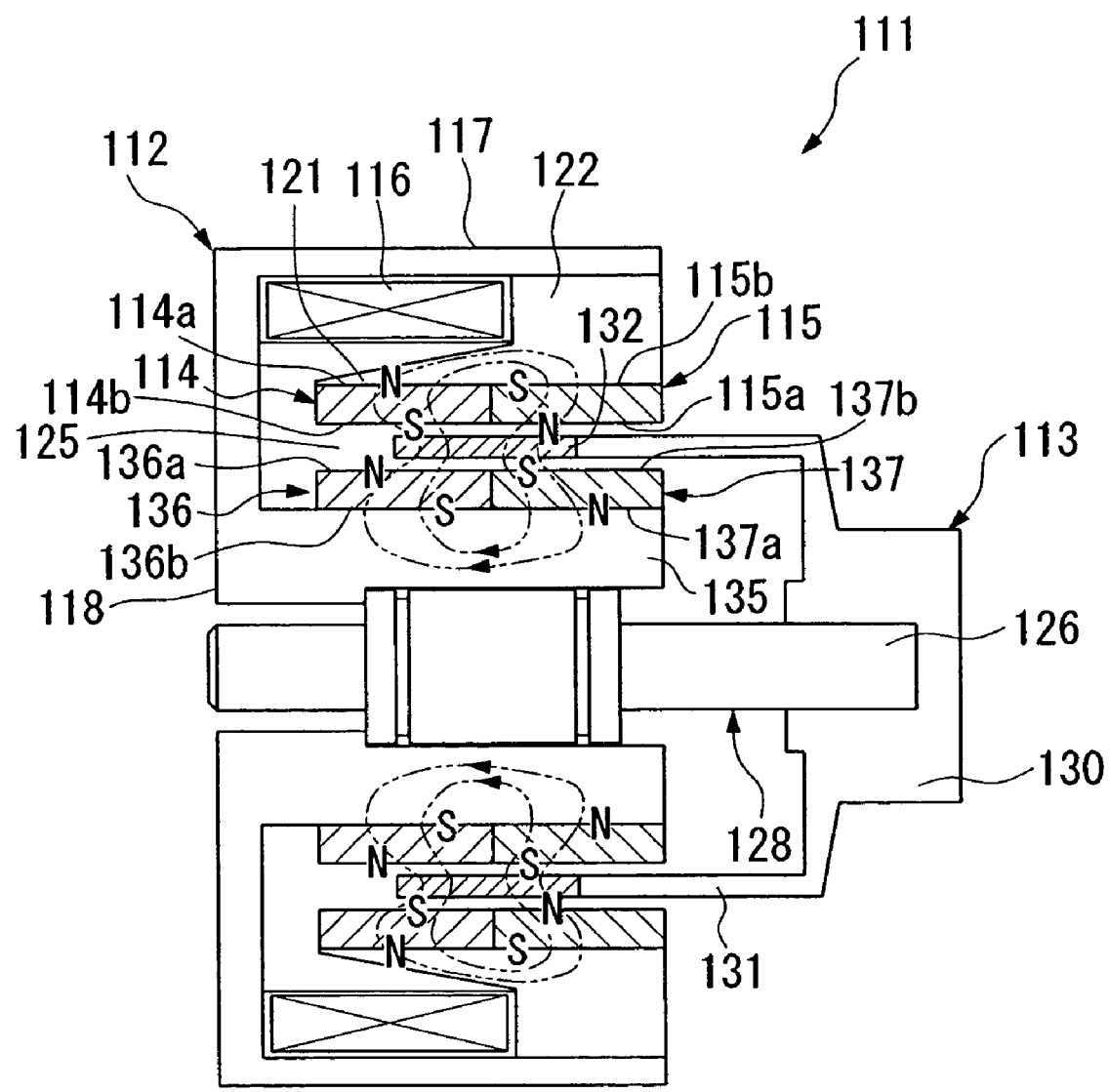
FIG. 17 is a side cross-sectional view showing an eighth embodiment of the liner actuator according to the present invention, in which magnetic fluxes under the condition in which electrical current does not flow through a coil are indicated by the two-dot chain lines.

Next, an eighth embodiment of the linear actuator according to the present invention will be explained below with reference to FIG. 17. The same reference symbols are applied to the elements similar to that in the seventh embodiment, and explanations thereof are omitted.

In the linear actuator 111 of the eighth embodiment, instead of the connection portion 120 and the inner magnetic pole 119, an inner cylindrical portion 135, which is disposed so as to be coaxial with the outer cylindrical portion 117, is integrally formed at the radially inner portion of the yoke 112.

In addition to at the outer portion, at the inner portion as well, there are provided permanent magnets 136 and 137 which are cylindrical-shaped ferrite ring magnets whose axes, diameters, and lengths coincide with each other, and arranged side by side in the axial direction. The permanent magnets 136 and 137 are of radially anisotropic type having magnetic poles perpendicular to the axial direction, and the orientations of the magnetic poles thereof differ from each other. More specifically, with regard to the permanent magnet 136, the N-pole 136a is disposed radially outside, and the S-pole 136b is disposed radially inside, and with regard to the permanent magnet 137, the N-pole 137a is disposed radially inside, and the S-pole 137b is disposed radially outside. The permanent magnets 136 and 137, which are arranged side by side in the axial direction, are pressed onto the inner cylindrical portion 135 so as to be fixed to the yoke 112 in a coaxial manner.

In this fixed state, the permanent magnet 136 is disposed near the bottom plate 118, and the permanent magnet 137 is disposed away from the bottom plate 118. In this fixed state, the permanent magnets 136 and 137, as a whole, are coaxially disposed inside the permanent magnets 114 and 115, while the permanent magnet 136 is located at the same axial position as the outer permanent magnet 114 and has the same length as that of the outer permanent magnet 114, and the permanent magnet 137 is located at the same axial position as the outer permanent magnet 115 and has the same length as that of the outer permanent magnet 115. An annular gap 125 is formed between the pair of permanent magnets 114 and 115 and the pair of permanent magnets 136 and 137.

Radially inside the inner cylindrical portion 135 of the yoke 112, a bushing 128, which supports a shaft 126 in a movable manner using a bushing 127, is coaxially fixed thereto at the bushing 127. The iron member 132, as a cylindrical and movable magnetic pole of the movable element 113 fixed to the shaft 126 is disposed in the gap 125 between the permanent magnets 114 and 115 and the permanent magnets 136 and 137 as in the seventh embodiment.

The linear actuator 111 in the eighth embodiment explained above achieves the same effects as that achieved in the seventh embodiment. In addition, because the pair of permanent magnets 114 and 115 and the pair of permanent magnets 136 and 137 are respectively disposed at both side of the iron member 132, a stronger magnetic field due to the permanent magnets and a greater magnetomotive force due to electrical current can be obtained.

Figure 18:
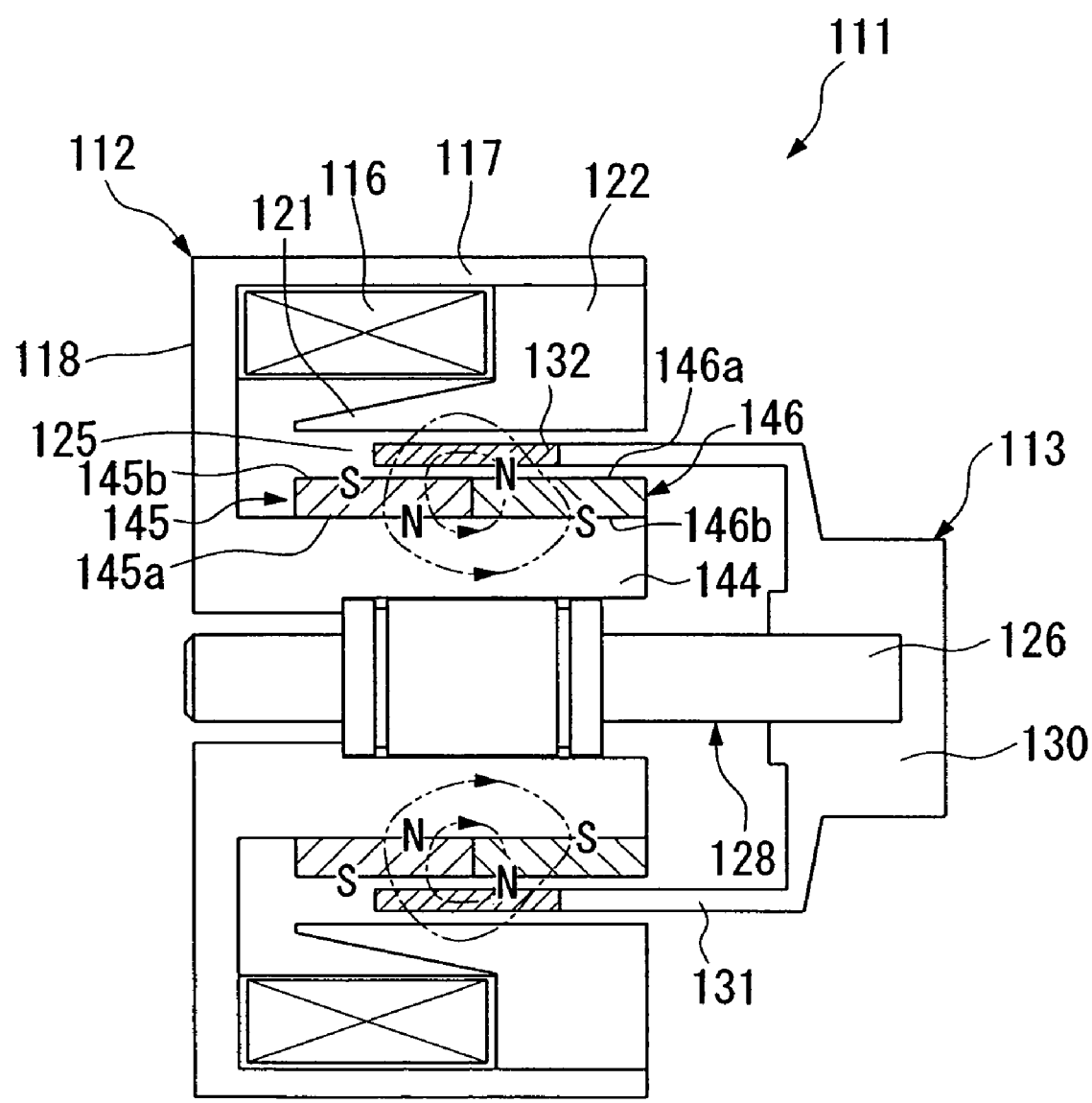
FIG. 18 is a side cross-sectional view showing a ninth embodiment of the liner actuator according to the present invention, in which magnetic fluxes under the condition in which electrical current does not flow through a coil are indicated by the two-dot chain lines.

Next, a ninth embodiment of the linear actuator according to the present invention will be explained below with reference to FIG. 18. The same reference symbols are applied to the elements similar to that in the seventh embodiment, and explanations thereof are omitted.

In the linear actuator 111 of the ninth embodiment, instead of the connection portion 120 and the inner magnetic pole 119, an inner cylindrical portion 144, which is disposed so as to be coaxial with the outer cylindrical portion 117, is integrally formed at the radially inner portion of the yoke 112.

Instead of at the outer portion, at the inner portion, there are provided permanent magnets 145 and 146 which are cylindrical-shaped ferrite ring magnets whose axes, diameters, and lengths coincide with each other, and arranged side by side in the axial direction. The permanent magnets 145 and 146 are of radially anisotropic type having magnetic poles perpendicular to the axial direction, and the orientations of the magnetic poles thereof differ from each other. More specifically, with regard to the permanent magnet 145, the N-pole 145a is disposed radially inside, and the S-pole 145b is disposed radially outside, and with regard to the permanent magnet 146, the N-pole 146a is disposed radially outside, and the S-pole 146b is disposed radially inside. The permanent magnets 145 and 146, which are arranged side by side in the axial direction, are pressed onto the inner cylindrical portion 144 so as to be fixed to the yoke 112 in a coaxial manner.

In this fixed state, the permanent magnet 145 is disposed near the bottom plate 118, and the permanent magnet 146 is disposed away from the bottom plate 118. In this fixed state, the permanent magnets 145 and 146, as a whole, are coaxially disposed inside the outer magnetic pole 122 in which permanent magnets are not provided, and are located at the same axial position as the outer magnetic pole 122 and have the same length as that of the outer magnetic pole 122. An annular gap 125 is formed between the outer magnetic pole 122, in which permanent magnets are not provided, and the pair of permanent magnets 145 and 146.

Radially inside the inner cylindrical portion 144 of the yoke 112, a bushing 128, which supports a shaft 126 in a movable manner using a bushing 127, is coaxially fixed thereto at the bushing 127. The iron member 132, as a cylindrical and movable magnetic pole of the movable element 113 fixed to the shaft 126 is disposed in the gap 125 between the outer magnetic pole 122 and the permanent magnets 145 and 146, as in the seventh embodiment. In this case, a magnet made of rare earth element is preferably used for the permanent magnets 145 and 146.

The linear actuator 111 in the ninth embodiment explained above achieves the same effects as that achieved in the first embodiment. In addition, the amount of magnets can be reduced.

Figure 19:
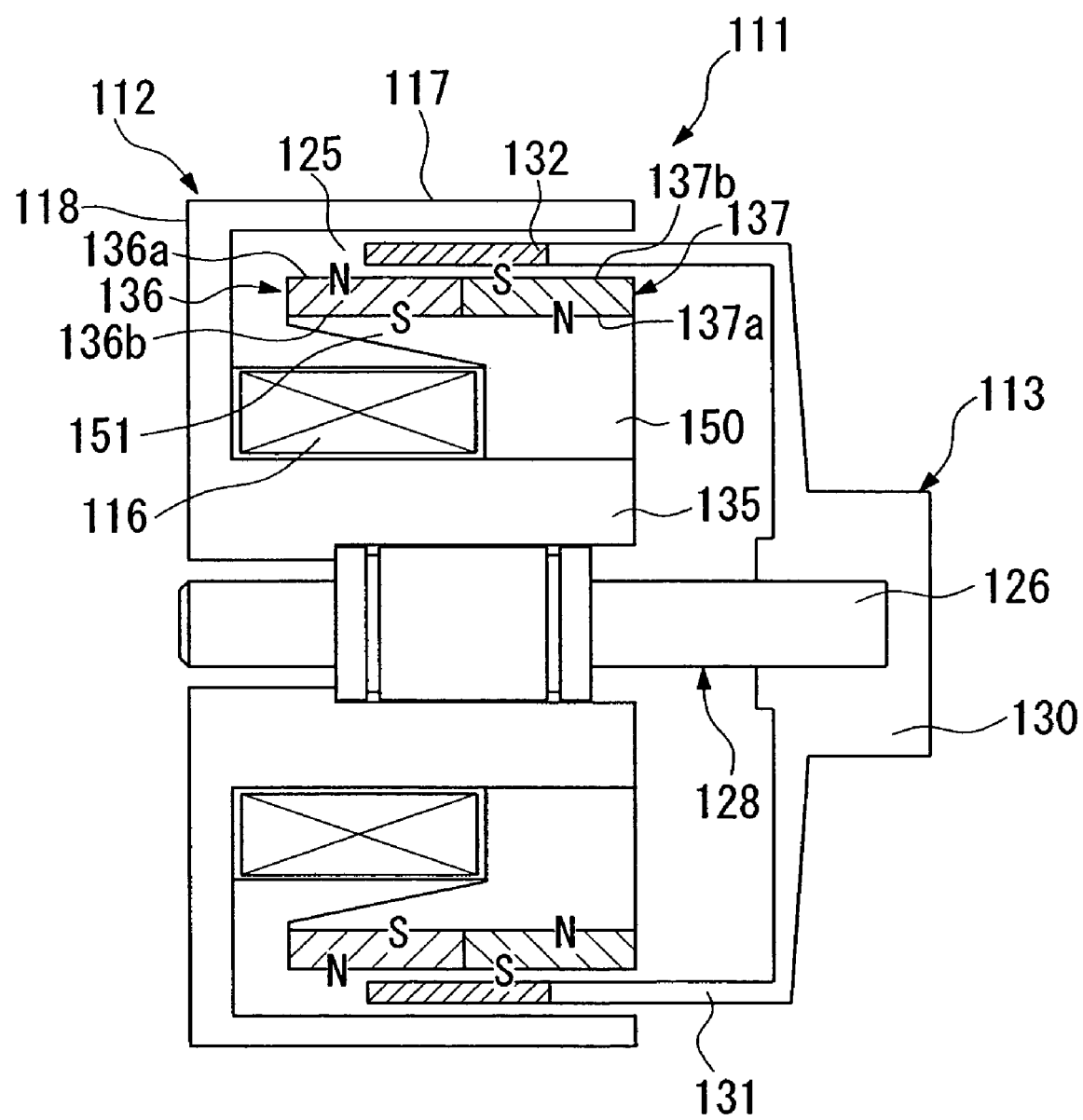
FIG. 19 is a side cross-sectional view showing a tenth embodiment of the liner actuator according to the present invention.

Next, a tenth embodiment of the linear actuator according to the present invention will be explained below with reference to FIG. 19. The same reference symbols are applied to the elements similar to that in the seventh embodiment, and explanations thereof are omitted.

In the linear actuator 111 of the ninth embodiment, instead of the connection portion 120 and the inner magnetic pole 119, an inner cylindrical portion 135, which is disposed so as to be coaxial with the outer cylindrical portion 117, is integrally formed at the radially inner portion of the yoke 112.

The coil 116 has a ring shape, and is fixed to the yoke 112 so as to be coaxial therewith in an inside corner portion where the bottom plate 118 merges with the inner cylindrical portion 135.

Instead of at the outer portion, at the inner portion, there are provided permanent magnets 136 and 137 which are cylindrical-shaped ferrite ring magnets whose axes, diameters, and lengths coincide with each other, and arranged side by side in the axial direction. The permanent magnets 136 and 137 are of radially anisotropic type having magnetic poles perpendicular to the axial direction, and the orientations of the magnetic poles thereof differ from each other. More specifically, with regard to the permanent magnet 136, the N-pole 136a is disposed radially outside, and the S-pole 136b is disposed radially inside, and with regard to the permanent magnet 137, the N-pole 137a is disposed radially inside, and the S-pole 137b is disposed radially outside. Radially inside the permanent magnets 136 and 137, there is disposed an annular-shaped inner magnetic pole (magnetic pole element) 150 having L-shaped cross section, which includes a cylindrical-shaped projecting portion 151 at radially outer portion thereof that projects in the axial direction, and which holds the permanent magnets 136 and 137 radially inside thereof. The outer magnetic pole 150 holding the permanent magnets 136 and 137 is, at the inner surface thereof, pressed into inside the outer cylindrical portion 135 of the yoke 112, so that the permanent magnets 136 and 137 and the outer magnetic pole 122 are fixed to the yoke 112 in a coaxial manner.

In this fixed state, the permanent magnet 136 is disposed near the bottom plate 118, and the permanent magnet 137 is disposed away from the bottom plate 118. An annular gap 125 is formed between the pair of permanent magnets 136 and 137 and the outer cylindrical portion 117.

Radially inside the inner cylindrical portion 135 of the yoke 112, a ball bushing 128, which supports a shaft 126 in a movable manner using a bushing 127, is coaxially fixed thereto at the bushing 127. The iron member 132, as a cylindrical and moveable magnetic pole, of the movable element 113 fixed to the shaft 126 is disposed in the gap 125 between the permanent magnets 136 and 137 and the outer cylindrical portion 117, as in the seventh embodiment. In this case, the coil 116 is disposed radially inside the cylindrical iron member 132 and the permanent magnets 136 and 137.

The linear actuator 111 in the tenth embodiment explained above achieves the same effects as that achieved in the first embodiment. In addition, because the coil 116 is disposed radially inside the cylindrical iron member 132 and the permanent magnets 136 and 137, the weight of the coil 116 can be reduced, and thus the overall weight can be reduced.

Figure 20:
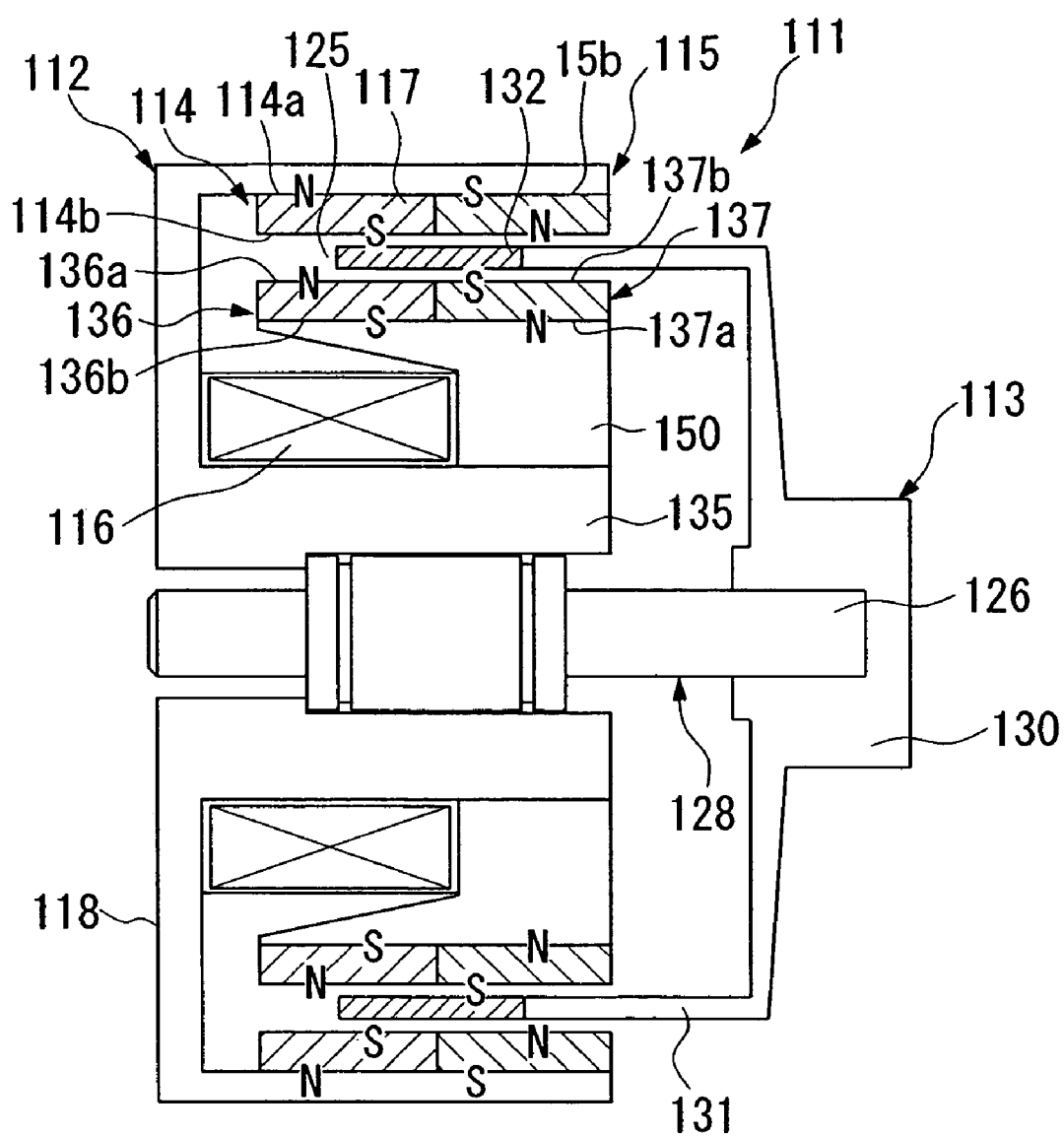
FIG. 20 is a side cross-sectional view showing an eleventh embodiment of the liner actuator according to the present invention.

Next, an eleventh embodiment of the linear actuator according to the present invention will be explained below with reference to FIG. 20. The same reference symbols are applied to the elements similar to that in the tenth embodiment, and explanations thereof are omitted.

In the linear actuator 111 of the eleventh embodiment, in addition to at the inner portion of the yoke 112, at the outer portion as well, there are provided permanent magnets 114 and 115 which are cylindrical-shaped ferrite ring magnets whose axes, diameters, and lengths coincide with each other, and arranged side by side in the axial direction. The permanent magnets 114 and 115 are of radially anisotropic type having magnetic poles perpendicular to the axial direction, and the orientations of the magnetic poles thereof differ from each other. More specifically, with regard to the permanent magnet 114, the N-pole 114a is disposed radially outside, and the S-pole 114b is disposed radially inside, and with regard to the permanent magnet 115, the N-pole 115a is disposed radially inside, and the S-pole 115b is disposed radially outside. The permanent magnets 114 and 115, which are arranged side by side in the axial direction, are pressed onto the inner cylindrical portion 135 so as to be fixed to the yoke 112 in a coaxial manner.

In this fixed state, the permanent magnet 114 is disposed near the bottom plate 118, and the permanent magnet 115 is disposed away from the bottom plate 118. In this fixed state, the permanent magnets 114 and 115, as a whole, are coaxially disposed outside the permanent magnets 136 and 137, while the permanent magnet 114 is located at the same axial position as the inner permanent magnet 136 and has the same length as that of the inner permanent magnet 136, and the permanent magnet 115 is located at the same axial position as the inner permanent magnet 137 and has the same length as that of the inner permanent magnet 137. An annular gap 125 is formed between the pair of permanent magnets 114 and 115 and the pair of permanent magnets 136 and 137.

The iron member 132, as a cylindrical and moveable magnetic pole, of the movable element 113 fixed to the shaft 126 is disposed in the gap 125 between the permanent magnets 114 and 115 and the permanent magnets 136 and 137, as in the tenth embodiment.

According to the linear actuator 111 in the eleventh embodiment explained above, because the coil 116 is disposed radially inside the cylindrical iron member 132 and the permanent magnets 136 and 137, the weight of the coil 116 can be reduced, and thus the overall weight can be reduced. In addition, because the pair of permanent magnets 114 and 115 and the pair of permanent magnets 136 and 137 are respectively disposed at both side of the iron member 132, a stronger magnetic field due to the permanent magnets and a greater magnetomotive force due to electrical current can be obtained.

Figure 21:
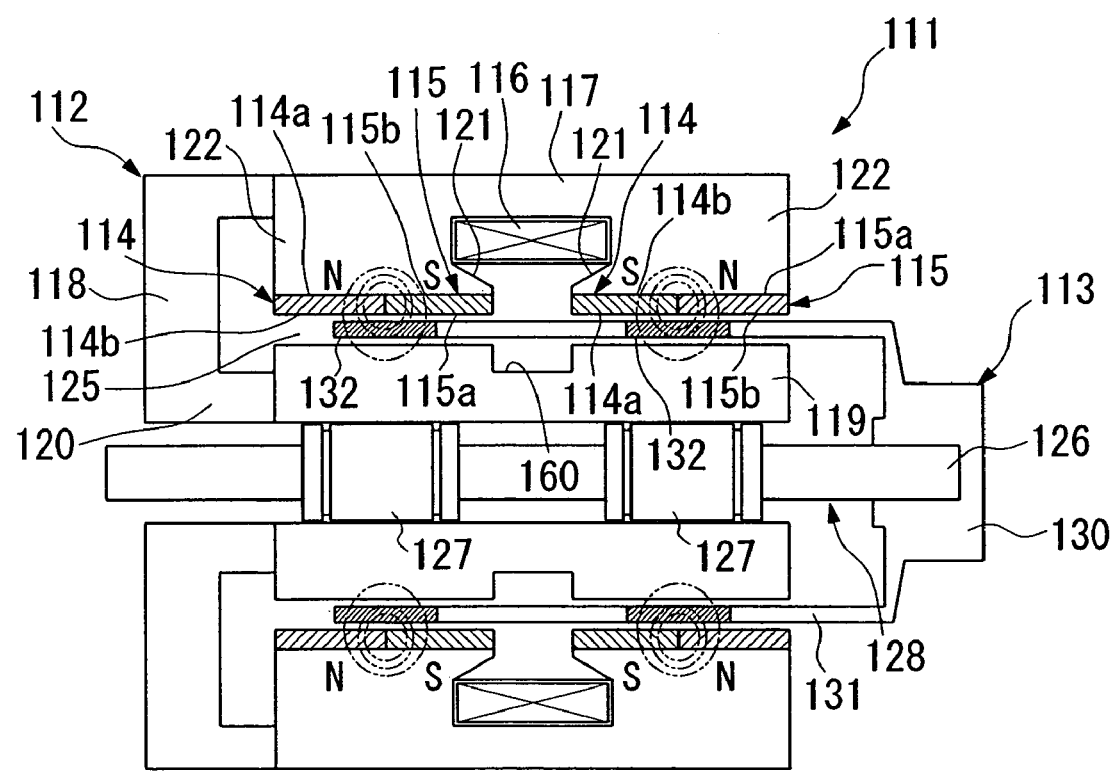
FIG. 21 is a side cross-sectional view showing a twelfth embodiment of the liner actuator according to the present invention, in which magnetic fluxes under the condition in which electrical current does not flow through a coil are indicated by the two-dot chain lines.

Next, a twelfth embodiment of the linear actuator according to the present invention, in particular, the difference from the seventh embodiment, will be mainly explained below with reference to FIGS. 21 to 23. The same reference symbols are applied to the elements similar to that in the seventh embodiment, and explanations thereof are omitted.

In the twelfth embodiment, plural, more specifically, two outer magnetic poles 122 are provided along the direction of reciprocation of the movable element 113, and in addition, the outer cylindrical portion 117 of the yoke 112 and two outer magnetic poles 122 are integrally formed by sintering a sintering material which is a common magnetic material.

Two outer magnetic poles 122 respectively have projecting portions 121 that are opposed to each other, and the coil 116 is disposed between two outer magnetic poles 122. Each of the outer magnetic poles 122 is provided with the pair of permanent magnets 114 and 115. In other words, plural sets, and more specifically, two sets of pair of permanent magnets 114 and 115 are arranged in the direction of reciprocation of the movable element 113.

In each pair of permanent magnets 114 and 115, orientations of the magnetic poles of the permanent magnets differ from each other, and in addition, orientations of the magnetic poles of the pairs of permanent magnets also differ from each other. More specifically, with regard to the pair of permanent magnets 114 and 115 disposed near the bottom plate 118, the N-pole 114a of the permanent magnet 114 disposed near the bottom plate 118 is disposed radially outside, the S-pole 114b thereof is disposed radially inside, the N-pole 115a of the permanent magnet 115 disposed away from the bottom plate 118 is disposed radially inside, the S-pole 115b thereof is disposed radially outside. With regard to the pair of permanent magnets 114 and 115 disposed away from the bottom plate 118, the S-pole 114b of the permanent magnet 114 disposed near the bottom plate 118 is disposed radially outside, the N-pole 114a thereof is disposed radially inside, the S-pole 115b of the permanent magnet 115 disposed away from the bottom plate 118 is disposed radially inside, the N-pole 115a thereof is disposed radially outside.

In accordance with the above arrangement, plural, and more specifically, two iron members 132 arranged in the direction of reciprocation are provided in the movable element 113. More specifically, one of the iron members 132 is disposed so as to be opposed to one of the pairs of the permanent magnets 114 and 115, and the other of the iron members 132 is disposed so as to be opposed to the other of the pair of permanent magnets 114 and 115.

Moreover, in the outer surface of the inner magnetic pole 119 and between two the pairs of the permanent magnets 114 and 115 in the direction of reciprocation of the movable element 113, there is formed an annular groove 160 that is stepped so as to be concave. In addition, the bushing 128 includes plural bushings 127, and more specifically, two bushings 127.

Figure 22:
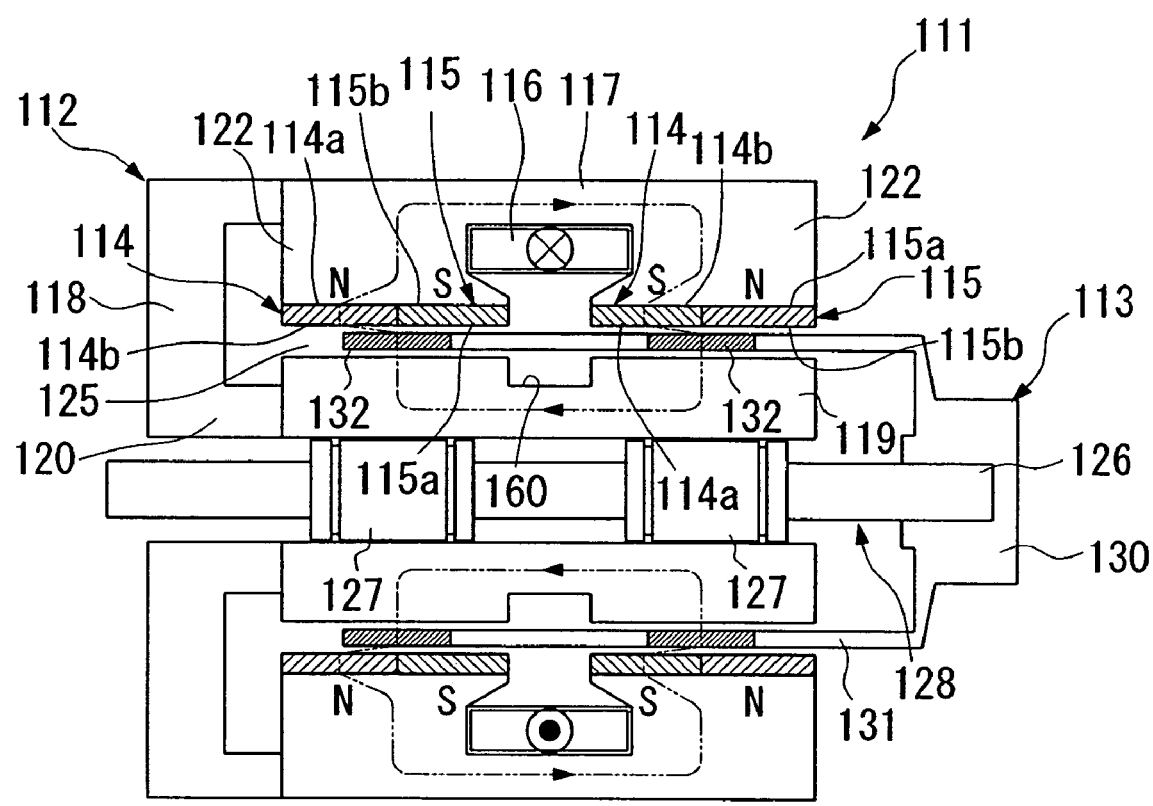
FIG. 22 is a side cross-sectional view showing the twelfth embodiment of the liner actuator according to the present invention, in which magnetic fluxes under the condition in which electrical current flows through the coil in one direction are indicated by the two-dot chain lines.
Figure 23:
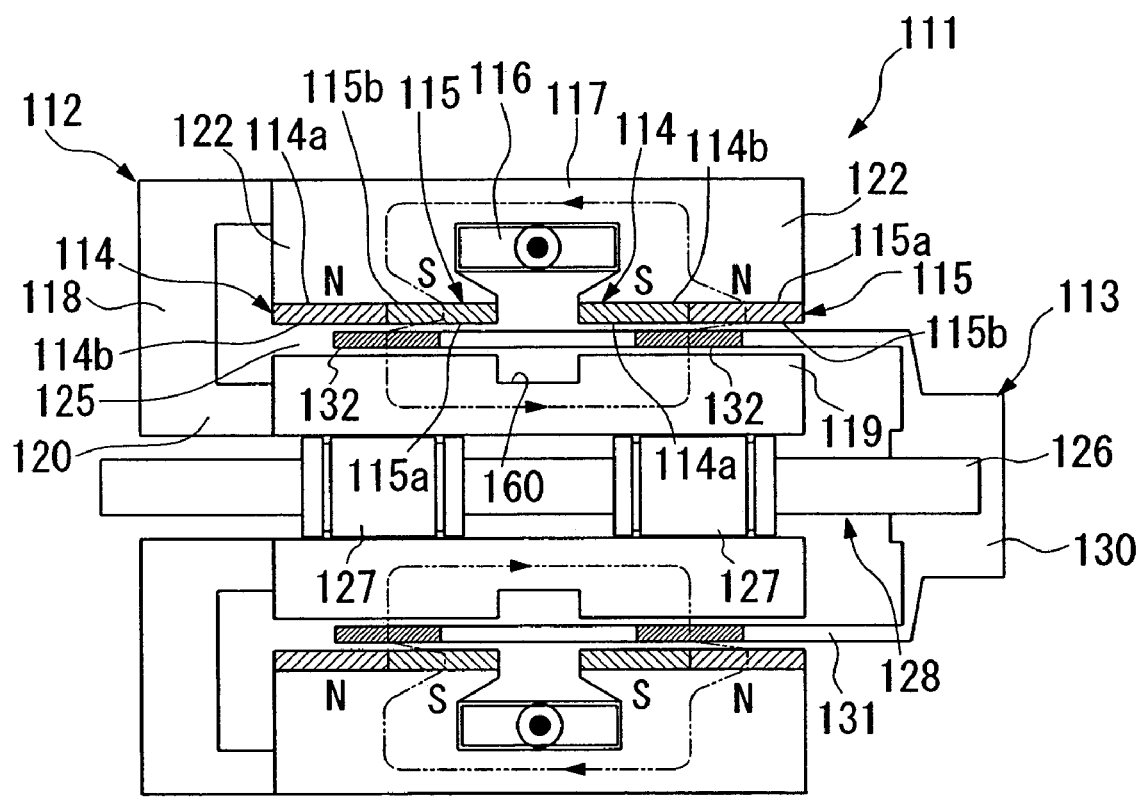
FIG. 23 is a side cross-sectional view showing the first embodiment of the liner actuator according to the present invention, in which magnetic fluxes under the condition in which electrical current flows through the coil in the opposite direction are indicated by the two-dot chain lines.
Figure 24:
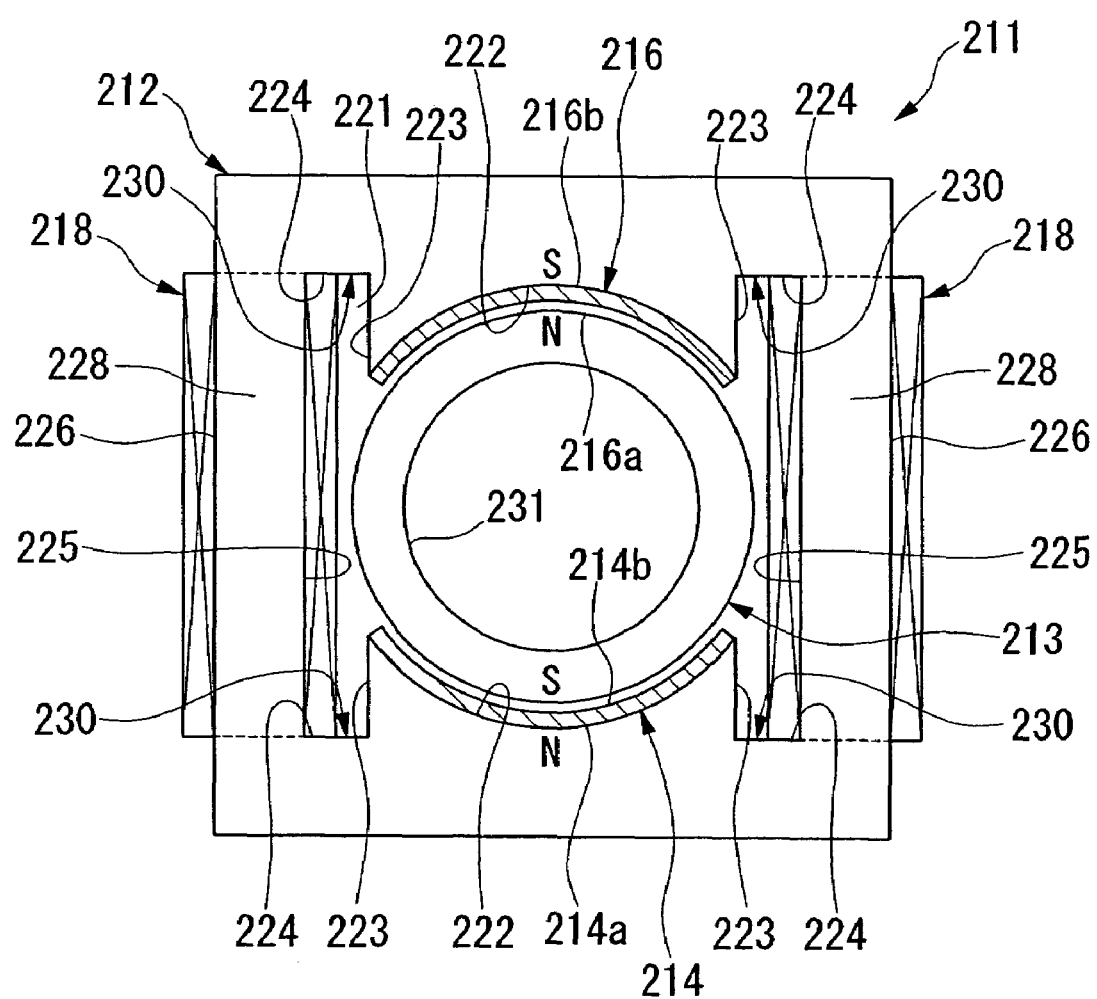
FIG. 24 is a front cross-sectional view showing a thirteenth embodiment of the liner actuator according to the present invention.

In the twelfth embodiment, when alternating current (sinusoidal wave current or rectangular wave current) is supplied to the coil 116, and when the current flows through the coil 116 in a predetermined direction, due to the magnetic fluxes running from the S-poles 114b to the N-poles 114a in both permanent magnets 114 as indicated by the two-dot chain lines in FIG. 22, magnetic flux loops, which run through the outer cylindrical portion 117 of the yoke 112, the outer magnetic pole 122 that is disposed away from the bottom plate 118, the permanent magnet 114 that is disposed away from the bottom plate 118, the iron member 132 of the movable element 113 that is disposed away from the bottom plate 118, the inner magnetic pole 119 of the yoke 112, the iron member 132 of the movable element 113 that is disposed near the bottom plate 118, the permanent magnet 114 that is disposed near the bottom plate 118, the outer magnetic pole 122 that is disposed near the bottom plate 118, and the outer cylindrical portion 117 in this order, are formed. As a result, a force F is applied to the movable element 113 to move the same toward the permanent magnets 114 side when considered in the arrangement of the permanent magnets 114 and 115, i.e., toward the bottom plate 118. On the other hand, when the current flows through the coil 116 in a direction opposite to the predetermined direction, due to the magnetic fluxes running from the S-poles 115b to the N-poles 115a in the permanent magnets 115 as indicated by the two-dot chain lines in FIG. 23, magnetic flux loops, which run through the outer cylindrical portion 117 of the yoke 112, the outer magnetic pole 122 that is disposed near the bottom plate 118, the permanent magnet 115 that is disposed near the bottom plate 118, the iron member 132 of movable element 113 that is disposed near the bottom plate 118, the inner magnetic pole 119 of the yoke 112, the iron member 132 of the movable element 113 that is disposed away from the bottom plate 118, the permanent magnet 115 that is disposed away from the bottom plate 118, the outer magnetic pole 122 that is disposed away from the bottom plate 118, and the outer cylindrical portion 117 in this order, are formed. As a result, a force F is applied to the movable element 113 to move the same toward the permanent magnets 115 side when considered in the arrangement of the permanent magnets 114 and 115, i.e., away from the bottom plate 118.

Because the direction of the current supplied to the coil 116 is alternated, such an operation is repeated, and the movable element 113 reciprocates with respect to the yoke 112 in the axial direction.

According to the twelfth embodiment explained above, because plural pairs of the permanent magnets 114 and 115 arranged in the direction of reciprocation of the movable element 113 are provided in the yoke 112, and plural iron members 132 arranged in the direction of reciprocation of the movable element 113 are provided in the movable element 113, a greater thrust can be applied to the movable element 113.

Moreover, because, at the radially outer portion of the inner magnetic pole 119 and between the permanent magnets 114 and 115 in the direction of reciprocation of the movable element 113, there is formed the annular groove 160 that is stepped so as to be concave, a further greater thrust can be applied to the movable element 113.

In the twelfth embodiment, plural sets of pair of permanent magnets 114 and 115 and outer magnetic pole 122 according to the seventh embodiment are arranged in the direction of reciprocation of the movable element 113, and plural iron members 132 arranged in the direction of reciprocation of the movable element 113 are provided in the movable element 113; however, plural sets of pair of permanent magnets 114 and 115, pair of permanent magnets 136 and 137, and outer magnetic pole 122 according to the eighth embodiment may be arranged in the direction of reciprocation of the movable element 113, and plural iron members 132 arranged in the direction of reciprocation may be provided in the movable element 113; plural sets of pair of permanent magnets 145 and 146 and outer magnetic pole 122 according to the ninth embodiment may be arranged in the direction of reciprocation of the movable element 113, and plural iron members 132 arranged in the direction of reciprocation may be provided in the movable element 113; plural sets of pair of permanent magnets 136 and 137 and inner magnetic pole 150 according to the tenth embodiment may be arranged in the direction of reciprocation of the movable element 13, and plural iron members 132 arranged in the direction of reciprocation may be provided in the movable element 113; or plural sets of pair of permanent magnets 114 and 115, pair of permanent magnets 136 and 137, and inner magnetic pole 150 according to the eleventh embodiment may be arranged in the direction of reciprocation of the movable element 113, and plural iron members 132 arranged in the direction of reciprocation may be provided in the movable element 113.

Next, a thirteenth embodiment of the linear actuator according to the present invention will be explained below with reference to FIGS. 24 to 29.

A linear actuator 211 according to the thirteenth embodiment includes a yoke (stator) 212, a movable element 213 disposed inside the yoke 212 in a reciprocatable manner, a pair of permanent magnets (a first pair of permanent magnets) 214 and 215 fixed to the yoke 212, a pair of permanent magnets (a second pair of permanent magnets) 216 and 217 fixed to the yoke 212, and two coils 218 fixed to the yoke 212.

The yoke 212 is substantially a rectangular tube by having a through hole 221 at the center thereof. The through hole 221 has two cylindrical surface portions 222 which are separated from each other and opposed to each other, and which are formed by cutting an inner surface of a cylinder at two portions separated from each other by a predetermined distance in parallel to the axis thereof, plane portions 223, each of which extends from an edge of the cylindrical surface portion 222 in a direction connecting the cylindrical surface portions 222 to each other, plane portions 224, each of which extends outward and perpendicular to the plane portion 223 from an edge of the plane portion 223 opposite to the cylindrical surface portion 222, flat inner surface portions 225, each of which extends in the direction connecting the cylindrical surface portions 222 to each other so as to connect the corresponding plane portions 224 to each other. Two cylindrical surface portions 222, whose radiuses, lengths, widths coincide with each other, are disposed in a coaxial manner. The plane portions 223, the plane portions 224, and the inner surface portions 225 form concave portions 230 at both side in the circumference direction of the cylindrical surface portions 222, which is formed so as to be concave in the radial direction.

The yoke 212 is formed of stacked steel sheets through the steps of stamping a steel sheet in a shape corresponding to two cylindrical surface portions 222, four plane portions 223, four plane portions 224, and two inner surface portions 225 so as to form base plates 227, and stacking and connecting the base plates 227 in the direction of the through hole 221 in an aligned manner.

The yoke 212 is not provided with a back yoke extending inward of the movable element 213.

In the yoke 212, portions, each of which is disposed between the inner surface portion 225 and an outer surface portion 226 that is disposed near the inner surface portion 225 while being in parallel thereto, are coil winding portions 228. As a result, such coil winding portions 228 are disposed at two locations while being in parallel to each other. Each of coils 218 is wound around the coil winding portion 228 over the overall width of the inner surface portion 225, and as a result, the ring-shaped coils 218 are fixed to the yoke 212.

The permanent magnets 214 and 215, which are ferrite magnets whose radiuses, lengths, and widths coincide with each other, have a shape formed by cutting a cylinder at two portions separated from each other by a predetermined distance in parallel to the axis thereof, and fixed to one of the cylindrical surface portions 222 in such a manner that the permanent magnets 214 and 215 are arranged side by side in the axial direction in a coaxial manner while the circumferential positions thereof coincide with each other. The permanent magnets 214 and 215 are of radially anisotropic type having magnetic poles perpendicular to the axial direction, and the orientations of the magnetic poles thereof differ from each other. More specifically, with regard to the permanent magnet 214 disposed at one position in the extending direction of the through hole 221, the N-pole 214a is disposed radially outside, and the S-pole 214b is disposed radially inside, and with regard to the permanent magnet 215 disposed at the other position in the extending direction of the through hole 221, the N-pole 215a is disposed radially inside, and the S-pole 215b is disposed radially outside. The concave portions 230 of the yoke 212 are disposed at both side of the permanent magnets 214 and 215 in a direction perpendicular to the direction along which the permanent magnets 214 and 215 are arranged.

The permanent magnets 216 and 217, which are ferrite magnets whose radiuses, lengths, and widths coincide with each other, have a shape formed by cutting a cylinder at two portions separated from each other by a predetermined distance in parallel to the axis thereof, and fixed to the other of the cylindrical surface portions 222 in such a manner that the permanent magnets 216 and 217 are arranged side by side in the axial direction in a coaxial manner while the circumferential positions thereof coincide with each other, and are separated from the permanent magnets 214 and 215 so as to be disposed at the opposite position on the circumference while being disposed at the same position in the extending direction of the through hole 221 as the permanent magnets 214 and 215. The permanent magnets 216 and 217 are of radially anisotropic type having magnetic poles perpendicular to the axial direction, and the orientations of the magnetic poles thereof differ from each other. More specifically, with regard to the permanent magnet 216 disposed at one position in the extending direction of the through hole 221, the N-pole 216a is disposed radially inside, and the S-pole 216b is disposed radially outside, and with regard to the permanent magnet 217 disposed at the other position in the extending direction of the through hole 221, the N-pole 217a is disposed radially outside, and the S-pole 217b is disposed radially inside. The concave portions 230 of the yoke 212 are disposed at both side of the permanent magnets 216 and 217 in a direction perpendicular to the direction along which the permanent magnets 216 and 217 are arranged.

As explained above, in the pair of permanent magnets 214 and 215 and the pair of permanent magnets 216 and 217, the magnetic poles disposed radially inside, i.e., the magnetic poles facing the movable element 213, differ from each other in the permanent magnets disposed at the same position in the extending direction of the through hole 221. More specifically, the magnetic poles disposed radially inside differ from each other in the permanent magnets 214 and 216 disposed at the same position in the extending direction of the through hole 221, and the magnetic poles disposed radially inside differ from each other in the permanent magnets 215 and 217 disposed at the same position in the extending direction of the through hole 221.

The movable element 213 is formed in a cylindrical shape by having a through hole 231 at the center thereof, and the diameter thereof is slightly less than the inner diameter of the permanent magnets 214 to 217. The movable element 213 is disposed inside the cylindrical surface portions 222 of the yoke 212, i.e., inside the permanent magnets 215 and 217, in a coaxial manner while being opposed to the permanent magnets 215 and 217, so that the movable element 213 is reciprocatable in the extending direction of the through hole 221. The length of the movable element 213 in the axial direction is less than that of the through hole 221 of the yoke 212 in the extending direction.

The movable element 213 is made of stacked steel sheets through the steps of stamping a steel sheet so as to form annular-shaped base plates 232 having the through hole 231 therein, and stacking and connecting the base plates 232 in the direction of the through hole 231 in an aligned manner. Accordingly, the movable element 213, as a whole, is made of iron.

In the liner actuator 211 having the structure explained above, alternating current (sinusoidal wave current or rectangular wave current) is supplied to the coils 218 in a synchronized manner. The directions of currents flowing through portions of the coils 218 that are located closer to the movable element 213 than from the coil winding portions 228 differ from each other in the extending direction of the through hole 221.

Figure 25:
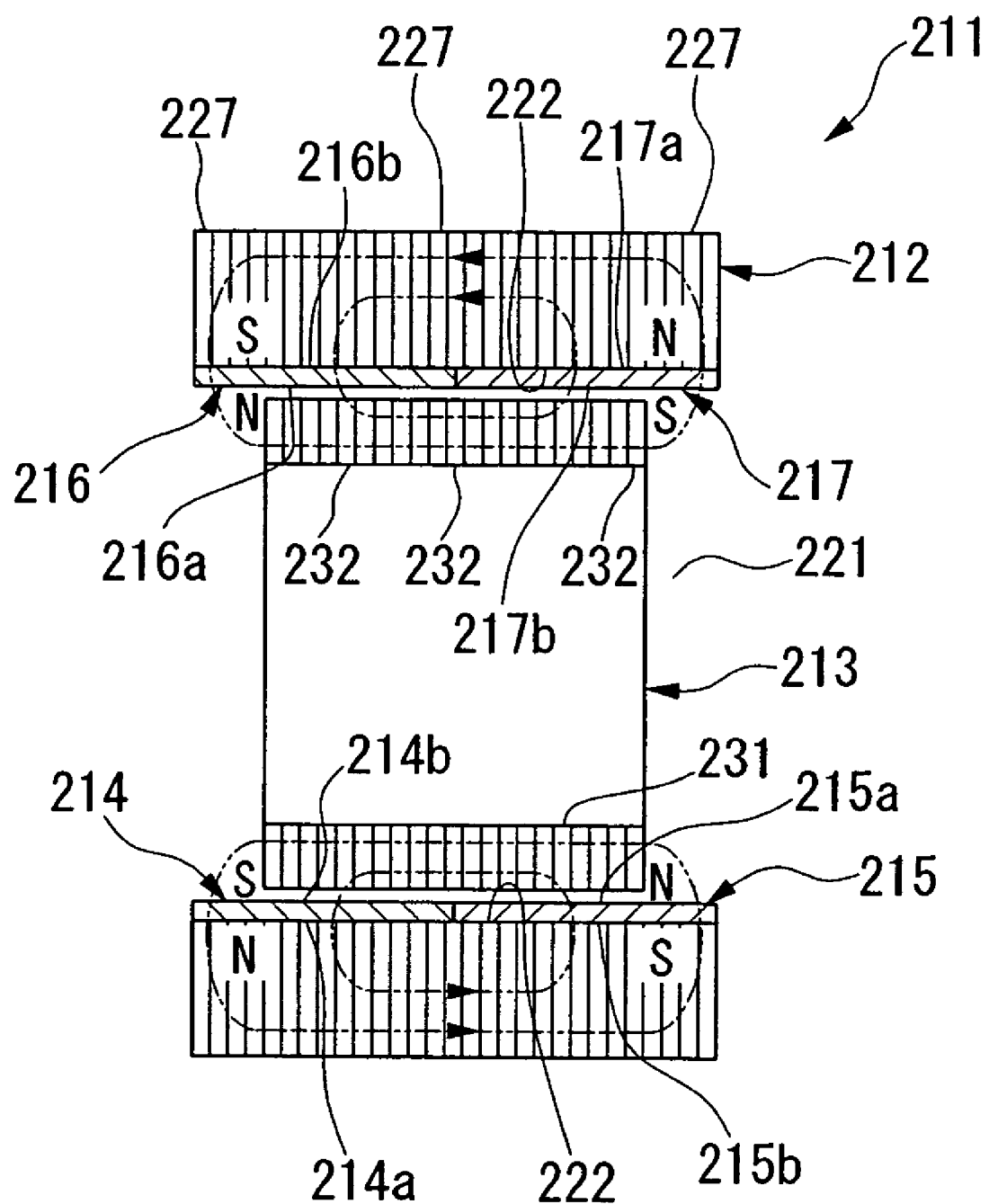
FIG. 25 is a side cross-sectional view showing the thirteenth embodiment of the liner actuator according to the present invention, in which magnetic fluxes under the condition in which electrical current does not flow through a coil are indicated by the two-dot chain lines.

When electrical current is not supplied to the coils 218, as indicated by the two-dot chain lines in FIG. 25, magnetic flux loops, which run through the yoke 212, the permanent magnet 215, the movable element 213, the permanent magnet 214, and the yoke 212 in this order, are formed by the pair of permanent magnets 214 and 215, and magnetic flux loops, which run through the yoke 212, the permanent magnet 216, the movable element 213, the permanent magnet 217, and the yoke 212 in this order, are formed by the pair of permanent magnets 216 and 217. At this moment, the movable element 213 does not move.

Figure 26:
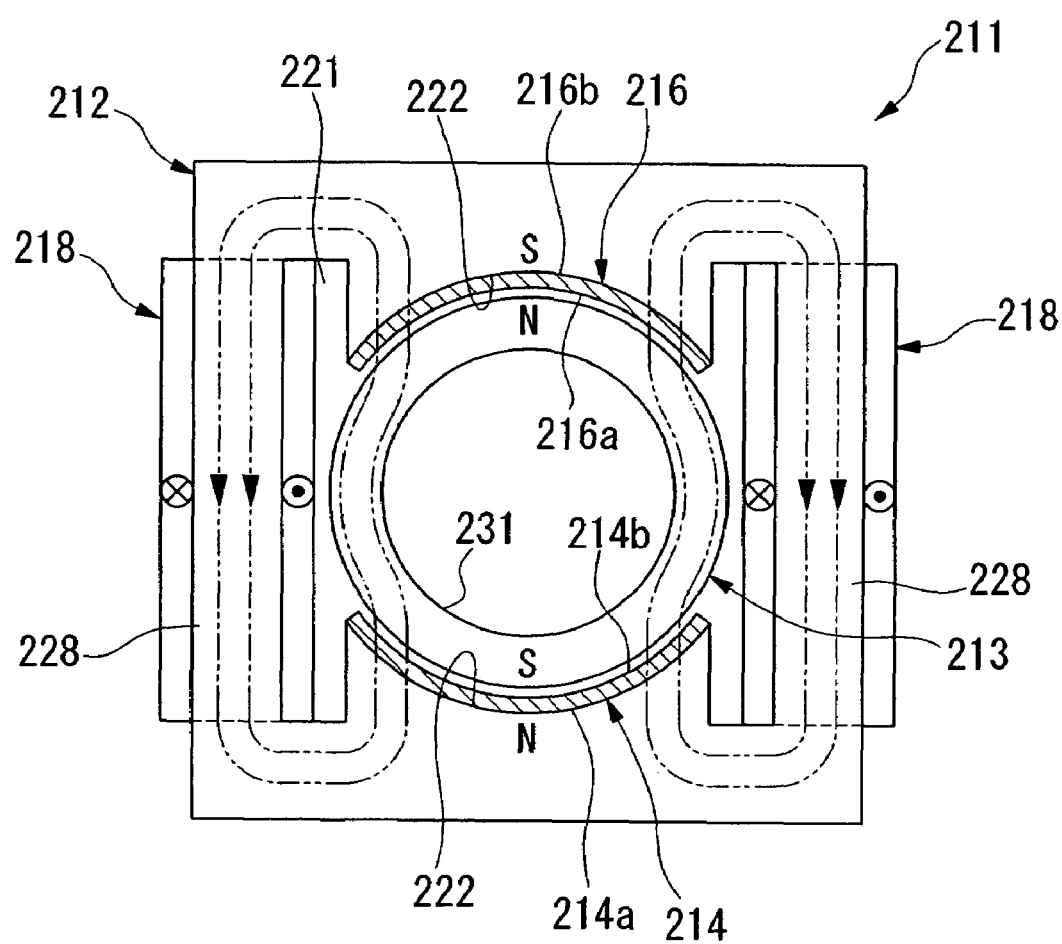
FIG. 26 is a front cross-sectional view showing the thirteenth embodiment of the liner actuator according to the present invention, in which magnetic fluxes under the condition in which electrical current flows through the coil in one direction are indicated by the two-dot chain lines.

When, for example, as shown in FIG. 26, one of the coils 218 (the left one in FIG. 26) is supplied with electrical current that flows in one direction of the extending direction of the through hole 221 (from backside to foreside of the drawing in FIG. 26) through a portion thereof near the movable element 213, magnetomotive force orienting in one direction (toward the bottom in FIG. 26) is generated in the coil winding portion 228 disposed inside. At this moment, as indicated by the two-dot chain lines in FIGS. 26 and 27, magnetic flux loops, which run through the yoke 212, the permanent magnet 215 of the pair of permanent magnets 214 and 215 (one disposed at far side of the drawing in FIG. 26), the movable element 213, the permanent magnet 217 of the pair of permanent magnets 216 and 217 that is disposed at the same position in the extending direction of the through hole 221 as the permanent magnet 215, and the yoke 212 in this order, are formed by the pair of permanent magnets 214 and 215 and the pair of permanent magnets 216 and 217 in one of the coils 218. At the same time, the other of the coils 218 (the right one in FIG. 26) is supplied with electrical current that flows in the other direction of the extending direction of the through hole 221 (from foreside to backside of the drawing in FIG. 26) through a portion thereof near the movable element 213, magnetomotive force orienting in one direction (toward the bottom in FIG. 26) is generated in the coil winding portion 228 disposed inside. At this moment, as indicated by the two-dot chain lines in FIG. 26, magnetic flux loops, which run through the yoke 212, the permanent magnet 215 of the pair of permanent magnets 214 and 215 (one disposed at far side of the drawing in FIG. 26), the movable element 213, the permanent magnet 217 of the pair of permanent magnets 216 and 217 that is disposed at the same position in the extending direction of the through hole 221 as the permanent magnet 215, and the yoke 212 in this order, are also formed by the pair of permanent magnets 214 and 215 and the pair of permanent magnets 216 and 217 in the other of the coils 218.

Figure 27:
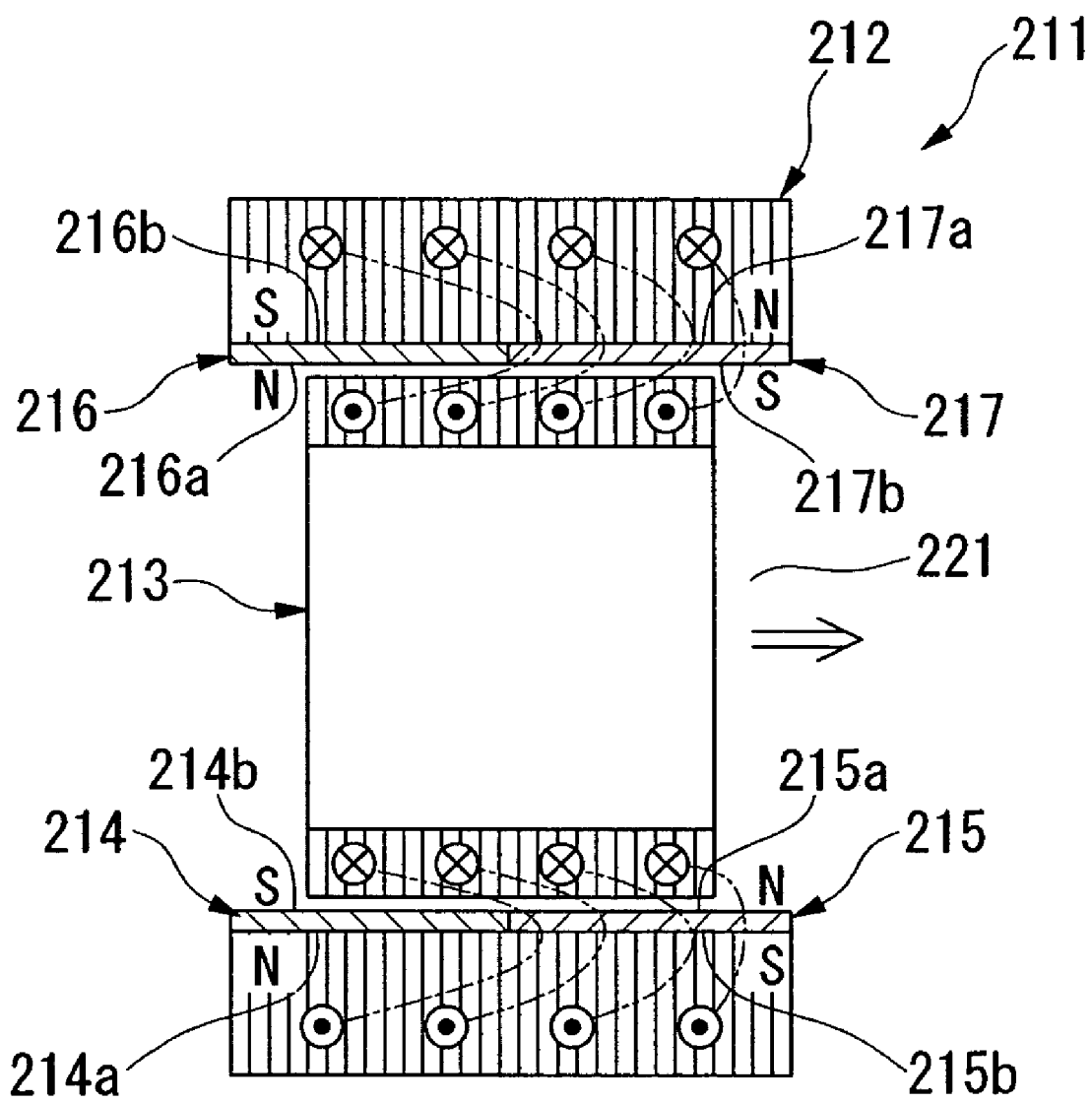
FIG. 27 is a side cross-sectional view showing the thirteenth embodiment of the liner actuator according to the present invention, in which magnetic fluxes under the condition in which electrical current flows through the coil in one direction are indicated by the two-dot chain lines.

Accordingly, the movable element 213 moves in one direction of the extending direction of the through hole 221 (in a direction from foreside to backside of the drawing in FIG. 27).

Figure 28:
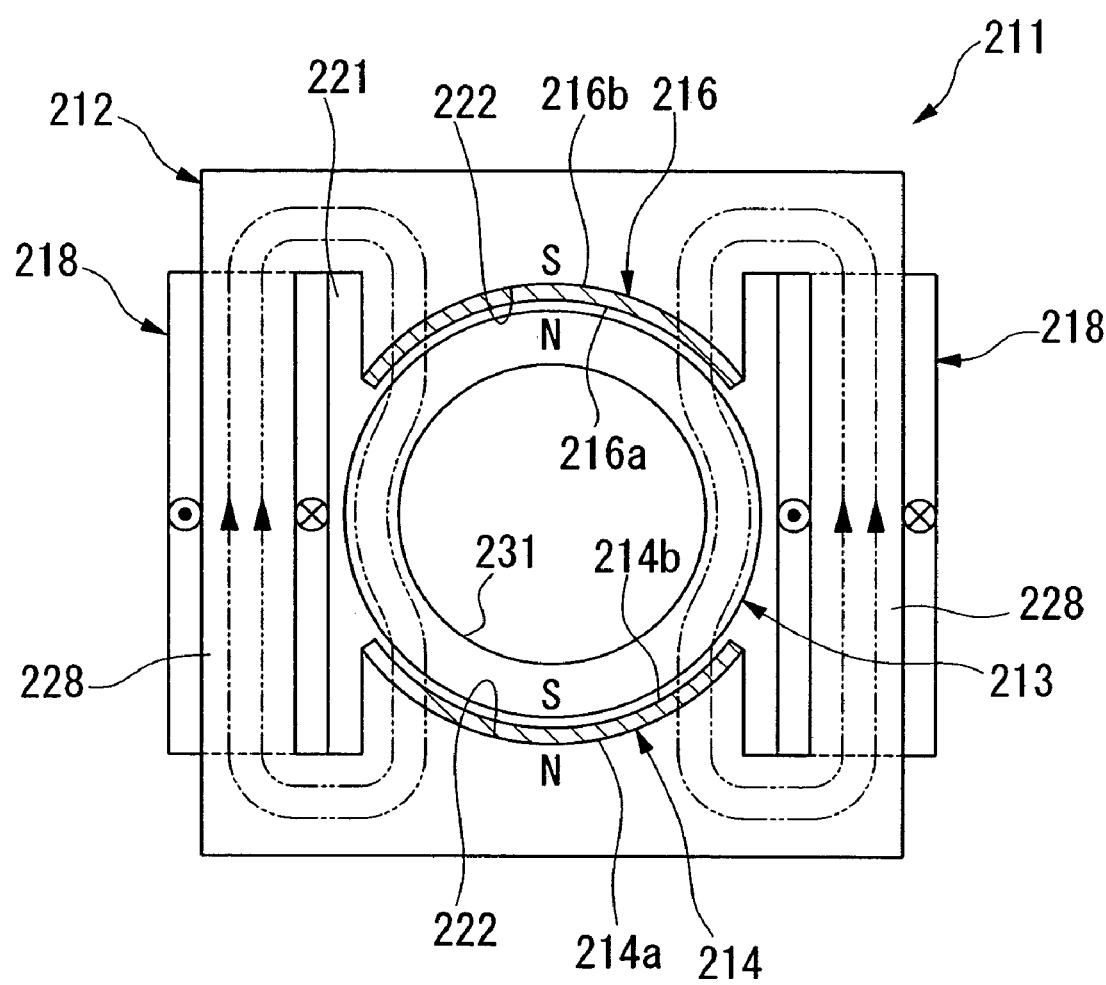
FIG. 28 is a front cross-sectional view showing the thirteenth embodiment of the liner actuator according to the present invention, in which magnetic fluxes under the condition in which electrical current flows through the coil in the opposite direction are indicated by the two-dot chain lines.
Figure 29:
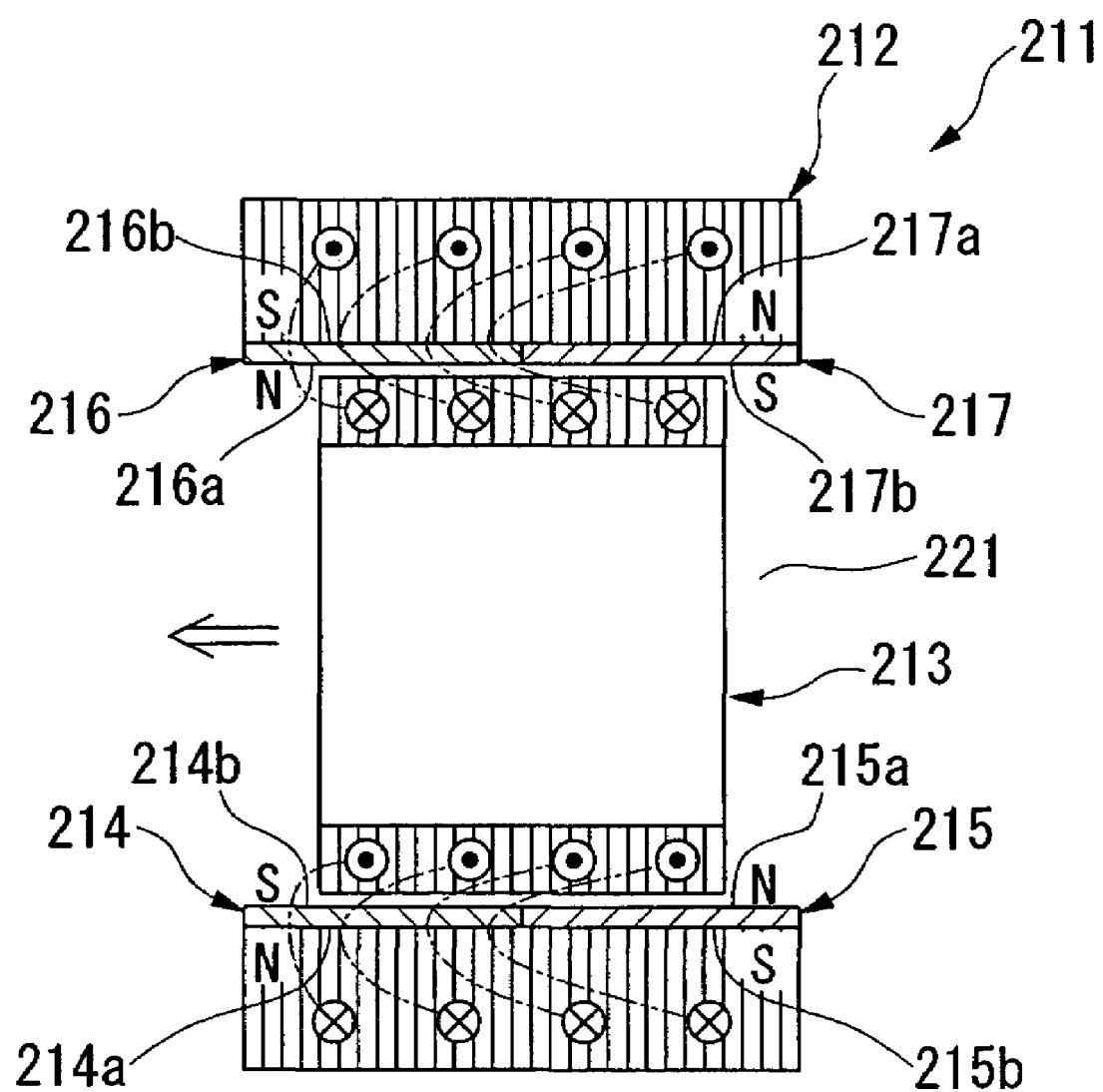
FIG. 29 is a side cross-sectional view showing the thirteenth embodiment of the liner actuator according to the present invention, in which magnetic fluxes under the condition in which electrical current flows through the coil in the opposite direction are indicated by the two-dot chain lines.

Next, as shown in FIGS. 28 and 29, when one of the coils 218 (the left one in FIG. 28) is supplied with electrical current that flows in the other direction of the extending direction of the through hole 221 (from foreside to backside of the drawing in FIG. 28) through a portion thereof near the movable element 213, magnetomotive force orienting in one direction (toward the top in FIG. 28) is generated in the coil winding portion 228 disposed inside. At this moment, as indicated by the two-dot chain lines in FIGS. 28 and 29, magnetic flux loops, which run through the yoke 212, the permanent magnet 214 of the pair of permanent magnets 214 and 215 (one disposed at near side of the drawing in FIG. 28), the movable element 213, the permanent magnet 216 of the pair of permanent magnets 216 and 217 that is disposed at the same position in the extending direction of the through hole 221 as the permanent magnet 214, and the yoke 212 in this order, are formed by the pair of permanent magnets 214 and 215 and the pair of permanent magnets 216 and 217 in one of the coils 218. At the same time, the other of the coils 218 (the right one in FIG. 28) is supplied with electrical current that flows in one direction of the extending direction of the through hole 221 (from backside to foreside of the drawing in FIG. 28) through a portion thereof near the movable element 213, magnetomotive force orienting in one direction (toward the top in FIG. 26) is generated in the coil winding portion 228 disposed inside. At this moment, as indicated by the two-dot chain lines in FIG. 28, magnetic flux loops, which run through the yoke 212, the permanent magnet 214 of the pair of permanent magnets 214 and 215 (one disposed at near side of the drawing in FIG. 28), the movable element 213, the permanent magnet 216 of the pair of permanent magnets 216 and 217 that is disposed at the same position in the extending direction of the through hole 221 as the permanent magnet 214, and the yoke 212 in this order, are also formed by the pair of permanent magnets 214 and 215 and the pair of permanent magnets 216 and 217 in the other of the coils 218.

Accordingly, the movable element 213 moves in the other direction of the extending direction of the through hole 221 (in a direction from backside to foreside of the drawing in FIG. 28, and to the left in FIG. 29).

Because the direction of the current supplied to the coils 218 is alternated, such an operation is repeated, the movable element 213 reciprocates at a predetermined stroke with respect to the yoke 212 in the extending direction of the through hole 221.

According to the linear actuator 211 of the thirteenth embodiment explained above, because the coil 218 is provided not in the movable element 213, but in the yoke 212, electrical current does not have to be supplied to the movable element 213; therefore, the feeder lines connected to the coil 218 will not be broken due to the movement of the movable element 213. Accordingly, reliability in a continuous operation or the like can be improved.

Moreover, because the permanent magnets 214 to 217 are also provided not in the movable element 213, but in the yoke 212, the weight of the movable element 213 will not be increased even when the weighs of the permanent magnets 214 to 217 and weight of the coil 218 are increased in order to obtain high magnetic flux density for improvement in performance. Accordingly, it is easy to obtain improved performance (increased thrust).

In addition, because the movable element 213 does not include a permanent magnet, a magnetizing operation does not have to be applied to the movable element 213. Moreover, because the movable element 213 does not exhibit attracting force during a manufacturing process, it is easy to manufacture the movable element 213. Accordingly, the manufacturing process is simplified, which leads to reduction in cost.

In addition, because the movable element 213 is moved using the magnetic flux loops explained above, a portion of the yoke 212 as a back yoke does not have to be disposed at a position opposite to the movable element 213 with respect to the permanent magnets 214 to 217, i.e., radially inside. Accordingly, a space located opposite to the movable element 213 with respect to the permanent magnets 214 to 217, i.e., a space near the through hole 231, can be efficiently used. More specifically, designing freedom is significantly increased when a cylinder or a piton thereof is disposed in the through hole 231.

In addition, because the yoke 212 is made of stacked steel sheets which are stacked in the direction of reciprocation, eddy current loss can be reduced when compared with the case in which the yoke 212 is made of a solid material by machining, and hysteresis loss can be reduced when compared with the case in which the yoke 212 is made of a sintering material. Accordingly, performance can be improved. Moreover, in particular, when a large yoke 212 is to be formed, it is easier to manufactures the same when compared with the case in which the yoke 212 is made of a solid material or a sintering material. Accordingly, a large yoke 212, which is required when the overall size is increased, can be easily manufactured.

For the permanent magnets 214 to 217, in addition to a ferrite magnet, a magnet made of rare earth element such as neodymium or samarium cobalt, or plastic magnet may be used; however, it is preferable to use the ferrite magnet in terms of reduction in cost.

Moreover, the linear actuator 211 may further include a spring provided on the movable element 213, or the linear actuator 211 may be used with a spring disposed outside thereof for utilizing a resonance phenomenon, which are general practice of usage; however, the linear actuator 211 may be used as it is.

The linear actuator 211 may be used as a linear servo actuator, which is capable of controlling speed and position, by providing position and speed sensors thereon, and by executing a closed-loop control.

Figure 30:
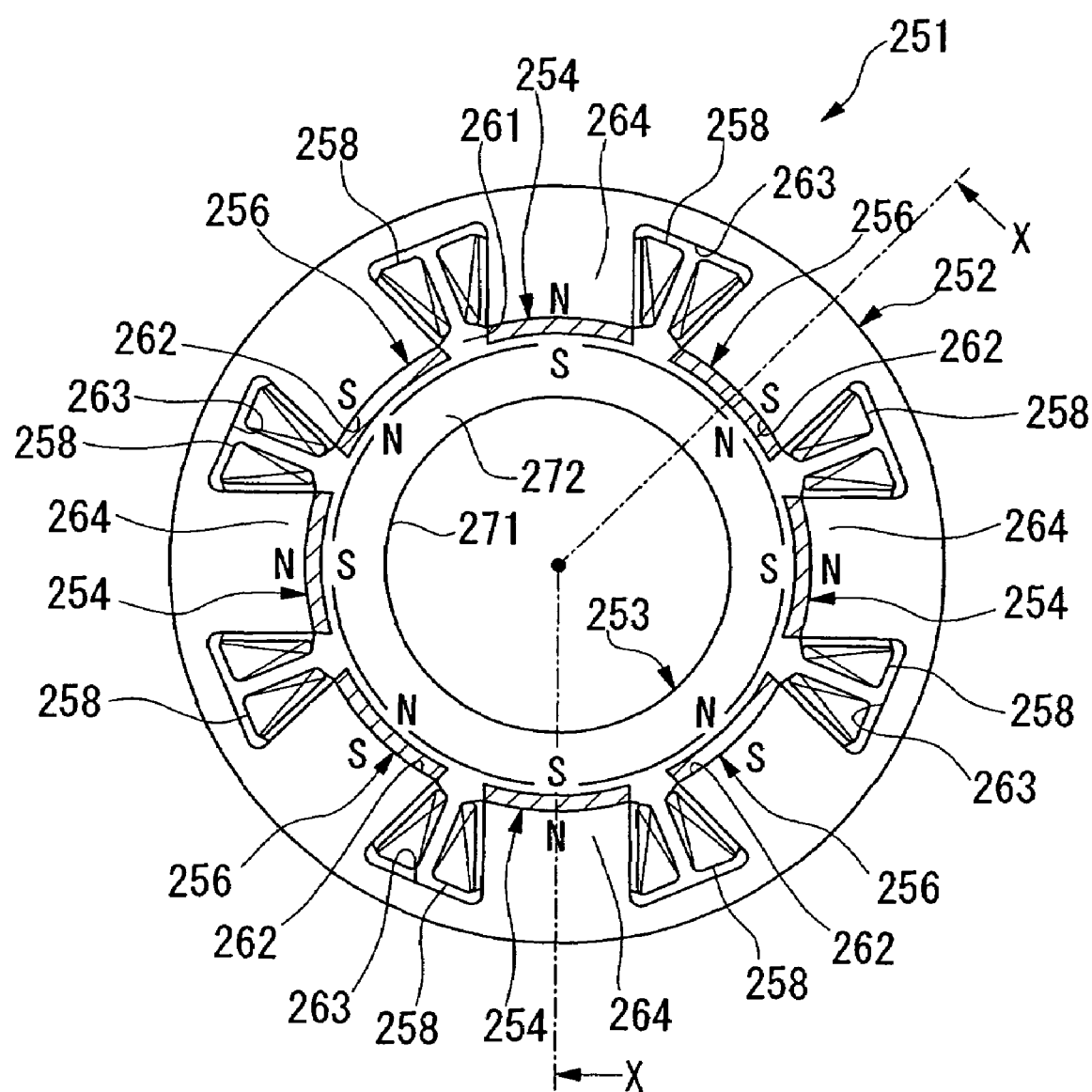
FIG. 30 is a side cross-sectional view showing a fourteenth embodiment of the liner actuator according to the present invention.
Figure 31:
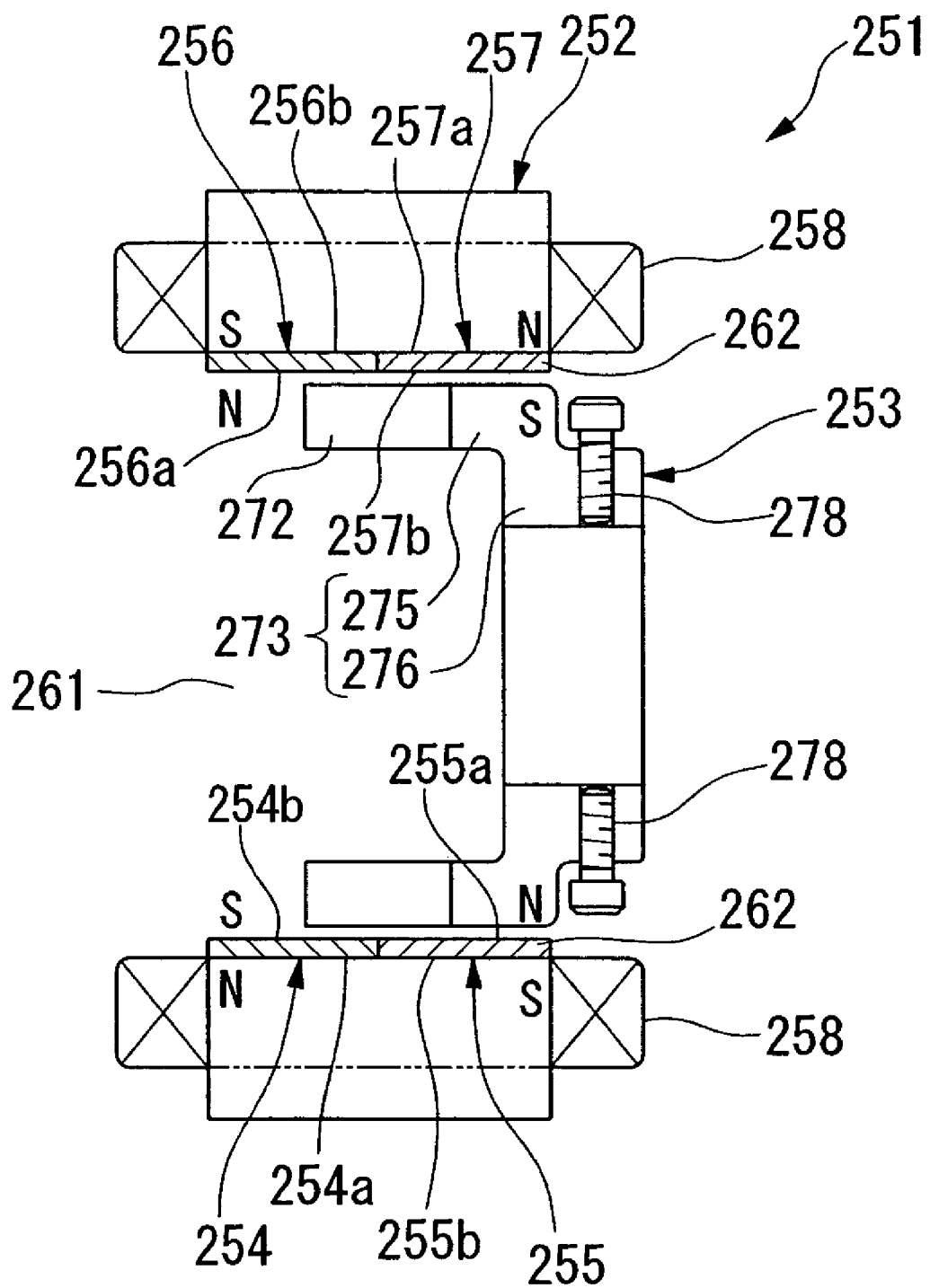
FIG. 31 is a cross-sectional view showing the fourteenth embodiment of the liner actuator according to the present invention taken along the line X-X in FIG. 7.

Next, a fourteenth embodiment of the linear actuator according to the present invention will be explained below with reference to FIGS. 30 and 31.

A linear actuator 251 according to the fourteenth embodiment includes a yoke (stator) 252, a movable element 253 disposed inside the yoke 252 in a reciprocatable manner, four sets of permanent magnets (a first pair of permanent magnets) 254 and 255 fixed to the yoke 252, four sets of permanent magnets (a second pair of permanent magnets) 256 and 257 fixed to the yoke 252, and eight coils 258 fixed to the yoke 252.

The yoke 252 is formed in a substantially cylindrical shape by having a through hole 261 at the center thereof. The through hole 261 has eight cylindrical surface portions 262 which are formed by cutting an inner surface of a cylinder at two portions separated from each other by a predetermined distance in parallel to the axis thereof, and which are disposed at the same intervals along the circumference. Concave portions 263 are formed between the cylindrical surface portions 262 adjacent to each other along the circumference, and as a result, convex portions 264, each of which has the cylindrical surface portion 262, are formed between the concave portions 263 adjacent to each other along the circumference. The eight cylindrical surface portions 262, whose radiuses, lengths, and widths coincide with each other, are disposed in a coaxial manner. As in the thirteenth embodiment, although it is not shown in the drawing, the yoke 252 is made of stacked steel sheets through the steps of stamping a steel sheet in a shape corresponding to eight concave portions 263 and convex portions 264 so as to form base plates, and stacking and connecting the base plates in the direction of the through hole 261 in an aligned manner.

The yoke 252 is not provided with a back yoke extending inward of the movable element 253.

In the fourteenth embodiment, on each of the convex portions 264 of the yoke 252, a coil 258 is wound so as to alternatingly extend in the axial direction and in the circumferential direction, and as a result, the coils 258 are fixed to the yoke 252 in a ring shape.

The permanent magnets 254 and 255, which are ferrite magnets whose radiuses, lengths, and widths coincide with each other, have a shape formed by cutting a cylinder at two portions separated from each other by a predetermined distance in parallel to the axis thereof, and fixed to the common cylindrical surface portion 262 in such a manner that the permanent magnets 254 and 255 are arranged side by side in the axial direction in a coaxial manner while the circumferential positions thereof coincide with each other. The permanent magnets 254 and 255 are of radially anisotropic type having magnetic poles perpendicular to the axial direction, and the orientations of the magnetic poles thereof differ from each other. More specifically, with regard to the permanent magnet 254 disposed at one position in the extending direction of the through hole 261, the N-pole 254a is disposed radially outside, and the S-pole 254b is disposed radially inside, and with regard to the permanent magnet 255 disposed at the other position in the extending direction of the through hole 261, the N-pole 255a is disposed radially inside, and the S-pole 255b is disposed radially outside. Four pairs of permanent magnets 254 and 255 as such are disposed in the circumferential direction on every other cylindrical surface portions 262 in a radial manner.

The permanent magnets 256 and 257, which are ferrite magnets whose radiuses, lengths, and widths coincide with each other, have a shape formed by cutting a cylinder at two portions separated from each other by a predetermined distance in parallel to the axis thereof, and fixed to the common cylindrical surface portion 262 in such a manner that the permanent magnets 256 and 257 are arranged side by side in the axial direction in a coaxial manner while the circumferential positions thereof coincide with each other. The permanent magnets 256 and 257 are of radially anisotropic type having magnetic poles perpendicular to the axial direction, and the orientations of the magnetic poles thereof differ from each other. More specifically, with regard to the permanent magnet 256 disposed at one position in the extending direction of the through hole 261, the N-pole 256a is disposed radially inside, and the S-pole 256b is disposed radially outside, and with regard to the permanent magnet 257 disposed at the other position in the extending direction of the through hole 261, the N-pole 257a is disposed radially outside, and the S-pole 257b is disposed radially inside. Four pairs of permanent magnets 256 and 257 as such are disposed in the circumferential direction on every other cylindrical surface portions 262 in a radial manner.

As explained above, in the pair of permanent magnets 254 and 255 and the pair of permanent magnets 256 and 257, the magnetic poles disposed radially inside, i.e., the magnetic poles facing the movable element 253, differ from each other in the permanent magnets disposed at the same position in the extending direction of the through hole 261. More specifically, the magnetic poles disposed radially inside differ from each other in the permanent magnets 254 and 256 disposed at the same position in the extending direction of the through hole 261, and the magnetic poles disposed radially inside differ from each other in the permanent magnets 255 and 257 disposed at the same position in the extending direction of the through hole 261.

The pair of permanent magnets 254 and 255 adjacent to each other in the circumferential direction while having a gap therebetween and the pair of permanent magnets 256 and 257 adjacent to each other in the circumferential direction while having a gap therebetween form one set, and four such sets are provided in such a manner that the positions thereof in the extending direction of the through hole 261 coincide with each other.

The movable element 253 includes an iron member 272 which is formed in a cylindrical shape by having a through hole 271 at the center thereof, and a main portion 273 which is disposed at one side of the iron member 272 in the axial direction. The main portion 273 includes a large diameter cylindrical portion 275 which is disposed adjacent to the iron member 272 while having the same axis and diameter as the iron member 272, and a small diameter cylindrical portion 276 which is disposed opposite to the iron member 272 with respect to the large diameter cylindrical portion 275 while having the same axis as the iron member 272 and diameter smaller than that of the iron member 272. The outer diameters of the iron member 272 and the large diameter cylindrical portion 275 are slightly less than the inner diameter of the permanent magnets 254 to 257. The movable element 253 is disposed inside the cylindrical surface portions 262 of the yoke 252, i.e., inside the permanent magnets 254 and 257, in a coaxial manner, so that the movable element 253 is reciprocatable in the extending direction of the through hole 261. The length of the iron member 272 in the axial direction is less than that of the through hole 261 of the yoke 252 in the extending direction. In addition, in the small diameter cylindrical portion 276, bolts 278 for fixing a shaft or the like that is disposed inside thereof are engaged in the radial direction.

In the movable element 253, the main portion 273 is made of synthetic resin such as an engineering plastic, which is a non-magnetic material, and the iron member 272 is made of a sintering material. The movable element 253 is made using a synthetic resin insert formation method in which the iron member 272 is used as an insert.

The linear actuator 251 in the fourteenth embodiment explained above achieves the same effects as that achieved in the thirteenth embodiment, and in addition, because plural sets, more specifically, four sets of pair of permanent magnets 254 and 255 and pair of permanent magnets 256 and 257 are separately disposed, the thickness of the yoke can be reduced, and weight reduction can be achieved.

Because the thickness of the movable element can be also reduced, response is improved.

In the fourteenth embodiment, similar modifications as in the thirteenth embodiment can be made.

Figure 32:
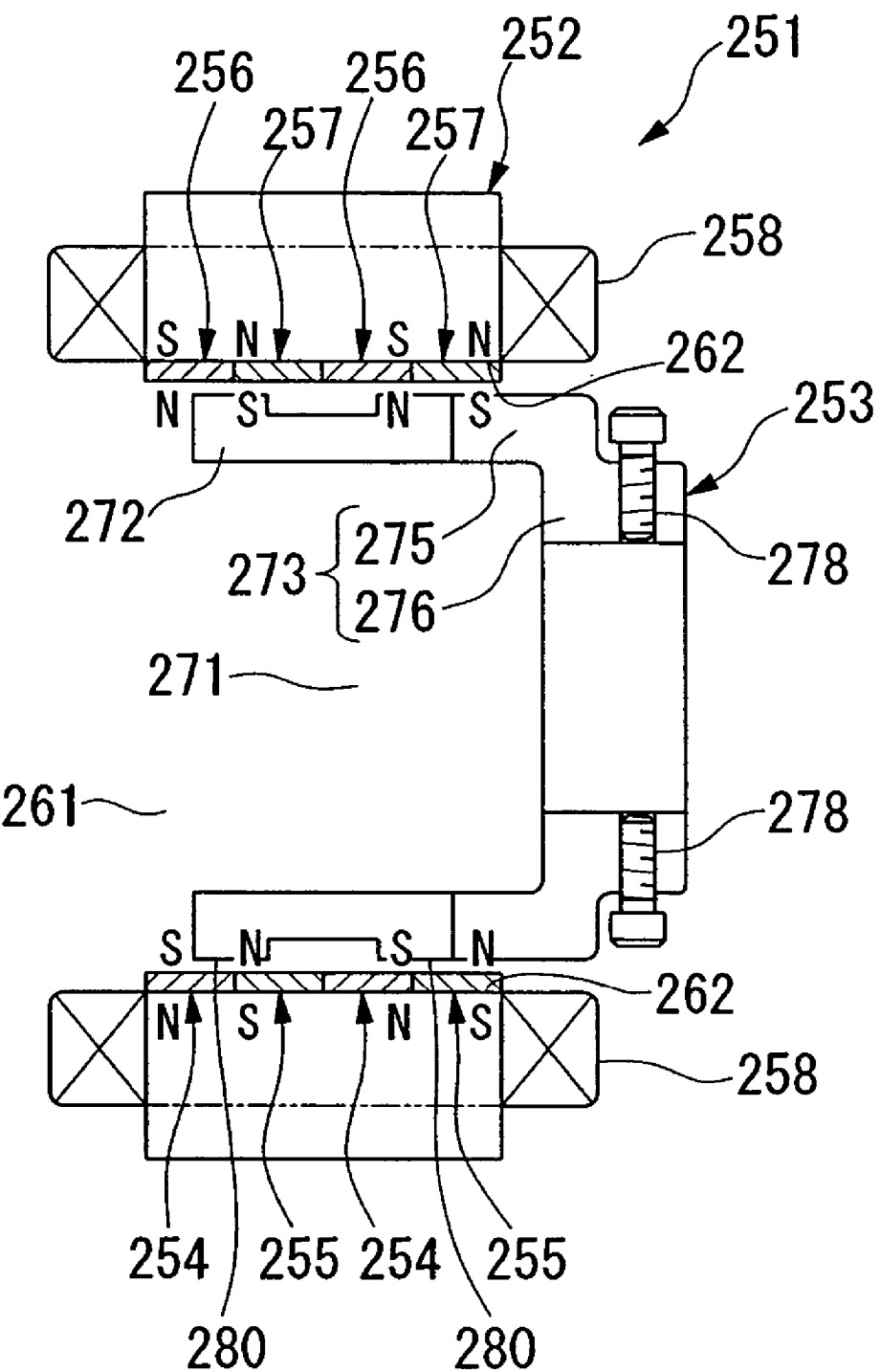
FIG. 32 is a cross-sectional view showing a fifteenth embodiment of the liner actuator according to the present invention taken along the line X-X in FIG. 7.

Next, a fifteenth embodiment of the linear actuator according to the present invention, in particular, the difference from the fourteenth embodiment, will be mainly explained below with reference to FIG. 32. The same reference symbols are applied to the elements similar to that in the fourteenth embodiment, and explanations thereof are omitted.

In the fifteenth embodiment, the pair of permanent magnets 254 and 255 and the pair of permanent magnets 256 and 257 are provided with another pair of permanent magnets 254 and 255 and another pair of permanent magnets 256 and 257 disposed adjacent thereto in the extending direction of the through hole 261, respectively, in such a manner that circumferential positions thereof coincide with each other. More specifically, the pair of permanent magnets 254 and 255 is provided with another pair of permanent magnets 254 and 255 disposed adjacent thereto in the extending direction of the through hole 261 in such a manner that circumferential positions thereof coincide with each other, and the pair of permanent magnets 256 and 257 is provided with another pair of permanent magnets 256 and 257 disposed adjacent thereto in the extending direction of the through hole 261 in such a manner that circumferential positions thereof coincide with each other.

The iron member is provided with plural annular projecting portions 280, more specifically, two annular projecting portions 280 which project toward the permanent magnets, i.e., project outwardly, and which are disposed adjacent to each other in the extending direction of the through hole 261, i.e., in the direction of reciprocation of the movable element 253. Magnetic fluxes run through the projecting portion 280, which is disposed at one position in the extending direction of the through hole 261, and the permanent magnets 254 and 255 and the permanent magnets 256 and 257 which are disposed at the same position as this projecting portion 280 in the extending direction of the through hole 261, and on the other hand, magnetic fluxes run through the projecting portion 280, which is disposed at the other position in the extending direction of the through hole 261, and the permanent magnets 254 and 255 and the permanent magnets 256 and 257 which are disposed at the same position as this projecting portion 280 in the extending direction of the through hole 261.

The linear actuator 251 in the fifteenth embodiment explained above achieves the same effects as that achieved in the fourteenth embodiment, and in addition, because plural sets of pair of permanent magnets 254 and 255 and pair of permanent magnets 256 and 257 are arranged in the direction of reciprocation, a stronger magnetic field due to the permanent magnets and a greater magnetomotive force due to electrical current can be obtained. Moreover, because the iron member 272 is provided with plural annular projecting portions 280 which project toward the permanent magnets 254 to 257, and which are disposed adjacent to each other in the direction of reciprocation of the movable element 253, attracting force is efficiently applied to the end face of the projecting portion 280 at either movement, and as a result, the movable element can be driven with a greater force.

Figure 33:
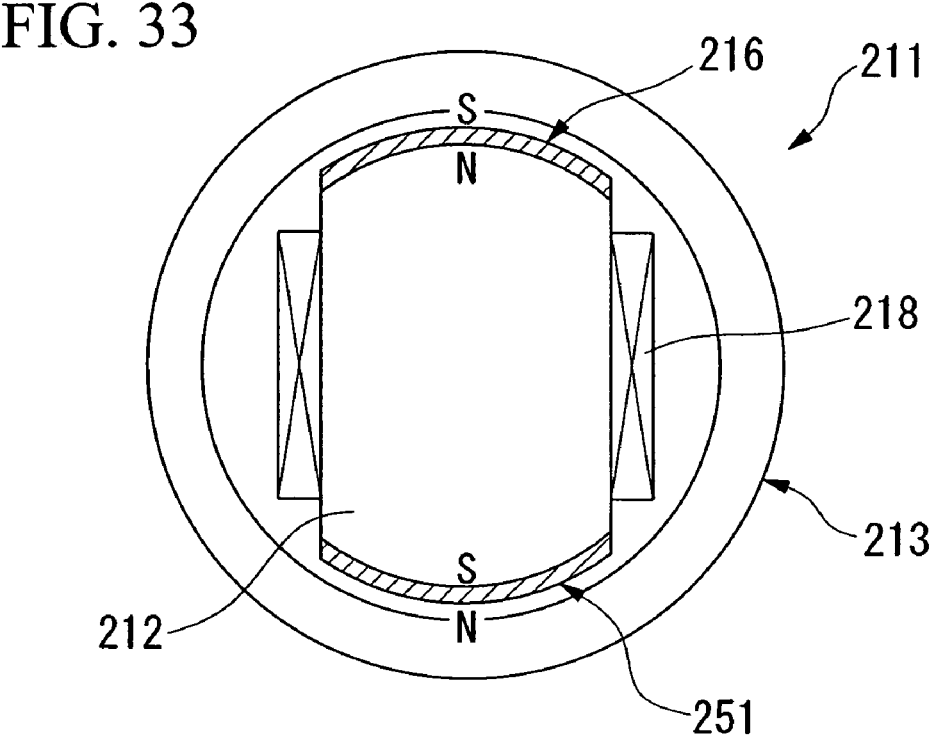
FIG. 33 is a front cross-sectional view showing an alternate example of the thirteenth embodiment of the liner actuator according to the present invention.
Figure 34:
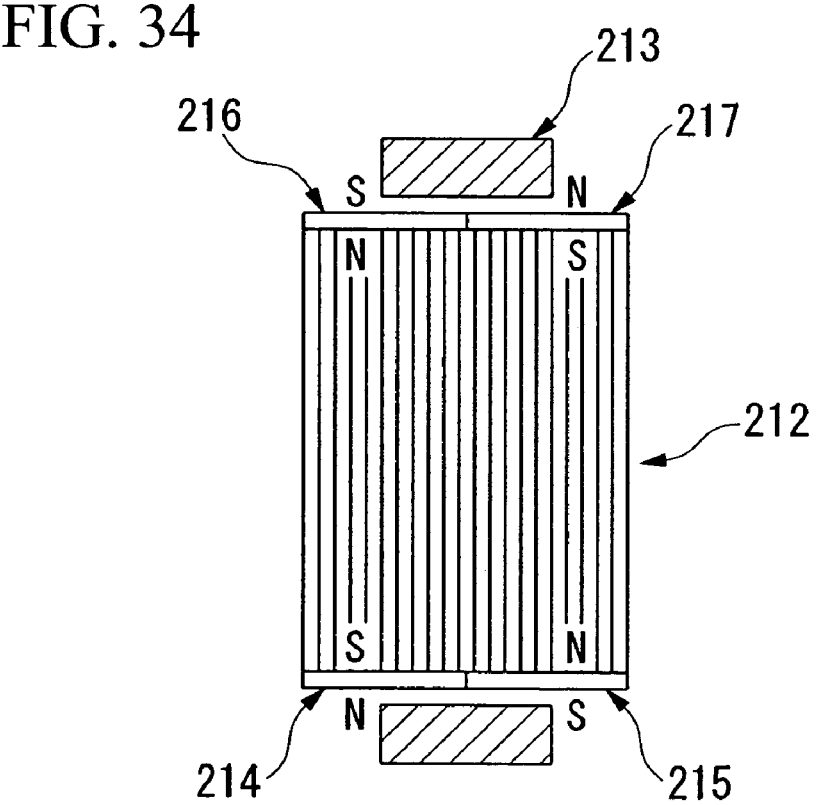
FIG. 34 is a side cross-sectional view showing an alternate example of the thirteenth embodiment of the liner actuator according to the present invention.
Figure 35:
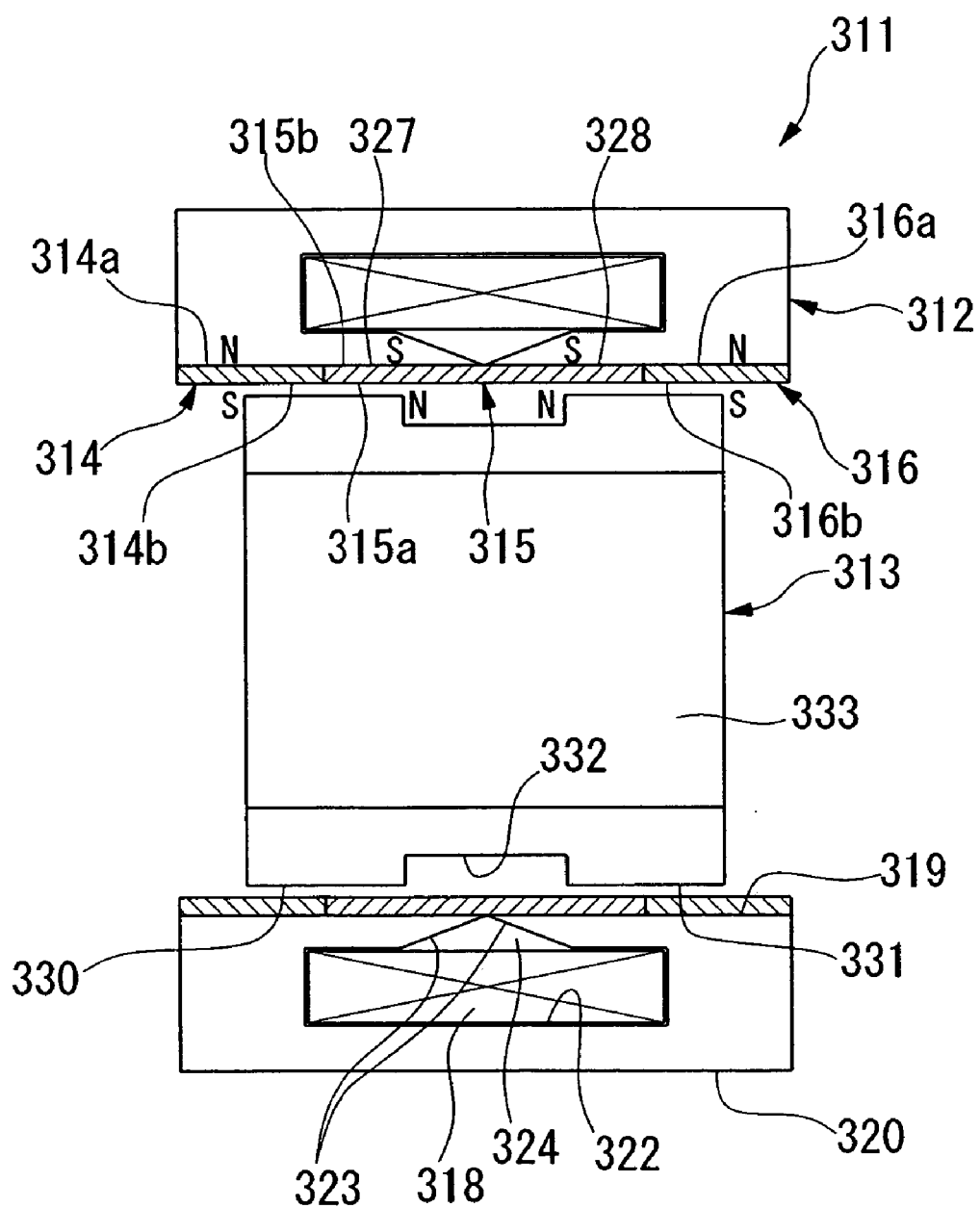
FIG. 35 is a side cross-sectional view showing a sixteenth embodiment of the liner actuator according to the present invention.

In all linear actuators 211 explained above, the central axis side and the outer side may be reversed. For example, as shown in FIGS. 33 and 34, the permanent magnets 214 and 215 and permanent magnets 216 and 217 may be disposed outside the yoke 212 including the coil 218, and the cylindrical movable element 213 may be disposed outside the permanent magnets 214 and 215 and permanent magnets 216 and 217 in a reciprocatable manner. If such a structure is employed, when the overall size is unchanged, the coil 218 can be made small; therefore, copper loss is reduced, the area at which force is generated can be made larger, and efficiency can be improved.

Next, a modified example of the fourteenth embodiment will be explained below with reference to FIGS. 55 and 56.

Figure 55:
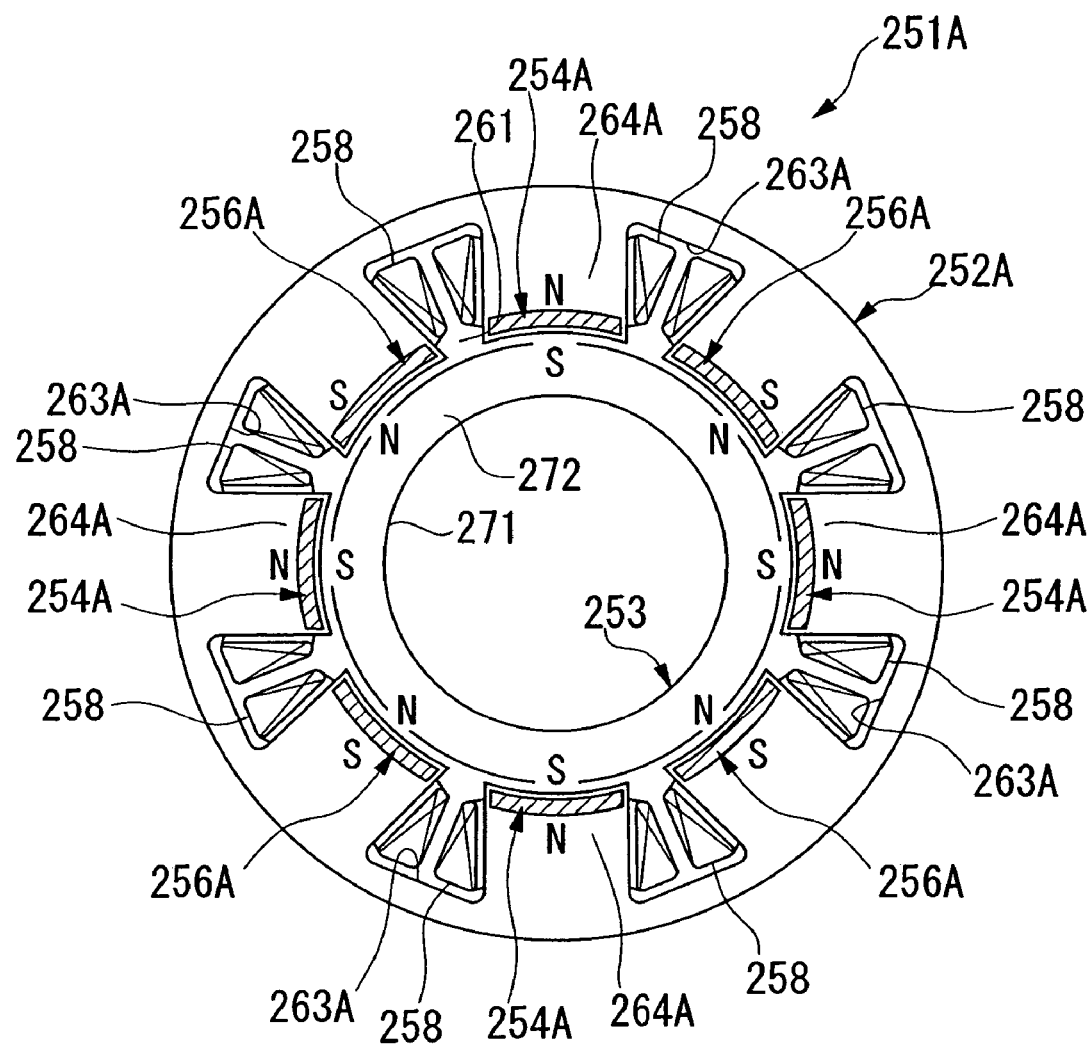
FIG. 55 is a front cross-sectional view showing an alternate example of the fourteenth embodiment of the liner actuator according to the present invention.
Figure 56:
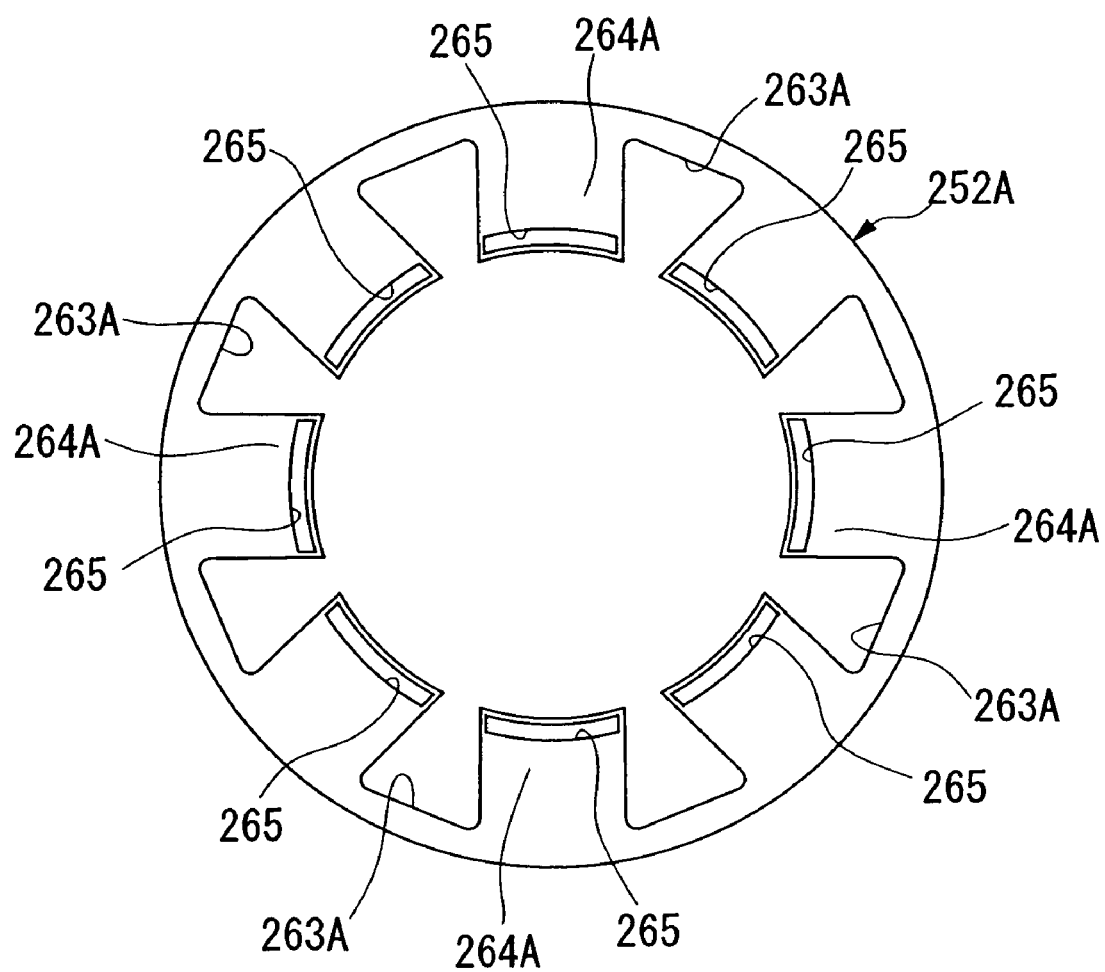
FIG. 56 is a front cross-sectional view showing only a stator of the alternate example of the fourteenth embodiment of the liner actuator according to the present invention.

The linear actuator 251A according to the modified example differs from the linear actuator 251 according to the fourteenth embodiment in that, as shown in FIG. 56, a window 265 is formed in a portion of each of the projecting portions 264A that is disposed near the stator 252A, and as shown in FIG. 55, a first pair of permanent magnets 254A (the other pair is not shown) and a second pair of permanent magnets 256A are accommodated in the windows 265. The size of the windows is determined so that each of the permanent magnets 254A and 256A can be fixed just by inserting thereinto.

According to the linear actuator 251A of the modified example, because the permanent magnets 254A and 256A are mechanically fixed in the windows 265, in contrast to the case in which permanent magnets are fixed to the surface of the stator using adhesive, reliability regarding retention of the permanent magnets is improved. Moreover, because the size of the gaps between the stator 252A and the movable element 253 is not affected by positional variation of the permanent magnets due to thickness variation of adhesive, accuracy of the gaps is improved. Furthermore, even when foreign particles are jammed in the gaps, the permanent magnets 254A and 256A will not be broken.

Next, a sixteenth embodiment of the linear actuator according to the present invention will be explained below with reference to FIGS. 35 to 44.

As shown in FIG. 34, a liner actuator 311 according to the sixteenth embodiment includes a yoke (stator) 312, a movable element 313 disposed inside the yoke 312 in a reciprocatable manner, permanent magnets 314, 315, and 316 fixed to the yoke 312, and coil 318 fixed to the yoke 312.

The yoke 312 is, overall, formed in a cylindrical shape. A substantially cylindrical-shaped accommodating space 322 is formed in the yoke 312 in a predetermined range at the middle portion thereof in the axial direction and between an inner peripheral surface 319 and an outer peripheral surface 320. Moreover, tapered surfaces 323, which merge with the inner peripheral surface 319 at the middle portion of the yoke 312 in the axial direction, and each of which extends from the middle portion of the yoke 312 in the axial direction while extending radially outward as it extends away from the middle portion and away on the axial direction, are formed in a predetermined range at the middle portion of the yoke 312 in the axial direction and between the inner peripheral surface 319 and the accommodating space 322. A space between the pair of tapered surfaces 323 and the accommodating space 322 is designated as an air gap (a magnetic gap) 324.

The yoke 312 is made by sintering a sintering material which is, for example, a magnetic material. The yoke 312 is not provided with a back yoke extending inward of the movable element 313.

In the accommodating space 322 of the yoke 312, there is disposed the coil 318.

The permanent magnets 314, 315, and 316, which are ferrite magnets whose radiuses coincide with each other, are coaxially arranged in series and adjacent to each other, and are inserted into and fixed to the yoke 312 so as to, overall, cover the entire inner peripheral surface 319 of the yoke 312. The axial lengths of the permanent magnets 314 and 316, which are disposed at outer portions in the axial direction, coincide with each other, and the axial length of the permanent magnet 315, which is disposed between the permanent magnets 314 and 316, is two times that of the permanent magnet 314 or 316.

The permanent magnets 314, 315, and 316 are of radially anisotropic type having magnetic poles perpendicular to the axial direction, and the orientations of the magnetic poles of two of them adjacent to each other differ from each other. More specifically, with regard to the permanent magnet 314 disposed at one position in the axial direction, the N-pole 314a is disposed radially outside, and the S-pole 314b is disposed radially inside, with regard to the permanent magnet 315 disposed at the middle position in the axial direction, the N-pole 315a is disposed radially inside, and the S-pole 315b is disposed radially outside, and with regard to the permanent magnet 316 disposed at the other position in the axial direction, the N-pole 316a is disposed radially outside, and the S-pole 316b is disposed radially inside.

The middle permanent magnet 315 is magnetically divided, at the middle portion thereof, into a first region 327 and a second region 328 by the air gap 324 formed in the yoke 312, to which the permanent magnet 315 is fixed, while being adjacent to the permanent magnet 315, so that the first region 327 and the second region 328 act as independent permanent magnets, respectively. The permanent magnet 314 and the first region 327, which is disposed adjacent to the permanent magnet 314, of the permanent magnet 315 act as a pair of permanent magnets (a first pair of permanent magnets), and the permanent magnet 316 and the second region 328, which is disposed adjacent to the permanent magnet 316, of the permanent magnet 316 act as another pair of permanent magnets (a second pair of permanent magnets).

As explained above, a portion of the pair of permanent magnet 314 and the first region 327 of the permanent magnet 315, and a portion of the pair of the second region 328 of the permanent magnet 315 and the permanent magnet 316, which are disposed adjacent to each other, i.e., the first region 327 and the second region 328, are formed by the common permanent magnet 315. As a result, the orientations of the magnetic poles of the first region 327 of the permanent magnet 315 and second region 328 of the permanent magnet 315 coincide with each other. In the yoke 312, there is formed the air gap 324 which is disposed between the pair of permanent magnet 314 and the first region 327 of the permanent magnet 315 and the pair of the second region 328 of the permanent magnet 315 and the permanent magnet 316, and which is disposed adjacent thereto in a direction perpendicular to the axial direction.

The movable element 313 is, overall, formed in a cylindrical shape, and the diameter thereof is slightly less than the inner diameter of the permanent magnets 314 to 316. The movable element 313 is disposed inside the yoke 312, i.e., inside the permanent magnets 314 to 316, in a coaxial manner while being opposed to the permanent magnets 314 to 316, so that the movable element 313 is reciprocatable with respect to the yoke 312 in the axial direction of the yoke 312.

In the movable element 313, there are formed two annular projecting portions 330 and 331 which are disposed adjacent to each other in the axial direction, i.e., in the direction of reciprocation of the movable element 313, and each of which projects toward the permanent magnets 314 to 316, i.e., projects radially outward, and as a result, a concave portion 332, which is formed so as to be concave radially inward, is formed between the projecting portions 330 and 331.

The length of the movable element 313 in the axial direction is less than that of the yoke 312 and that of the entire permanent magnets 314 to 316. More specifically, the length of the movable element 313 is determined such that, when the movable element 313 is disposed at the middle portion of the yoke 312 in the axial direction, the axially outer permanent magnets 314 and 316 respectively project from the movable element 313 by a half length of the permanent magnet 314 or 316.

The projecting portions 330 and 331 are provided in the movable element 313 at both sides thereof in the axial direction, and the width of each of them is equal to the axial length of the permanent magnet 314 or 316. As a result, when the movable element 313 is disposed at the middle portion of the yoke 312 in the axial direction, the projecting portion 330 is disposed at the middle portion of the pair of the permanent magnet 314 and the first region 327 of the permanent magnet 315, and the projecting portion 331 is disposed at the middle portion of the pair of the second region 328 of the permanent magnet 315 and the permanent magnet 316.

The movable element 313 is made of iron element which is a magnetic material; and which, as a whole, has not been magnetized, e.g., made of a sintering material.

Figure 36:
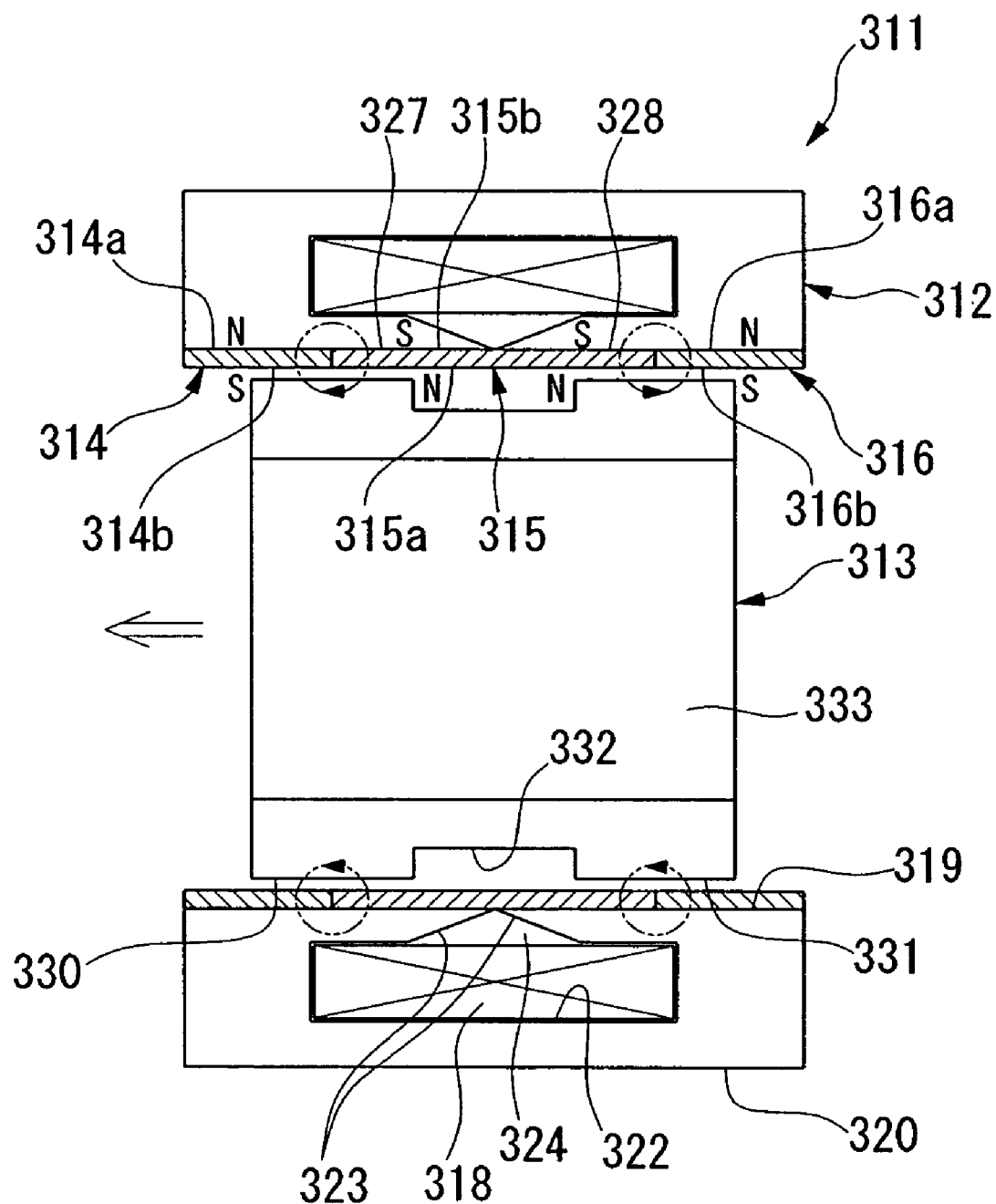
FIG. 36 is a side cross-sectional view showing the sixteenth embodiment of the liner actuator according to the present invention, in which magnetic fluxes under the condition in which electrical current does not flow through a coil are indicated by the two-dot chain lines.

In the linear actuator 311 having the structure explained above, when electrical current is not supplied to the coils 318, as indicated by the two-dot chain lines in FIG. 36, magnetic flux loops, which run through the yoke 212, the first region 327 of the permanent magnet 315, the movable element 313, the permanent magnet 314, and the yoke 312 in this order, are formed by the pair of the permanent magnet 314 and the first region 327 of the permanent magnet 315, and magnetic flux loops, which run through the yoke 312, the second region 328 of the permanent magnet 315, the movable element 313, the permanent magnet 316, and the yoke 312 in this order, are formed by the pair of the second region 328 of the permanent magnet 315 and the permanent magnet 316. At this moment, the movable element 313 does not move.

Alternating current (sinusoidal wave current or rectangular wave current) is supplied to the coil 318.

Figure 37:
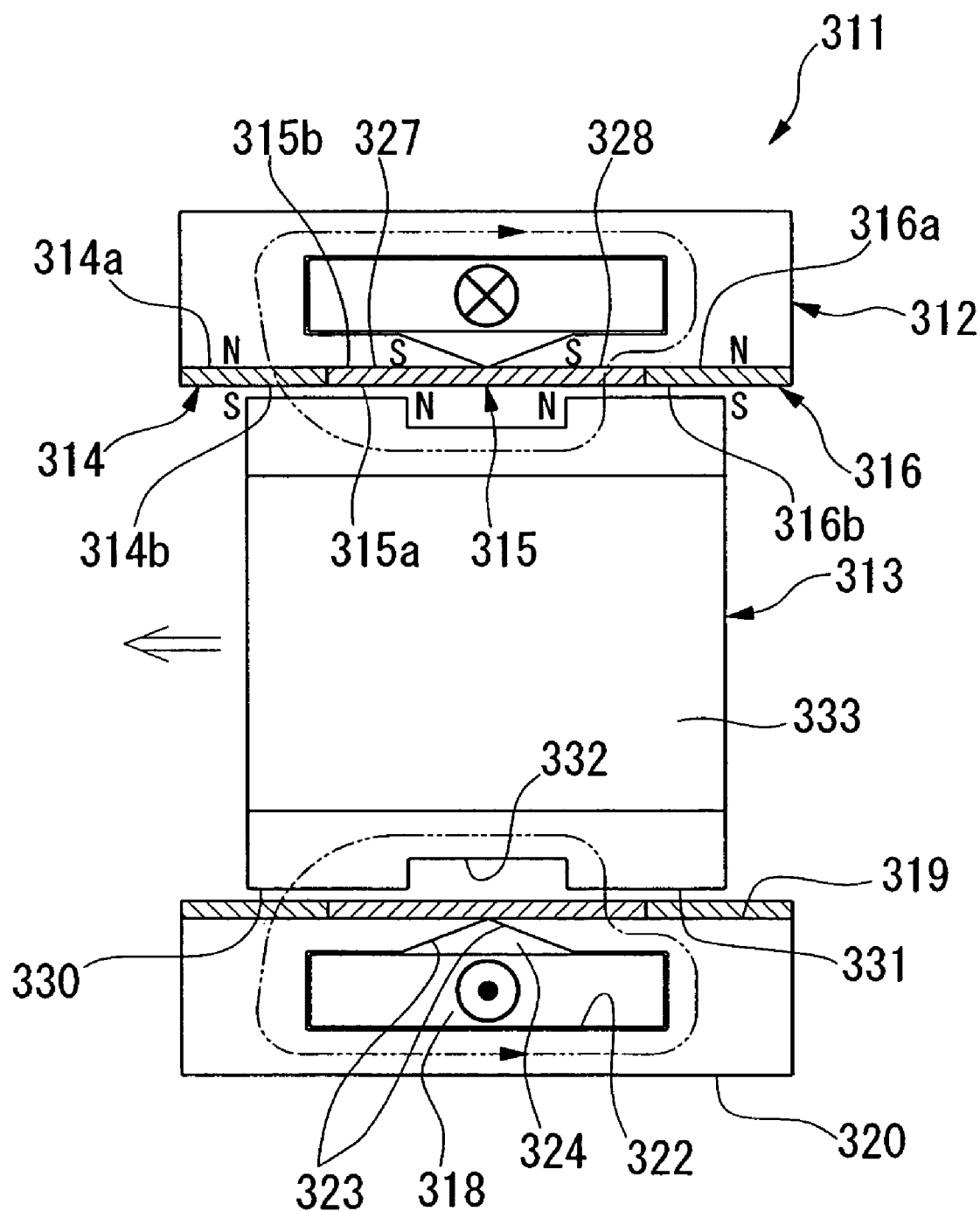
FIG. 37 is a side cross-sectional view showing the sixteenth embodiment of the liner actuator according to the present invention, in which magnetic fluxes under the condition in which electrical current flows through the coil in one direction are indicated by the two-dot chain lines.

As shown in FIG. 37, when, for example, the coil 318 is supplied with electrical current that flows in one direction (in the clockwise direction as viewed from the right in FIG. 37), magnetomotive force circulating in the coil 318 in one direction is generated. At this moment, as indicated by the two-dot chain lines in FIG. 37, magnetic flux loops, which run through the yoke 312, the second region 328 of the permanent magnet 315 which is disposed near the pair of the permanent magnet 314 and the first region 327 of the permanent magnet 315 among the pair of the second region 328 of the permanent magnet 315 and the permanent magnet 316, the movable element 313, and the permanent magnet 314 which is disposed away from the second region 328 of the permanent magnet 315 and the permanent magnet 316 among the pair of permanent magnet 314 and the first region 327 of the permanent magnet 315, and the yoke 312 in this order, are formed by the pair of the permanent magnet 314 and the first region 327 of the permanent magnet 315 and the pair of the second region 328 of the permanent magnet 315 and the permanent magnet 316.

Accordingly, because the magnetic fluxes run through the permanent magnet 314 that is disposed at one side (at the left side in FIG. 37) of the pair of the permanent magnet 314 and the first region 327 of the permanent magnet 315, and the second region 328 of the permanent magnet 315 that is disposed at one side (at the left side in FIG. 37) of the pair of the second region 328 of the permanent magnet 315 and the permanent magnet 316, the movable element 313 moves in one direction (to the left in FIG. 37) of the axial direction.

Figure 38:
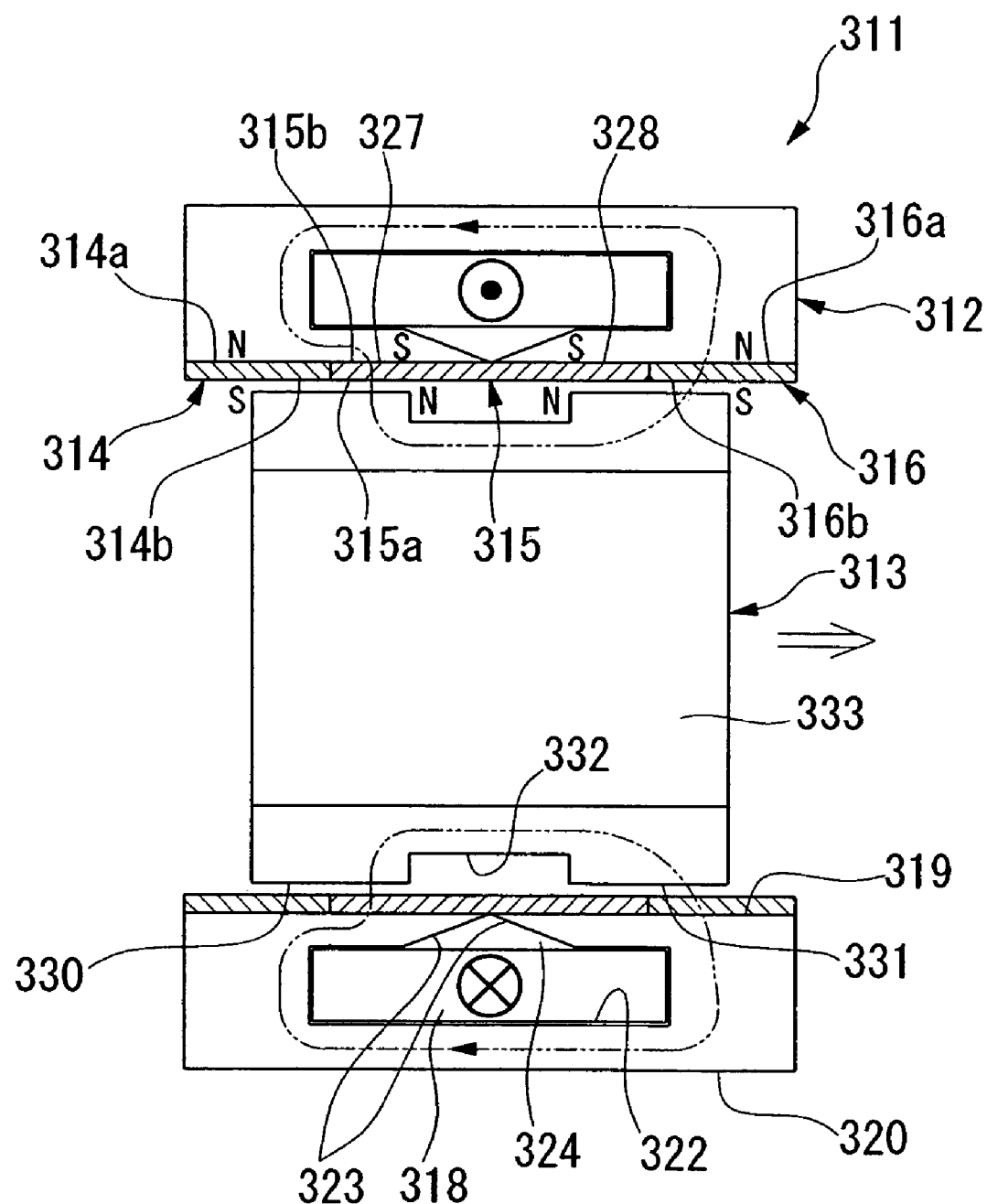
FIG. 38 is a side cross-sectional view showing the sixteenth embodiment of the liner actuator according to the present invention, in which magnetic fluxes under the condition in which electrical current flows through the coil in the opposite direction are indicated by the two-dot chain lines.

Next, as shown in FIG. 38, when the coil 318 is supplied with electrical current that flows in the opposite direction (in the counterclockwise direction as viewed from the right in FIG. 38), magnetomotive force circulating in the coil 318 in the direction opposite to that in the above case is generated. At this moment, as indicated by the two-dot chain lines in FIG. 38, magnetic flux loops, which run through the yoke 312, the first region 327 of the permanent magnet 315 which is disposed near the pair of the second region 328 of the permanent magnet 315 and the permanent magnet 316 among the pair of the permanent magnet 314 and the first region 327 of the permanent magnet 315, the movable element 313, the permanent magnet 316 disposed away from the pair of permanent magnet 314 and the first region 327 of the permanent magnet 315 among the pair of the second region 328 of the permanent magnet 315 and the permanent magnet 316, and the yoke 312, are formed by the pair of the permanent magnet 314 and the first region 327 of the permanent magnet 315 and the pair of the second region 328 of the permanent magnet 315 and the permanent magnet 316.

Accordingly, because the magnetic fluxes run through the first region 327 of the permanent magnet 315 that is disposed at the other side (at the right side in FIG. 38) of the pair of the permanent magnet 314 and the first region 327 of the permanent magnet 315, and the permanent magnet 316 that is disposed at the other side (at the right side in FIG. 38) of the pair of the second region 328 of the permanent magnet 315 and the permanent magnet 316, the movable element 313 moves in the other direction (to the right in FIG. 38) of the axial direction.

Because the direction of the current supplied to the coils 318 is alternated, such an operation is repeated, the movable element 313 reciprocates at a predetermined stroke with respect to the yoke 312 in the axial direction.

According to the linear actuator 311 of the sixteenth embodiment explained above, because the coil 318 is provided not in the movable element 313, but in the yoke 312, electrical current does not have to be supplied to the movable element 313; therefore, the feeder lines connected to the coil 318 will not be broken due to the movement of the movable element 313. Accordingly, reliability in a continuous operation or the like can be improved.

Moreover, because the permanent magnets 314 to 316 are also provided not in the movable element 313, but in the yoke 312, the weight of the movable element 313 will not be increased even when the weighs of the permanent magnets 314 to 316 are increased in order to obtain high magnetic flux density for improvement in performance. Accordingly, it is easy to obtain improved performance (increased thrust).

In addition, because the movable element 313 does not include a permanent magnet, a magnetizing operation does not have to be applied to the movable element 313. Moreover, because the movable element 313 does not exhibit attracting force during a manufacturing process, it is easy to manufacture the movable element 313. Accordingly, the manufacturing process is simplified, which leads to reduction in cost.

In addition, because the movable element 313 is moved using the magnetic flux loops explained above, a portion of the yoke 312 as a back yoke does not have to be disposed at a position opposite to the movable element 313 with respect to the permanent magnets 314 to 316, i.e., radially inside. Accordingly, a space located opposite to the movable element 313 with respect to the permanent magnets 314 to 316, i.e., an radially inner space 333, can be efficiently used. More specifically, a cylinder or a piton thereof can be disposed therein.

Moreover, because an air gap is formed in the yoke 312 so as to be adjacent to a position between the pair of the permanent magnet 314 and the first region 327 of the permanent magnet 315, and the pair of the second region 328 of the permanent magnet 315 and the permanent magnet 316, forming of magnetic fluxes running through the yoke 312 and the movable element 313 by one of the pair of the permanent magnet 314 and the first region 327 of the permanent magnet 315 is ensured, and forming of magnetic fluxes running through the yoke 312 and the movable element 313 by one of the pair of the second region 328 of the permanent magnet 315 and the permanent magnet 316 is ensured, even when the permanent magnet 314 is commonly used. Instead of the air gap 324, a non-magnetic material (a magnetic gap) may be disposed.

Figure 39:
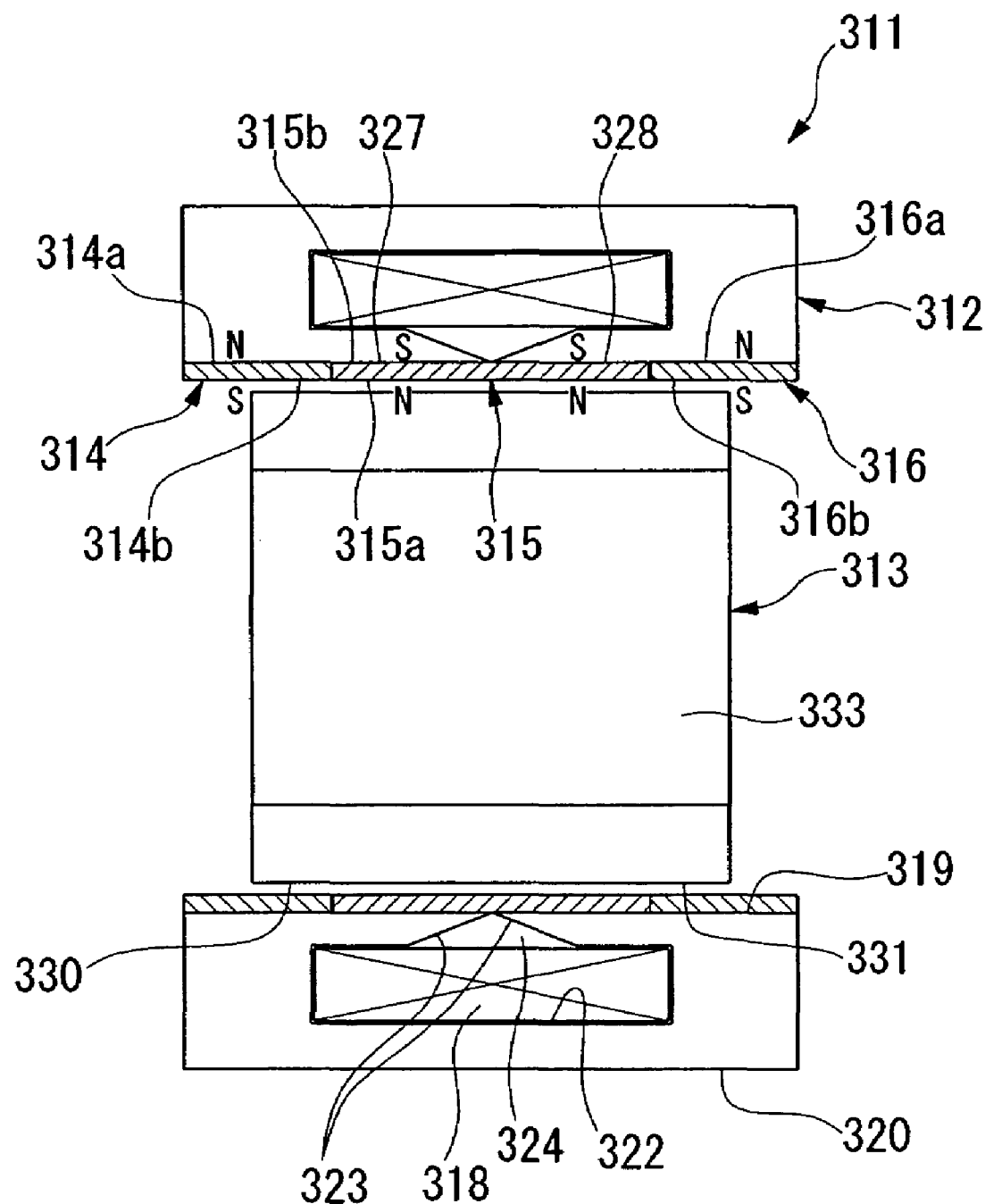
FIG. 39 is a side cross-sectional view showing an alternate example of the sixteenth embodiment of the liner actuator according to the present invention.

As shown in FIG. 39, the movable element 313 may be of cylindrical shape not having the projecting portions 330 and 331 on the outer surface thereof; however, it is preferable that the movable element 313 include the projecting portions 330 and 331 on the outer surface thereof as described above because attracting force can be efficiently applied to the end face of the projection portion 330 or 331, which is arranged perpendicular to the direction of reciprocation, during both movements in the reciprocation.

Figure 40:
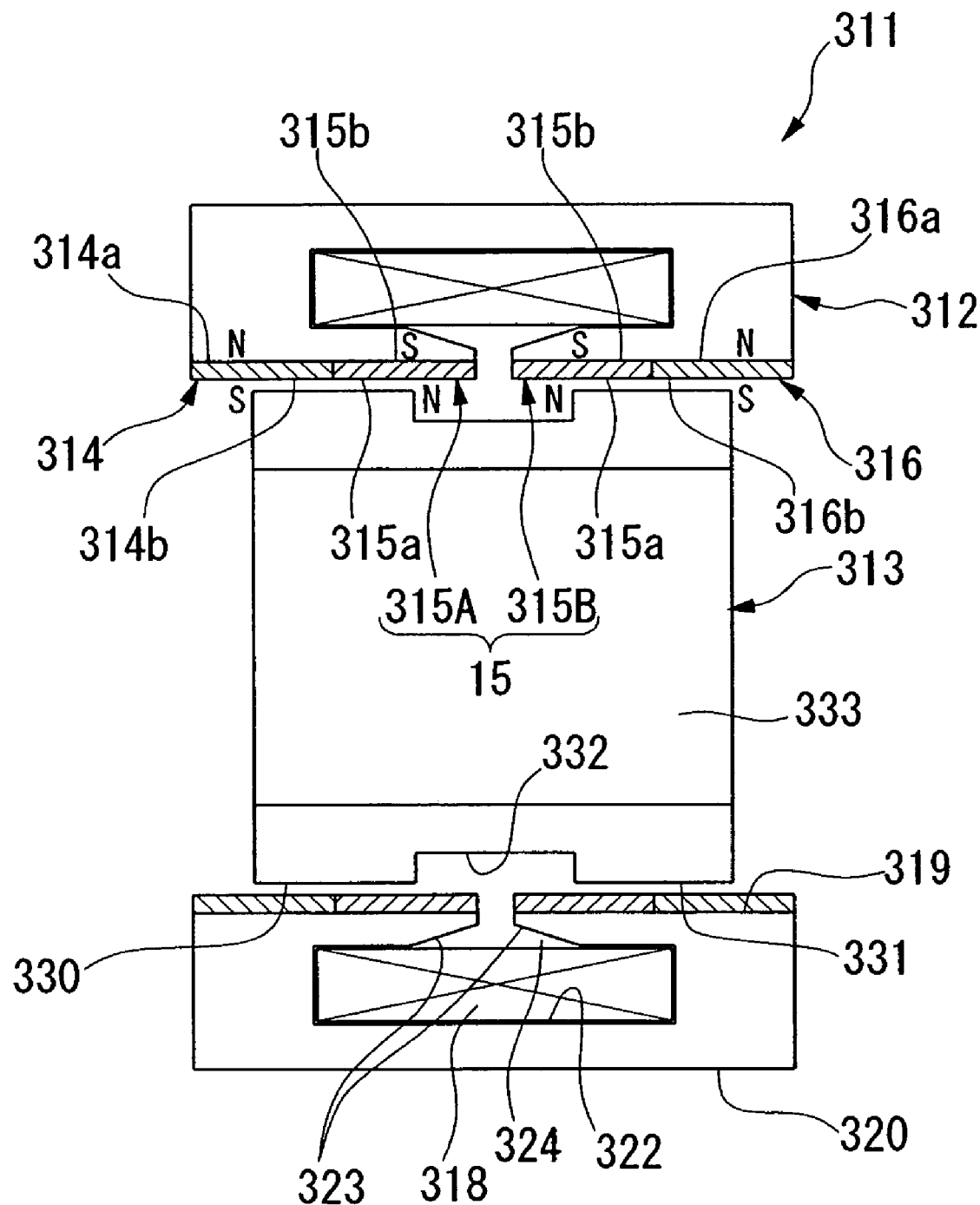
FIG. 40 is a side cross-sectional view showing another alternate example of the sixteenth embodiment of the liner actuator according to the present invention.

Moreover, as shown in FIG. 40, the middle permanent magnet 315 disposed at the middle position in the axial direction may be divided into two permanent magnets 315A and 315B. In this case, the permanent magnets 315A and 315B may be separated from each other at the inner surface of the yoke 312 and at the position corresponding to the air gap 324; however, it is preferable that the single permanent magnet 315 be commonly used as described above because the number of parts can be reduced, and manufacturing cost including attaching the permanent magnets can be reduced.

Figure 41:
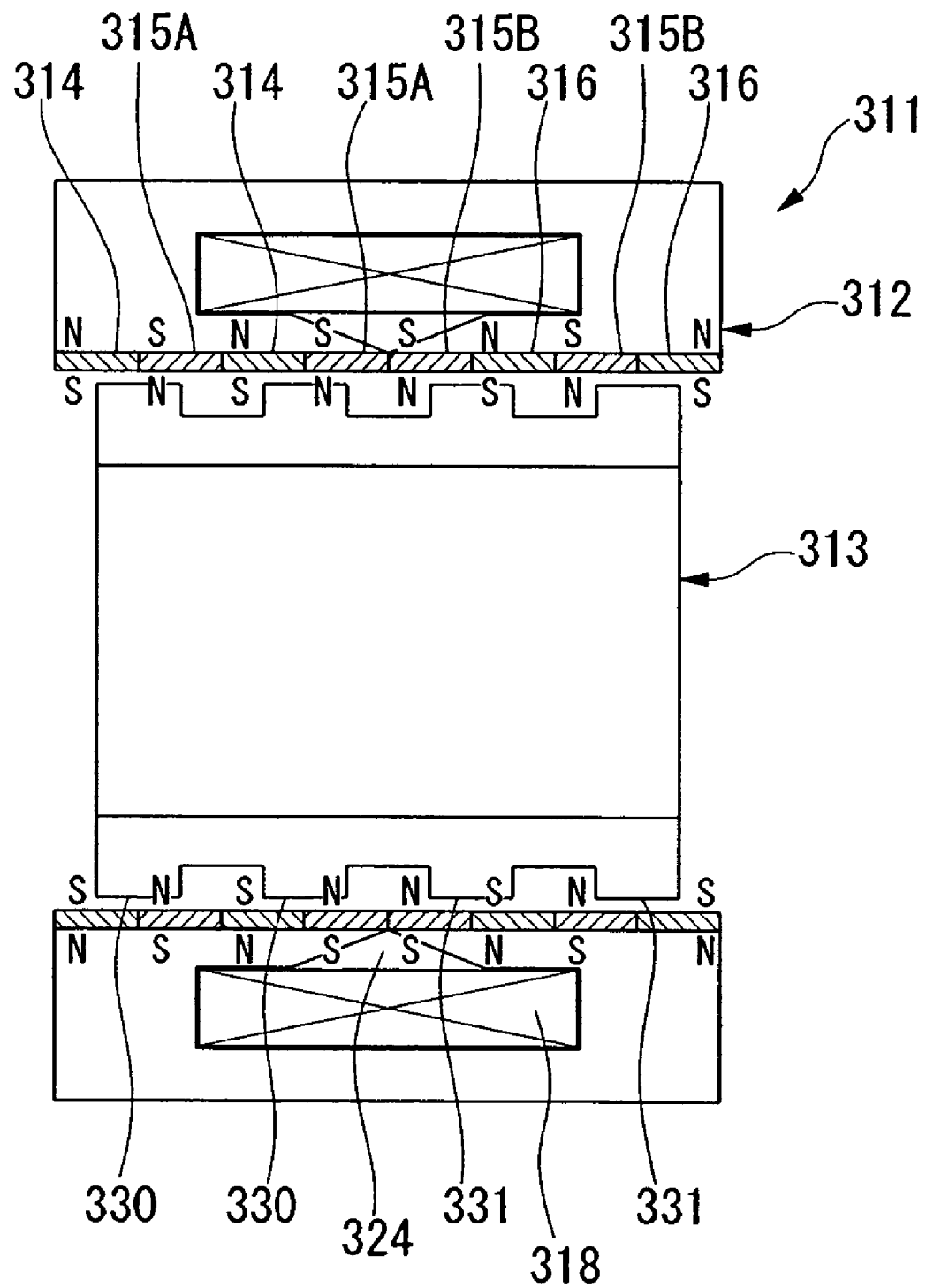
FIG. 41 is a side cross-sectional view showing another alternate example of the sixteenth embodiment of the liner actuator according to the present invention.

In addition, as shown in FIG. 41, the middle permanent magnet 315 disposed at the middle position in the axial direction may be divided into two permanent magnets 315A and 315B, and the permanent magnets 315A and 315B may be disposed so as to be adjacent to each other without providing a gap at the inner surface of the yoke 312 and at the position corresponding to the air gap 324.

Furthermore, in all of the linear actuators 311 described above, plural pairs of permanent magnets may be disposed so as to be adjacent to each other. For example, as shown in FIG. 41, plural pairs of the permanent magnets 314 and 315A may be disposed so as to be adjacent to each other in the axial direction, and plural pairs of the permanent magnets 315B and 316 may be disposed so as to be adjacent to each other in the axial direction. By constituting in this manner, the thrust force is increased in proportion with the pitch even though the stroke is decreased.

Figure 42:
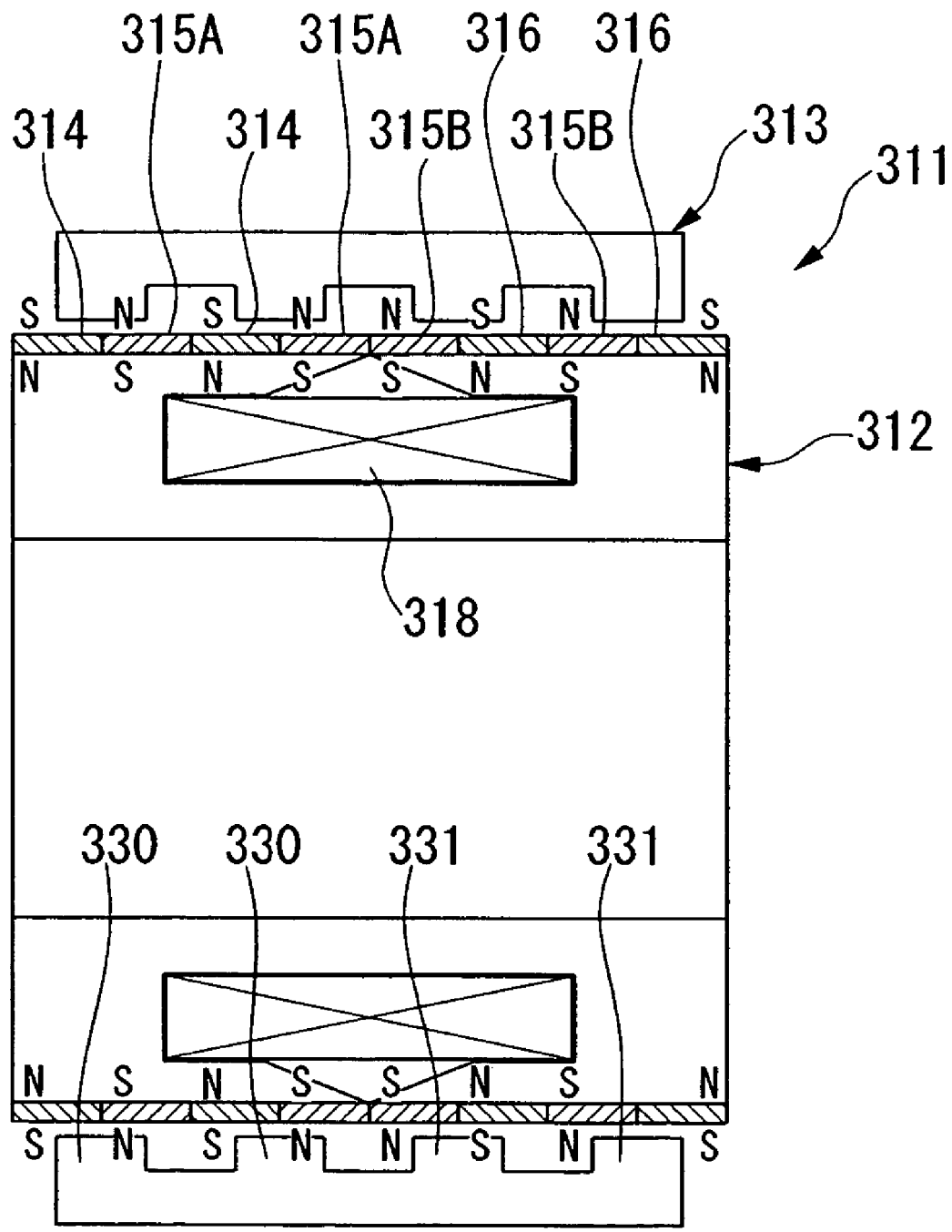
FIG. 42 is a side cross-sectional view showing yet another alternate example of the sixteenth embodiment of the liner actuator according to the present invention.

Moreover, in all of the linear actuators 311 described above, the central axis side and the outer side may be reversed. For example, as shown in FIG. 42, the permanent magnets 314 and 315A and permanent magnets 315B and 316 may be disposed outside the yoke 312 including the coil 318, and the cylindrical movable element 313 may be disposed outside the permanent magnets 314 and 315A and permanent magnets 315B and 316. If such a structure is employed, when the overall size is unchanged, the coil 318 can be made small; therefore, copper loss is reduced, the area at which force is generated can be made larger, and efficiency can be improved. In this case, as shown in FIG. 42, plural pairs of the permanent magnets 314 and 315A may be disposed so as to be adjacent to each other in the axial direction, and plural pairs of the permanent magnets 315B and 316 may be disposed so as to be adjacent to each other in the axial direction.

In addition, for the permanent magnets 314 to 316, in addition to a ferrite magnet, a magnet made of rare earth element such as neodymium or samarium cobalt, or plastic magnet may be used; however, it is preferable to use the ferrite magnet in terms of reduction in cost.

Figure 43:
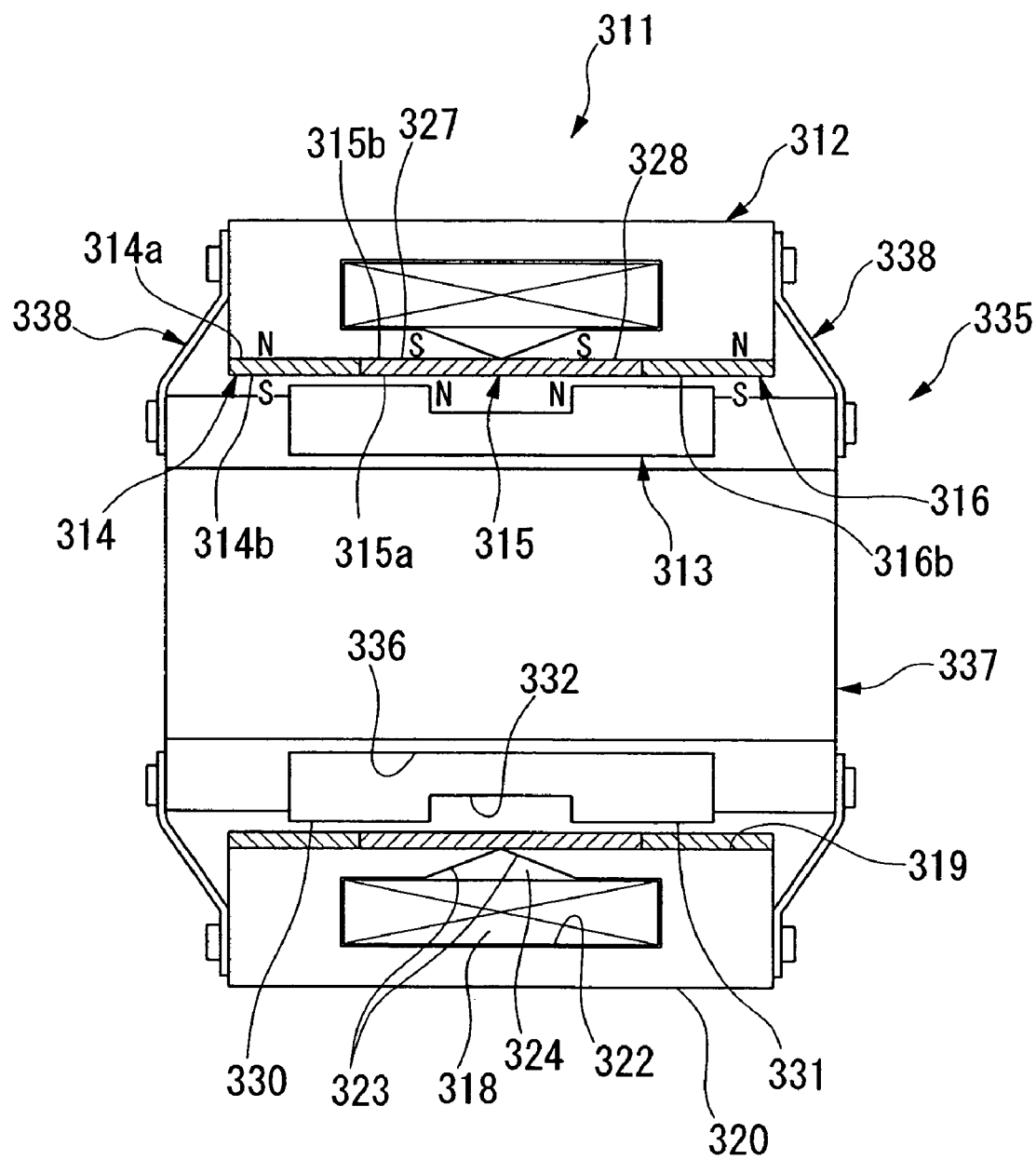
FIG. 43 is a side cross-sectional view showing a linear motor including the linear actuator of the sixteenth embodiment of the present invention.
Figure 44:
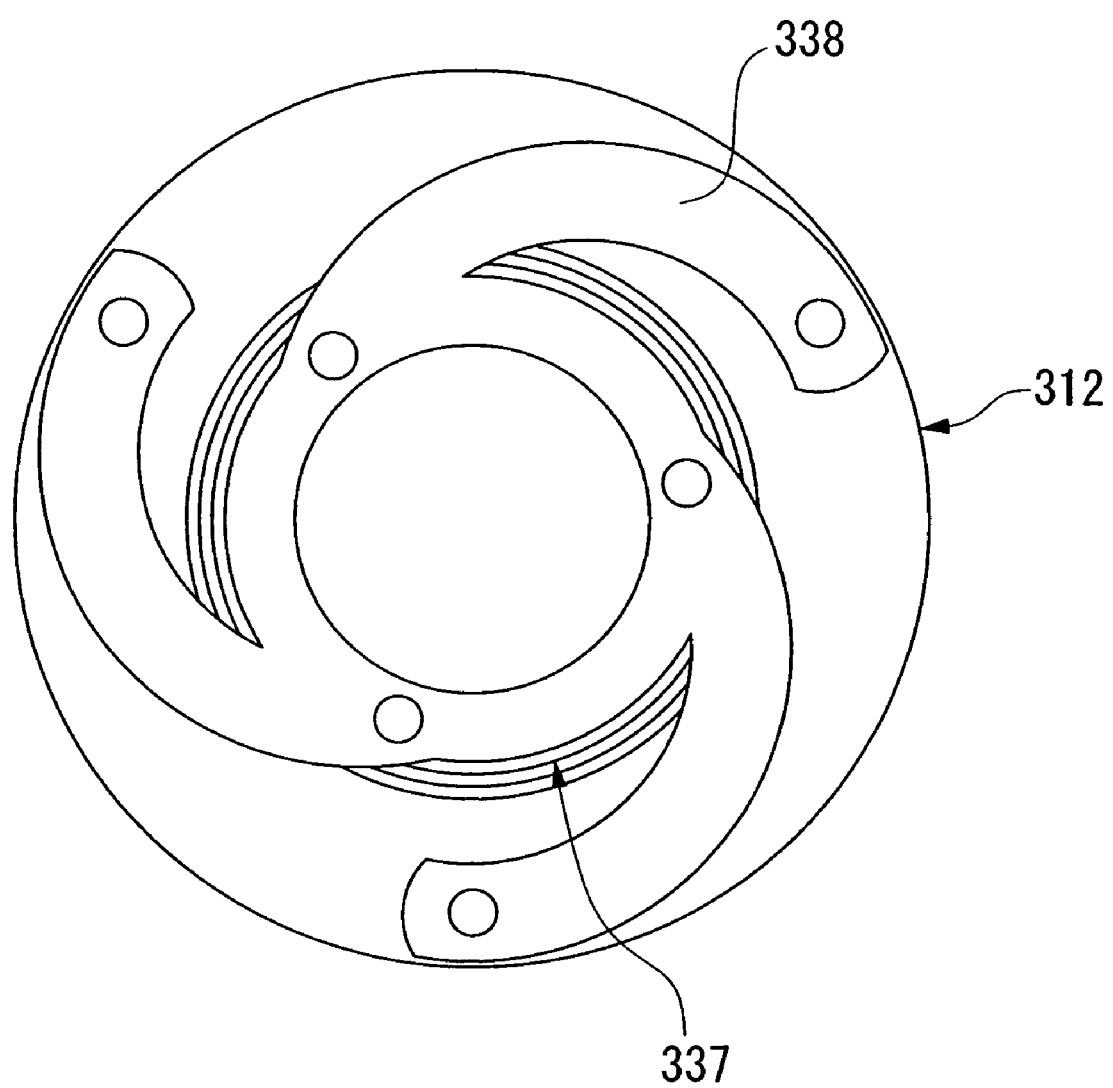
FIG. 44 is a front view showing the linear motor including the linear actuator of the sixteenth embodiment of the present invention.

As shown in FIGS. 43 and 44, for, example, the linear actuator 311 according to the sixteenth embodiment may be used as a liner motor by providing a support mechanism 335 that supports the movable element 313 on the yoke 312 in a movable manner. The support mechanism 335 includes a cylindrical holding member 337 which is made of a non-magnetic material, and which holds the movable element 313 in an annular concave portion 336 that is formed at predetermined region in the axial direction so as to be concave from the outer surface thereof, and a pair of leaf springs (spring members) 338, each of which connects an end of the holding member 337 in the axial direction to an end of the yoke 312 in the axial direction which is close to the end of the holding member 337. The leaf springs 338 holds the movable element 313 at the middle portion of the yoke 312 when electrical current is not supplied to the coil 318.

Moreover, the linear actuator 311 may be used as a linear servo actuator, which is capable of controlling speed and position, by providing position and speed sensors thereon, and by executing a closed-loop control.

Figure 45:
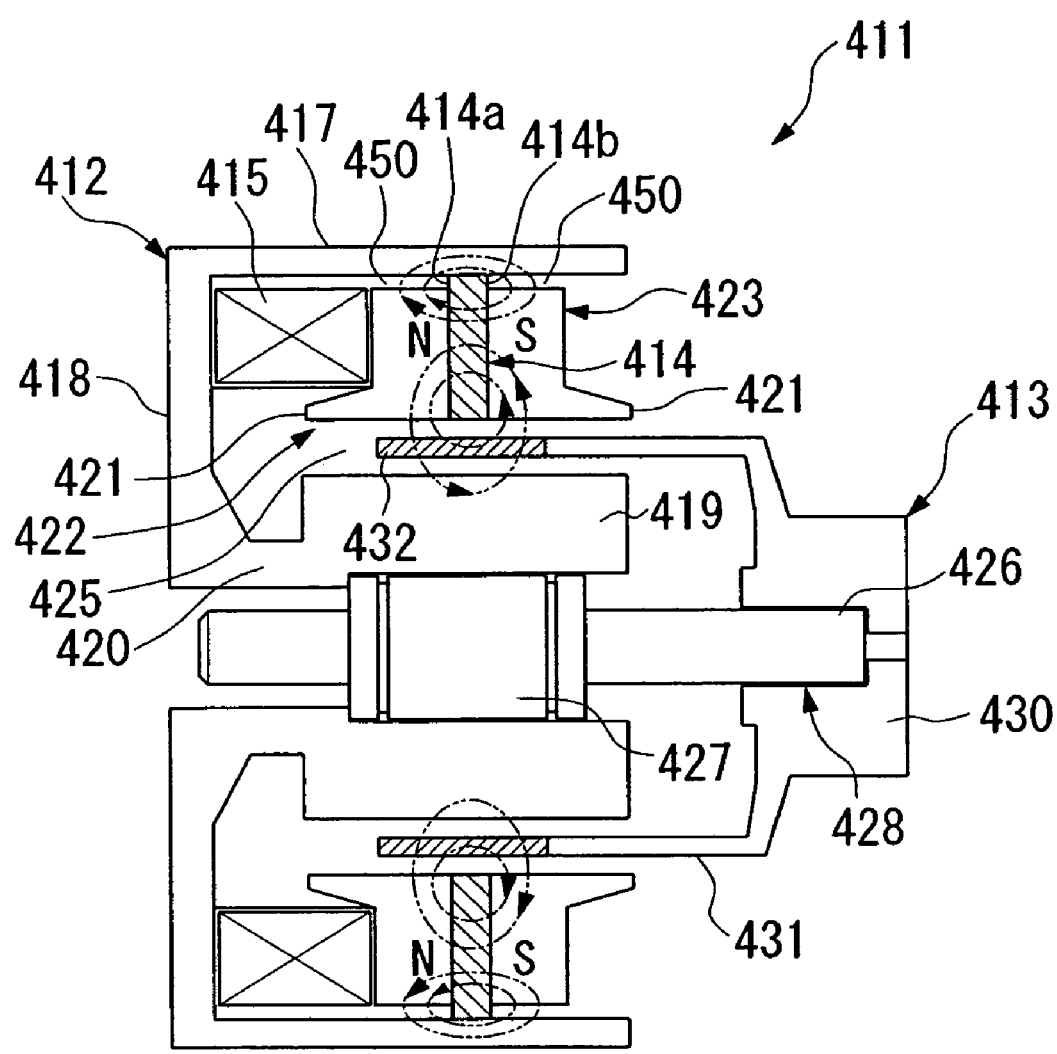
FIG. 45 is a side cross-sectional view showing a seventeenth embodiment of the liner actuator according to the present invention, in which magnetic fluxes under the condition in which electrical current does not flow through a coil are indicated by the two-dot chain lines.

Next, a seventeenth embodiment of the linear actuator according to the present invention will be explained below with reference to FIGS. 45 to 47.

A linear actuator 411 according to the seventeenth embodiment includes a yoke (stator) 412, a movable element 413 which is reciprocatable with respect to the yoke 412, a permanent magnet 414 fixed to the yoke 412, and a coil 415 fixed to the yoke 412.

The yoke 412 includes an outer cylindrical portion 417 having a cylindrical shape, a bottom plate 418 having a thin ring shape and disposed at one side in the axial direction with respect to the outer cylindrical portion 417, a ring-shaped connection portion 420 extending in the axial direction from an inner portion of the bottom plate 418 toward the same side as the outer cylindrical portion 417 extends, a cylindrical inner magnetic pole 419 provided on the connection portion 420 so as to be coaxial with the outer cylindrical portion 417.

The yoke 412 including the outer cylindrical portion 417, the bottom plate 418, the connection portion 420, and the inner magnetic pole 419 is integrally formed by sintering a sintering material which is a common magnetic material.

The coil 415 has a ring shape, and is fixed to the yoke 412 so as to be coaxial therewith in an inside corner portion where the bottom plate 418 merges with the outer cylindrical portion 417.

The permanent magnet 414 having a thin ring shape is made of a ferrite magnet, in which two magnetic poles, i.e., an N-pole 414a and an S-pole 414b are arranged side by side in the axial direction. At both sides in the axial direction with respect to the permanent magnet 414, there are disposed an annular-shaped outer magnetic pole (magnetic pole element) 422 having L-shaped cross section and an annular-shaped outer magnetic pole (magnetic pole element) 423 having L-shaped cross section, which respectively include cylindrical-shaped projecting portions 421 at radially inner portion thereof that opposingly project in the axial direction. The pair of outer magnetic pole 422 and outer magnetic pole 423 is also made of the sintering material.

The outer diameter of the permanent magnet 414 is determined such that the permanent magnet 414 is fixed to the outer cylindrical portion 417 of the yoke 412 by pressing thereinto, and on the other hand, the outer diameters of the pair of outer magnetic pole 422 and outer magnetic pole 423 are determined to be less than that of the outer cylindrical portion 417 of the yoke 412.

The permanent magnet 414 and the outer magnetic poles 422 and 423 are fixed to each other so as to form a single body in such a manner that permanent magnet 414 and the outer magnetic poles 422 and 423 are disposed coaxially, and the permanent magnet 414 is sandwiched by the annular-shaped outer magnetic poles 422 and 423 at the both sides thereof in a direction along which the magnetic poles 414a and 414b are arranged.

The permanent magnet 414 and the pair of outer magnetic poles 422 and 423 are fixed to the yoke 412 while being coaxial therewith by pressing the single body, at the outer surface of the permanent magnet 414, into inside the outer cylindrical portion 417 of the yoke 412.

As a result, in this fixed state, between the outer magnetic pole 422 and the outer cylindrical portion 417 of the yoke 412, and between the outer magnetic pole 423 and the outer cylindrical portion 417 of the yoke 412, there are formed annular gaps (magnetic gaps) 450 which are magnetic reluctance sections that act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423.

Moreover, in this fixed state, the N-pole 414a of the permanent magnet 414 is disposed near the bottom plate 418, the S-pole is disposed away from the bottom plate 418, and the outer magnetic pole 422 disposed near the bottom plate 418 is located adjacent to the coil 415 in the axial direction.

Moreover, in this fixed state, the permanent magnet 414 and the pair of outer magnetic poles 422 and 423, as a whole, are coaxially disposed outside the cylindrical-shaped inner magnetic pole 419 while having the same length as that of the inner magnetic pole 419, so as to form an annular gap 425 with the inner magnetic pole 419.

Radially inside the inner magnetic pole 419 of the yoke 412, a ball bushing 428, which supports a shaft 426 in a movable manner using a bushing 427, is coaxially fixed thereto at the bushing 427. The movable element 413 is fixed to the shaft 426 which is supported by the bushing 427 in a movable manner. The shaft 426 and the movable element 413 together reciprocate along the axial direction with respect to the bushing 427 that is fixed to the yoke 412.

The movable element 413 includes a base portion 430, a cylindrical portion 431, and an iron member 432. The base portion 430 has a substantially circular plate shape and is fixed to the shaft 426. The cylindrical portion 431 is disposed in the gap 425 in a state in which the base plate 430 is fixed to the shaft 426. The iron member 432, as a movable magnetic pole, has the same diameter as that of the cylindrical portion 431, and is coaxially fixed to the cylindrical portion 431 at a position opposite to the base portion 430. Accordingly, the iron member 432 of the movable element 413 is coaxially disposed in the gap 425, and the central position of the iron member 432 in the axial direction substantially coincides with the central position of the permanent magnet 414.

In the movable element 413, the base portion 430 and the cylindrical portion 431 are made of synthetic resin such as an engineering plastic, which is a non-magnetic material, and the iron member 432 is made of a sintering and magnetic material which has not been magnetized. The movable element 413 is made using a synthetic resin insert formation method in which the iron member 432 is used as an insert.

As a result, the movable element 413 having the iron member 432 is supported by the yoke 412 in a manner recipocatable along the axial direction (i.e., the right-and-left direction in the drawings), and the permanent magnet 414 is fixed to the yoke 412 in such a manner that the permanent magnet 414 is disposed radially outside the iron member 432 of the movable element 413, and the magnetic poles 414*a* and 414*b* are arranged side by side in the direction of reciprocation of the movable element 413. The pair of outer magnetic poles 422 and 423 is disposed at both sides of the permanent magnet 414 in the direction of reciprocation of the movable element 413, and the inner magnetic pole 419, which is disposed so as to be opposed to the iron member 432 and is disposed at a position opposite to the permanent magnet 414, is integrally formed in the yoke 412. Moreover, the set of permanent magnet 414 and pair of outer magnetic poles 422 and 423 is disposed at only one side of the iron member 432, and more specifically, the set of permanent magnet 414 and pair of outer magnetic poles 422 and 423 is disposed only radially outside the cylindrical-shaped iron member 432.

Figure 46:
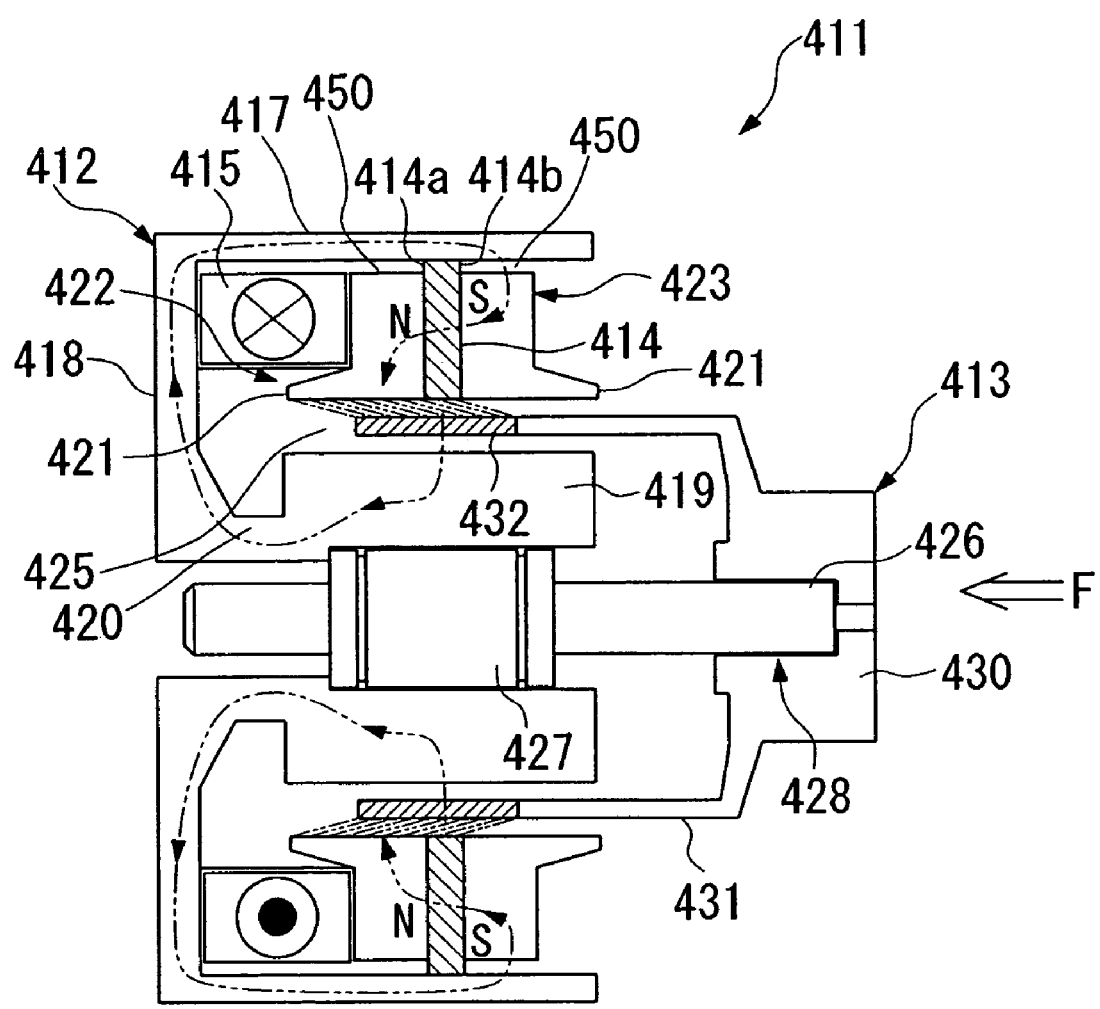
FIG. 46 is a side cross-sectional view showing the seventeenth embodiment of the liner actuator according to the present invention, in which magnetic fluxes under the condition in which electrical current flows through the coil in one direction are indicated by the two-dot chain lines.
Figure 47:
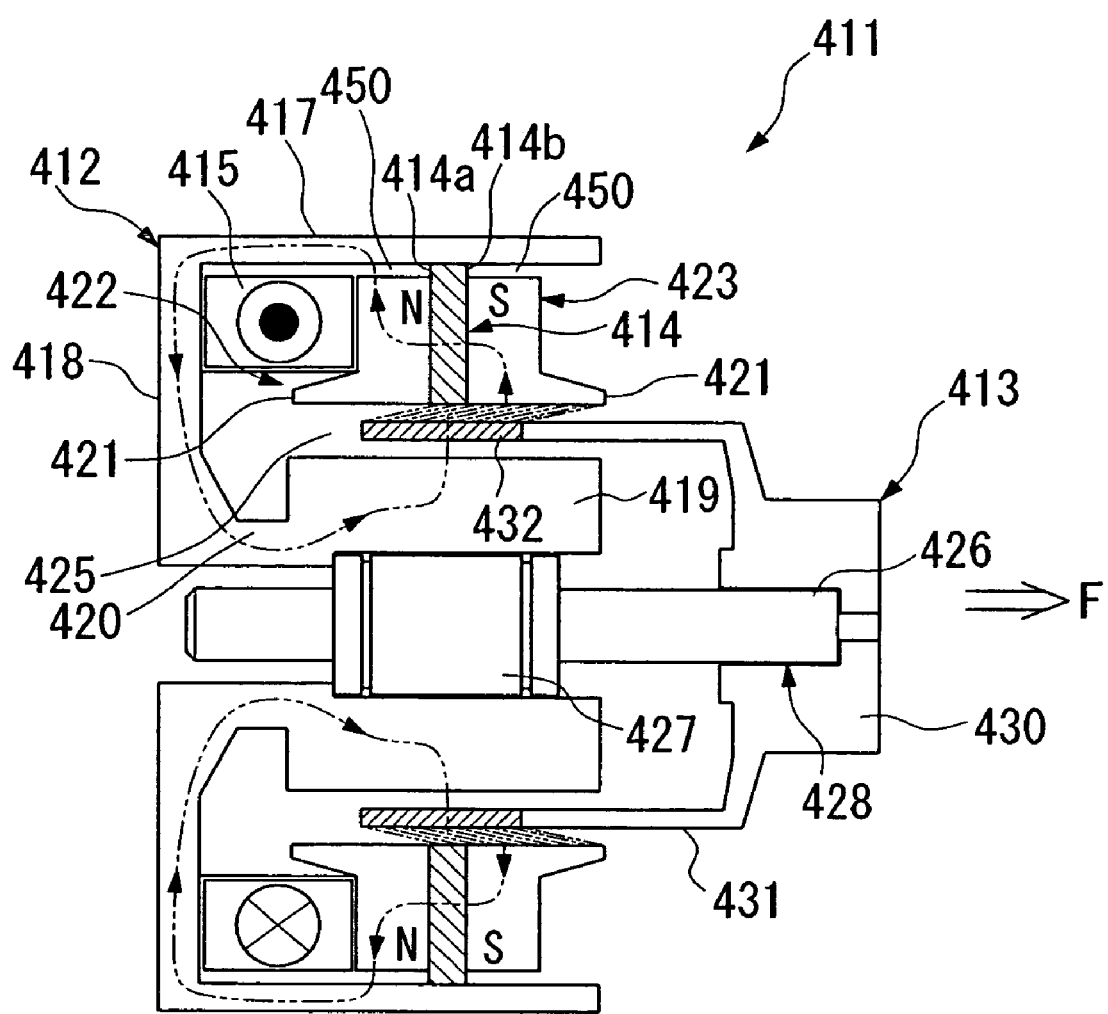
FIG. 47 is a side cross-sectional view showing the seventeenth embodiment of the liner actuator according to the present invention, in which magnetic fluxes under the condition in which electrical current flows through the coil in the opposite direction are indicated by the two-dot chain lines.

In the linear actuator 411 having the above structure, when alternating current (sinusoidal wave current or rectangular wave current) is supplied to the coil 415, and when the current flows through the coil 415 in a predetermined direction, due to the magnetic fluxes running from the S-pole 414*b* to the N-pole 414*a* in the permanent magnet 414 as indicated by the two-dot chain lines in FIG. 46, magnetic flux loops, which run through the outer cylindrical portion 417 of the yoke 412, the outer magnetic pole 423, the permanent magnet 414, the outer magnetic pole 422, the iron member 432 of the movable element 413, the inner magnetic pole 419 of the yoke 412, the connection portion 420, the bottom plate 418, and the outer cylindrical portion 417 in this order, are formed. As a result, a force F is applied to the movable element 413 to move the same toward the outer magnetic pole 422. On the other hand, when the current flows through the coil 415 in a direction opposite to the predetermined direction, due to the magnetic fluxes running from the S-pole 414*b* to the N-pole 414*a* in the permanent magnet 414 as indicated by the two-dot chain lines in FIG. 47, magnetic flux loops, which run through the outer cylindrical portion 417 of the yoke 412, the bottom plate 418, the connection portion 420, the inner magnetic pole 419, the iron member 432 of the movable element 413, the outer magnetic pole 423, the permanent magnet 414, the outer magnetic pole 422, and the outer cylindrical portion 417 in this order, are formed. As a result, a force F is applied to the movable element 413 to move the same toward the outer magnetic pole 423, in contrast to the above case.

Because the direction of the current supplied to the coil 415 is alternated, such an operation is repeated, and the movable element 413 reciprocates with respect to the yoke 412 in the axial direction.

Because the gaps 450 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, the number of magnetic fluxes generated by the permanent magnet 414 and running across the outer magnetic poles 422 and 423 and the iron member 432 is increased.

According to linear actuator 411 of the seventeenth embodiment explained above, because the gaps 450 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, the number of magnetic fluxes generated by the permanent magnet 414 and running across the outer magnetic poles 422 and 423 and the iron member 432 can be increased. Accordingly, the magnetic fluxes generated by the permanent magnet 14 can be efficiently used for moving the iron member 432, i.e., for moving the movable element 413, and a sufficient and stable thrust can be applied to the movable element 413.

Moreover, magnetic reluctance is provided against the magnetic flux loops which are formed by the magnetic force of the permanent magnet 414 through the outer cylindrical portion 417 of the yoke 412, the permanent magnet 414, and the pair of outer magnetic poles 422 and 423, by forming the gaps 450 between the outer magnetic poles 422 and 423 and the outer cylindrical portion 417 of the yoke 412, the magnetic reluctance is provided in a simple structure.

The base portion 430 and the cylindrical portion 431 of the movable element 413 do not have to be made of synthetic resin, and may be made of aluminum die-cast, non-magnetic stainless steel, etc., as long as non-magnetic material is used. In this case, a merit is obtained in that stiffness can be increased. However, it is preferable to use synthetic resin is terms of weight reduction.

For the permanent magnet 414, in addition to a ferrite magnet, a magnet made of rare earth element such as neodymium or samarium cobalt, or plastic magnet may be used; however, it is preferable to use the ferrite magnet in terms of reduction in cost.

In addition, the bearing for the movable element 413 may be, in addition to the ball bushing, an air gearing (a gas bearing), a sliding bearing, etc. However, it is preferable to use a ball bushing 428 because it makes it possible to reciprocate the movable element 413 more accurately.

Moreover, the linear actuator 411 may further include a spring provided on the movable unit, or the linear actuator 411 may be used with a spring disposed outside thereof for utilizing a resonance phenomenon, which are general practice of usage; however, the linear actuator 411 may be used as it is.

The linear actuator 411 may be used as a linear servo actuator, which is capable of controlling speed and position, by providing position and speed sensors thereon, and by executing a closed-loop control.

The end portions of the inner magnetic pole 419 and the outer magnetic pole 422 may be chamfered in order to improve performance such as displacement characteristics.

In addition, the inner magnetic pole 419, outer magnetic pole 422, and the iron member 432 may be made of stacked electrical steel sheets, instead of the sintering material, in order to reduce iron loss during a high speed operation.

Furthermore, the outer magnetic poles 422 and 423 may be formed in a short cylindrical shape without having projecting portions, or the projecting portions 421 may be provided at both the radially inner and outer portions thereof. In addition, a structure may be employed in which the movable element 414 is not supported by the yoke 412 using the ball bushing 428 or the like.

It is sufficient for the gaps 450 to be magnetic gaps between the outer magnetic poles 422 and 423 and the outer cylindrical portion 417 of the yoke 412; therefore, the gaps 450 may be air gaps or non-magnetic spacers. If non-magnetic spacers as the magnetic gaps are interposed between the outer magnetic poles 422 and 423 and the outer cylindrical portion 417, the outer magnetic poles 422 and 23 can be mechanically fixed to the outer cylindrical portion 417 by the non-magnetic spacers. The spacers may be made of plastic, aluminum, stainless steel, copper, or the like.

Figure 48:
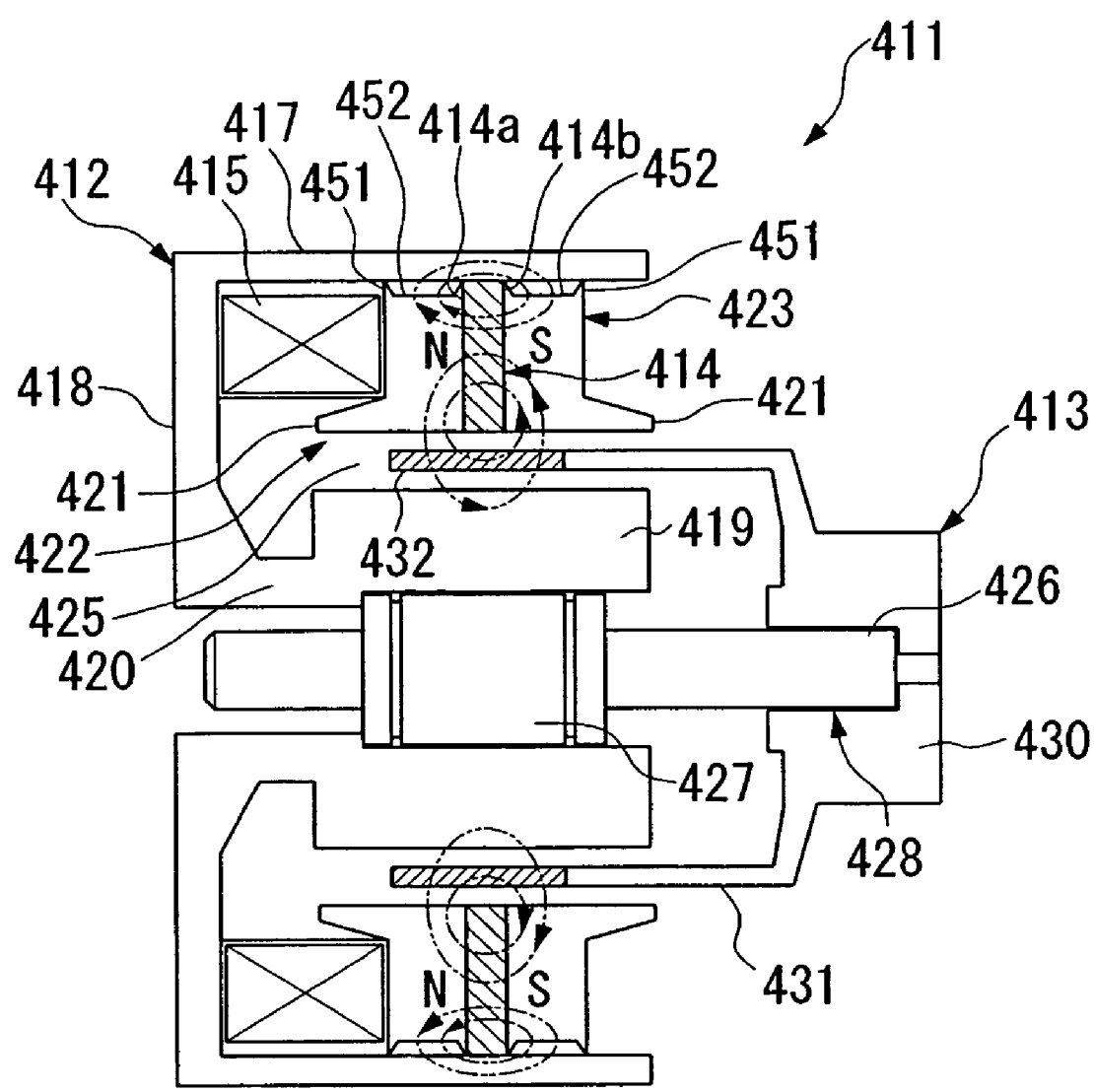
FIG. 48 is a side cross-sectional view showing an eighteenth embodiment of the liner actuator according to the present invention, in which magnetic fluxes under the condition in which electrical current does not flow through a coil are indicated by the two-dot chain lines.
Figure 49:
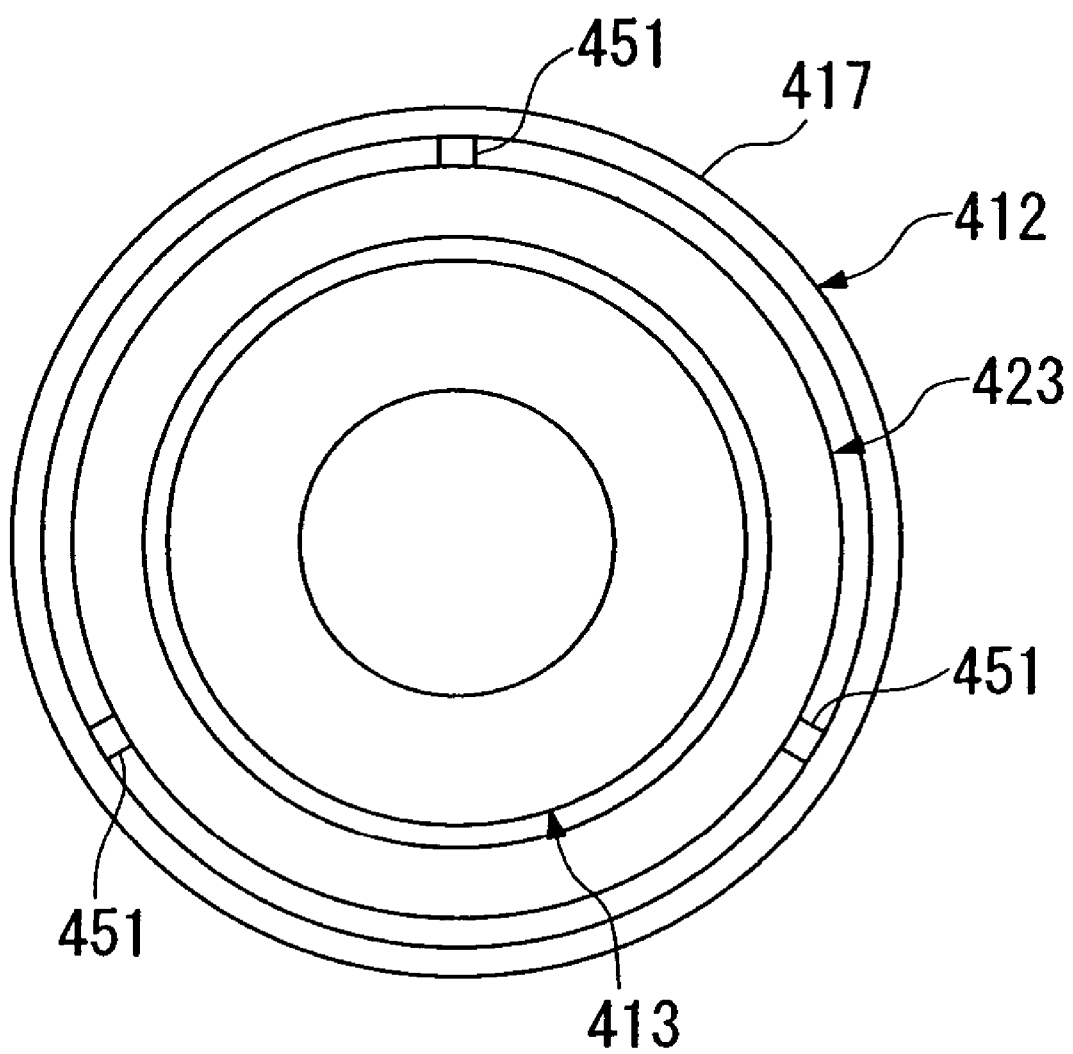
FIG. 49 is a front view showing the eighteenth embodiment of the liner actuator according to the present invention.

Next, an eighteenth embodiment of the linear actuator according to the present invention, in particular, the difference from the seventeenth embodiment, will be mainly explained below with reference to FIGS. 48 to 49. The same reference symbols are applied to the elements similar to that in the seventeenth embodiment, and explanations thereof are omitted.

In a linear actuator 411 according to the eighteenth embodiment, projecting portions 451, which project radially outward while having the same outer diameter as that of the permanent magnet 414, are formed on each of the annular outer magnetic poles 422 and 423 at circumferential plural locations, and more specifically, at three locations. At the middle portion of each of the projecting portions 451 in the axial direction (in the direction of reciprocation of the movable element 413), there is formed a concave portion 452 which is formed so as to concave from the outer surface while penetrating along the circumferential direction.

The permanent magnet 414 and the pair of outer magnetic poles 422 and 423 are coaxially fixed to the yoke 412 at radially outer portion of the yoke 412 in such a manner that the permanent magnet 414 is sandwiched by the pair of annular-shaped outer magnetic poles 422 and 423 at the both sides thereof in a direction along which the magnetic poles 414a and 414b are arranged, and the permanent magnet 414 and the pair of outer magnetic poles 422 and 423 are pressed into the outer cylindrical portion 417 of the yoke 412.

As explained above, the outer magnetic poles 422 and 423 are, at the projecting portions 451, pressed into inside the outer cylindrical portion 417 of the yoke 412, and the projecting portions 451 are provided, at portions thereof near the outer cylindrical portion 417, with the concave portions 452.

As a result, in this fixed state, between the projecting portions 451 of the outer magnetic pole 422 and the outer cylindrical portion 417 of the yoke 412, and between the projecting portions 451 of the outer magnetic pole 423 and the outer cylindrical portion 417 of the yoke 412, there are formed concave portions 452 which are magnetic reluctance sections that act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423.

According to linear actuator 411 of the eighteenth embodiment explained above, because the concave portion 452 of the projecting portions 451 of the outer magnetic poles 422 and 423 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, the number of magnetic fluxes generated by the permanent magnet 414 and running across the outer magnetic poles 422 and 423 and the iron member 432 can be increased when compared with the case in which the concave portion 452 are not formed in the projecting portions 451. Accordingly, the magnetic fluxes generated by the permanent magnet 14 can be efficiently used for moving the iron member 432, i.e., for moving the movable element 413, and a sufficient and stable thrust can be applied to the movable element 413.

Moreover, because the concave portion 452 of the projecting portions 451 formed on the outer cylindrical portion 417 of the outer magnetic poled 422 and 423 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, a magnetic reluctance can be applied to the magnetic flux loops while directly fixing the outer magnetic poles 422 and 423 to the outer cylindrical portion 417 of the yoke 412. Accordingly, the outer magnetic poles 422 and 423 can be firmly fixed to the outer cylindrical portion 417 of the yoke 412, and endurance thereof is improved.

Figure 50:
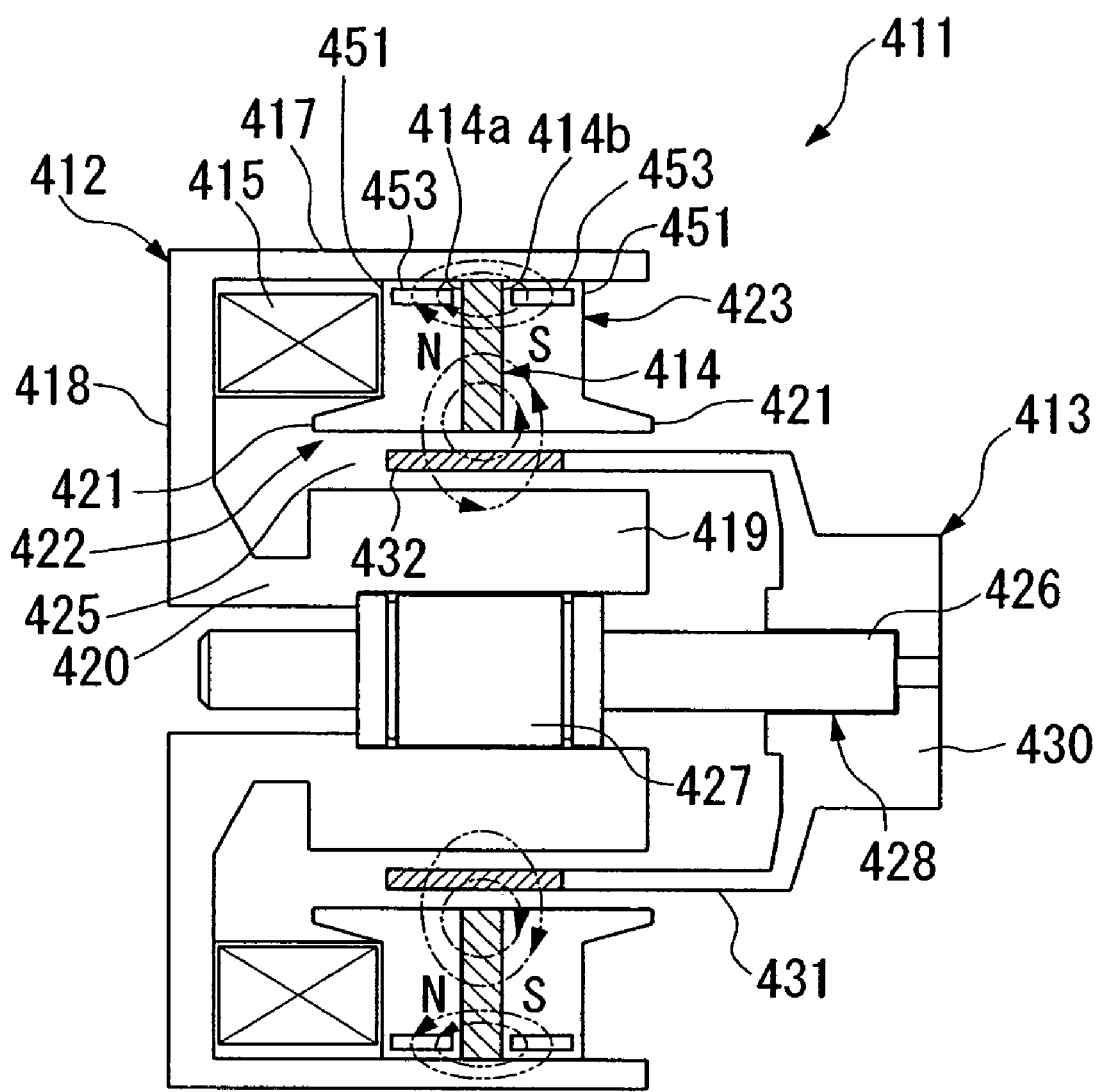
FIG. 50 is a side cross-sectional view showing a nineteenth embodiment of the liner actuator according to the present invention, in which magnetic fluxes under the condition in which electrical current does not flow through a coil are indicated by the two-dot chain lines.

Next, a nineteenth embodiment of the linear actuator according to the present invention, in particular, the difference from the eighteenth embodiment, will be mainly explained below with reference to FIG. 50. The same reference symbols are applied to the elements similar to that in the eighteenth embodiment, and explanations thereof are omitted.

In a linear actuator 411 according to the nineteenth embodiment, the outer magnetic poles 422 and 423 are, at the projecting portions 451, pressed into inside the outer cylindrical portion 417 of the yoke 412, and the projecting portions 451 are provided, at the middle portions thereof in the axial direction (in the direction of reciprocation of the movable element 413), with the holes 453 that penetrate along the circumferential direction.

As a result, in this fixed state, in the projecting portions 451 of the outer magnetic pole 422, and in the projecting portions 451 of the outer magnetic pole 423, there are formed holes 453 which are magnetic reluctance sections that act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423.

According to linear actuator 411 of the nineteenth embodiment explained above, because the holes 453 of the projecting portions 451 of the outer magnetic poles 422 and 423 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, the number of magnetic fluxes generated by the permanent magnet 414 and running across the outer magnetic poles 422 and 423 and the iron member 432 can be increased when compared with the case in which the concave portion 452 are not formed in the projecting portions 451. Accordingly, the magnetic fluxes generated by the permanent magnet 14 can be efficiently used for moving the iron member 432, i.e., for moving the movable element 413, and a sufficient and stable thrust can be applied to the movable element 413.

Moreover, because the holes 453 formed in the projecting portions 451 of the outer cylindrical portion 417 of the outer magnetic poled 422 and 423 act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, a magnetic reluctance can be applied to the magnetic flux loops while directly fixing the outer magnetic poles 422 and 423 to the outer cylindrical portion 417 of the yoke 412. Accordingly, the outer magnetic poles 422 and 423 can be firmly fixed to the outer cylindrical portion 417 of the yoke 412, and endurance thereof is improved.

Figure 51:
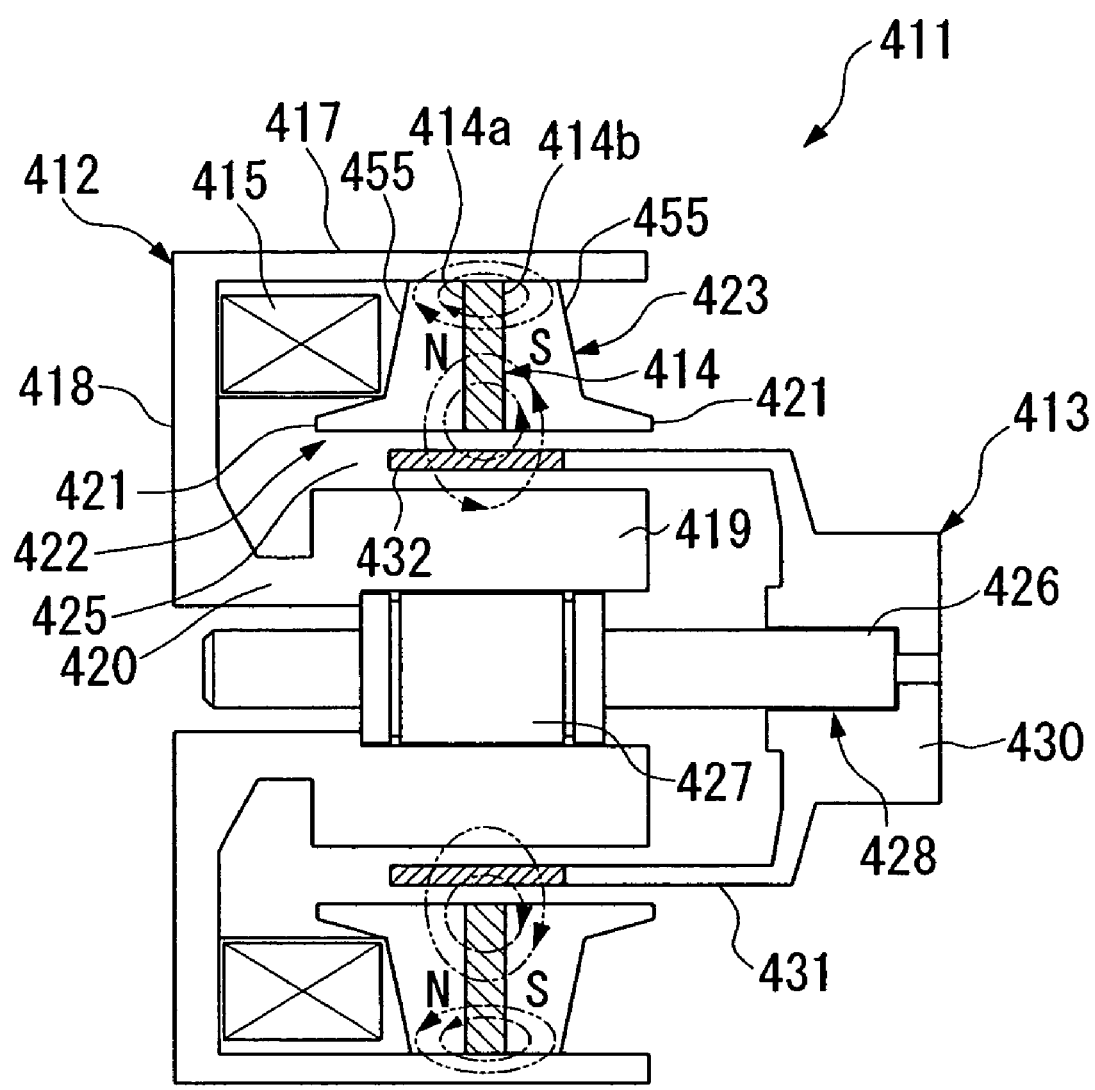
FIG. 51 is a side cross-sectional view showing a twentieth embodiment of the liner actuator according to the present invention, in which magnetic fluxes under the condition in which electrical current does not flow through a coil are indicated by the two-dot chain lines.

Next, a twentieth embodiment of the linear actuator according to the present invention, in particular, the difference from the seventeenth embodiment, will be mainly explained below with reference to FIG. 51. The same reference symbols are applied to the elements similar to that in the seventeenth embodiment, and explanations thereof are omitted.

In a linear actuator 411 according to the twentieth embodiment, the outer magnetic poles 422 and 423 are provided with tapered surfaces 455 at portions thereof opposite to the permanent magnet 414 in such a manner that the thicknesses of the outer magnetic poles 422 and 423 at portions thereof radially outside the projecting portions 421 are decreased as the outer magnetic poles 422 and 423 elements extend outward.

The outer diameter of the permanent magnet 414 is determined such that the permanent magnet 414 is fixed to the outer cylindrical portion 417 of the yoke 412 by pressing thereinto, and the diameters of the pair outer magnetic poles 422 and 423 are the same as that of the permanent magnet 414 so that the outer magnetic poles 422 and 423 are fixed, over the entire circumferences, to the outer cylindrical portion 417 of the yoke 412 by pressing thereinto.

The permanent magnet 414 and the outer magnetic poles 422 and 423 are, at the outer surfaces thereof, pressed into inside the outer cylindrical portion 417 of the yoke 412, so that the permanent magnet 414 and the outer magnetic poles 422 and 423 are fixed to the yoke 412 in a coaxial manner.

In this fixed state, because a portion of the outer magnetic pole 422 near the outer cylindrical portion 417 and a portion of the outer magnetic pole 423 near the outer cylindrical portion 417 are made thinner in the axial direction, and act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423.

According to linear actuator 411 of the twentieth embodiment explained above, because a portion of the outer magnetic pole 422 near the outer cylindrical portion 417 and a portion of the outer magnetic pole 423 near the outer cylindrical portion 417 are made thinner in the axial direction so as to act as magnetic reluctance against the magnetic flux loops which are formed by the magnetic force of the permanent magnet 414 through the outer cylindrical portion 417 of the yoke 412, the permanent magnet 414, and the pair of outer magnetic poles 422 and 423, the number of magnetic fluxes generated by the permanent magnet 414 and running across the outer magnetic poles 422 and 423 and the iron member 432 can be increased when compared with the case in which the thicknesses are made to be constant. Accordingly, the magnetic fluxes generated by the permanent magnet 14 can be efficiently used for moving the iron member 432, i.e., for moving the movable element 413, and a sufficient and stable thrust can be applied to the movable element 413.

Moreover, because the magnetic reluctance is formed by making the portions of the outer magnetic poled 422 and 423 thinner, the magnetic reluctance can be applied to the magnetic flux loops while directly fixing the outer magnetic poles 422 and 423 to the outer cylindrical portion 417 of the yoke 412. Accordingly, the outer magnetic poles 422 and 423 can be firmly fixed to the outer cylindrical portion 417 of the yoke 412, and endurance thereof is improved.

Figure 52:
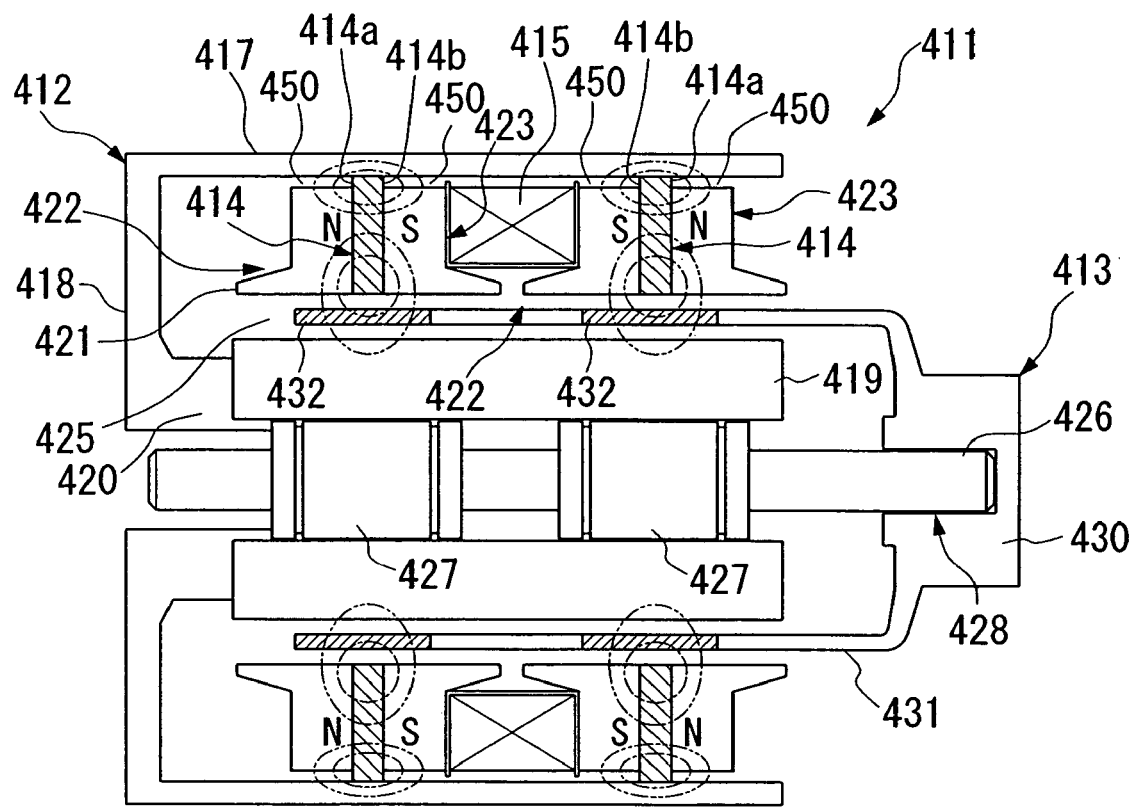
FIG. 52 is a side cross-sectional view showing a twenty-first embodiment of the liner actuator according to the present invention, in which magnetic fluxes under the condition in which electrical current does not flow through a coil are indicated by the two-dot chain lines.

Next, a twenty-first embodiment of the linear actuator according to the present invention, in particular, the difference from the seventeenth embodiment, will be mainly explained below with reference to FIG. 52. The same reference symbols are applied to the elements similar to that in the seventeenth embodiment, and explanations thereof are omitted.

In the twenty-first embodiment, plural sets, and more specifically, two sets of permanent magnet 414 and pair of outer magnetic poles 422 and 423, each of which is similar to that in the seventeenth embodiment, and which are arranged in the direction of reciprocation of the movable element 113, are provided in the outer cylindrical portion 417 of the yoke 412, and plural, and more specifically, two iron members 432 arranged in the direction of reciprocation are provided in the movable element 413. In the permanent magnets 414 adjacent to each other, orientations of the magnetic poles thereof differ from each other.

More specifically, with regard to the permanent magnet 414 disposed near the bottom plate 418, the N-pole 414a is disposed near the bottom plate 418, and the S-pole 414b is disposed away from the bottom plate 418. With regard to the permanent magnet 414 disposed away from the bottom plate 418, the N-pole 414a is disposed away from the bottom plate 418, and the S-pole 414b is disposed near the bottom plate 418.

One of the iron members 432 is disposed so as to be opposed to one of the sets of permanent magnet 414 and the pair of outer magnetic poles 422 and 423, and the other of the iron members 432 is disposed so as to be opposed to the other of the sets of permanent magnet 414 and pair of outer magnetic poles 422 and 423.

IN accordance with the above structure, the coil 415 is disposed inside the outer cylindrical portion 417 and between one of the sets of permanent magnet 414 and pair of outer magnetic poles 422 and 423, and the other of the sets of permanent magnet 414 and pair of outer magnetic poles 422 and 423. Moreover, the bushing 428 includes plural bushings 427, and more specifically, two bushings 427.

According to the linear actuator 411 of the twenty-first embodiment explained above, because plural sets of permanent magnet 414 and pair of outer magnetic poles 422 and 423 arranged in the direction of reciprocation of the movable element 413 are provided in the yoke 412, and plural iron members 432 arranged in the direction of reciprocation of the movable element 413 are provided in the movable element 413, a greater thrust can be applied to the movable element 13.

In the twenty-first embodiment, plural sets of permanent magnet 414 and pair of outer magnetic poles 422 and 423 according to the seventeenth embodiment are arranged in the direction of reciprocation of the movable element 413, and plural iron members 432 arranged in the direction of reciprocation of the movable element 413 are provided in the movable element 413; however, plural sets of permanent magnet 414 and pair of outer magnetic poles 422 and 423 according to the eighteenth embodiment may be arranged in the direction of reciprocation of the movable element 413, and plural iron members 432 arranged in the direction of reciprocation of the movable element 413 may be provided in the movable element 413; plural sets of permanent magnet 414 and pair of outer magnetic poles 422 and 423 according to the nineteenth embodiment may be arranged in the direction of reciprocation of the movable element 413, and plural iron members 432 arranged in the direction of reciprocation of the movable element 413 may be provided in the movable element 413; or plural sets of permanent magnet 414 and pair of outer magnetic poles 422 and 423 according to the twentieth embodiment may be arranged in the direction of reciprocation of the movable element 413, and plural iron members 432 arranged in the direction of reciprocation of the movable element 413 may be provided in the movable element 413.

Figure 53:
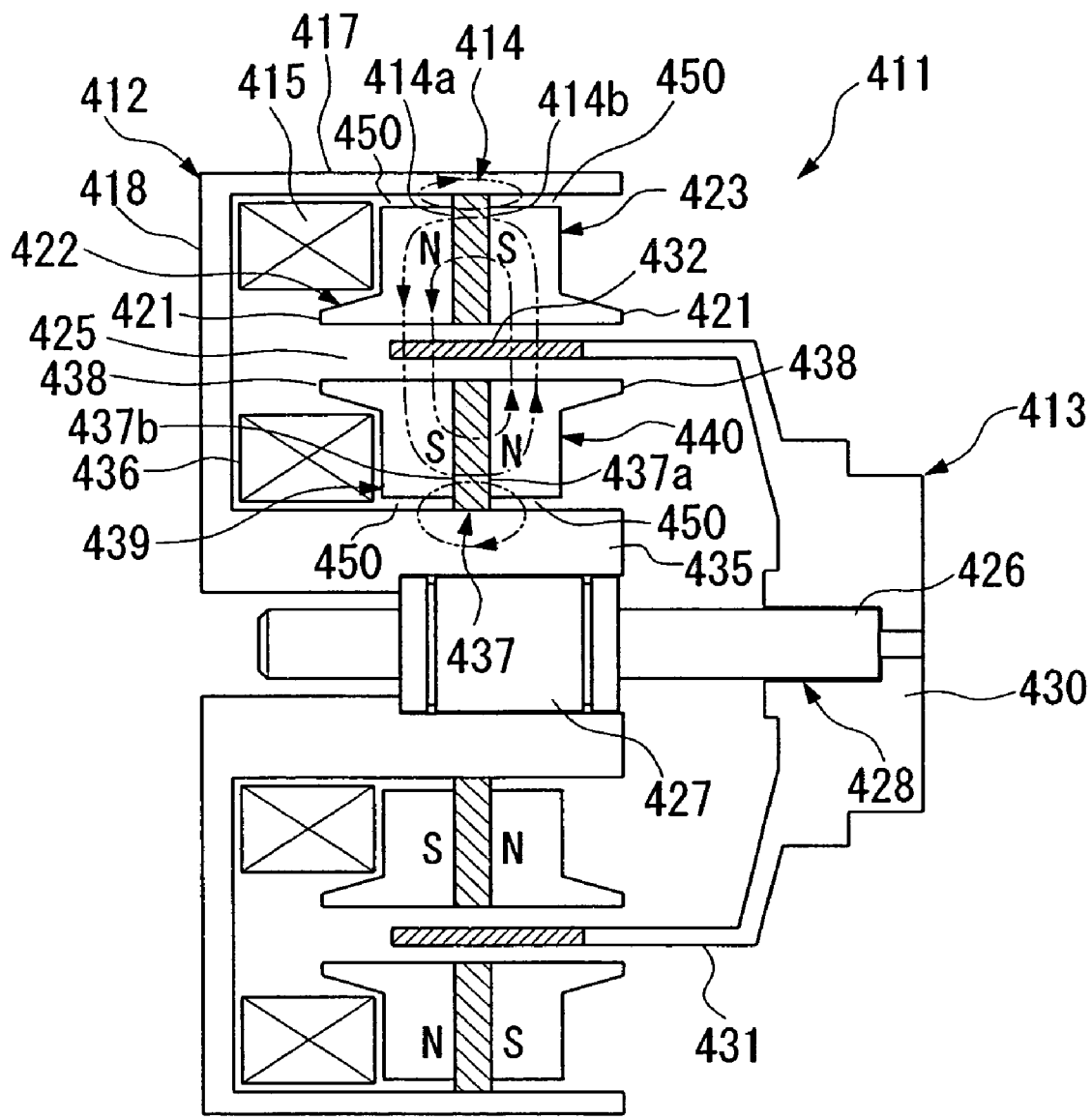
FIG. 53 is a side cross-sectional view showing a twenty-second embodiment of the liner actuator according to the present invention.

Next, a twenty-second embodiment of the linear actuator according to the present invention will be explained below with reference to FIG. 53. The same reference symbols are applied to the elements similar to that in the seventeenth embodiment, and explanations thereof are omitted.

In the linear actuator 411 of the twenty-second embodiment, instead of the connection portion 420 and the inner magnetic pole 419, an inner cylindrical portion 435, which is disposed so as to be coaxial with the outer cylindrical portion 417, is integrally formed at the radially inner portion of the yoke 412. Moreover, in addition to the outer portion, at the inner portion as well, a coil 436 is fixed to the yoke 412 so as to be coaxial therewith in an inside corner portion where the bottom plate 418 merges with the inner cylindrical portion 435.

Moreover, in addition to the outer portion, at the inner portion as well, there are provided a permanent magnet 437 having a thin ring shape and made of a ferrite magnet or the like, in which two magnetic poles, i.e., an N-pole 437a and an S-pole 437b are arranged side by side in the axial direction, and annular-shaped inner magnetic poles (magnetic pole elements) 439 and 440 having L-shaped cross section and made of sintering material which are disposed at both sides in the axial direction with respect to the permanent magnet 437, and which respectively include projecting portions 438 at radially outer portion thereof that opposingly project in the axial direction. The permanent magnet 437 and the pair of inner magnetic poles 439 and 440 are coaxially fixed to the yoke 412 in such a manner that and the permanent magnet 437 is sandwiched by the annular-shaped inner magnetic poles 439 and 440 at the both sides thereof in a direction along which the magnetic poles 437a and 437b are arranged, and the pair of inner magnetic poles 439 and 440 are pressed onto the inner cylindrical portion 435 of the yoke 412. The annular gap (magnetic gap) 425 is formed between the inner magnetic poles 439 and 440 and the inner cylindrical portion 435 of the yoke 412.

The S-pole 437b of the permanent magnet 437 is disposed so as to face the bottom plate 418, and the inner magnetic pole 439 is located adjacent to the coil 436 in the axial direction. Moreover, the permanent magnet 437 and the pair of inner magnetic poles 439 and 440, as a whole, are coaxially disposed inside the pair of outer magnetic poles 422 and 423, and in addition, the permanent magnet 437 and the outer permanent magnet 414, the inner magnetic pole 439 and the outer magnetic pole 422, the inner magnetic pole 440 and the outer magnetic pole 423, the coil 436 and the outer coil 415 have the same length, respectively, and are disposed at the same location in the axial direction, respectively. The gap 425 is also formed between the permanent magnet 437 and the pair of inner magnetic poles 439 and 440, and the permanent magnet 414 and the pair of outer magnetic poles 422 and 423.

Radially inside the inner cylindrical portion 435 of the yoke 412, the bushing 428, which support the shaft 426 in a movable manner using the bushing 427, is coaxially fixed thereto at the bushing 427. The iron member 432, as a cylindrical-shaped movable magnetic pole, of the movable element 413 which is fixed to the shaft 426 of the bushing 428, is disposed in the annular gap 425 formed between the permanent magnet 437 and the pair of inner magnetic poles 439 and 440, and the permanent magnet 414 and the pair of outer magnetic poles 422 and 423, as in the seventeenth embodiment.

The linear actuator 411 in the twenty-second embodiment explained above achieves the same effects as that achieved by the linear actuator 411 in the seventeenth embodiment. In addition, because the sets of permanent magnet 414 and pair of outer magnetic poles 422 and 423 and the sets of permanent magnet 437 and pair of inner magnetic poles 439 and 440 are disposed at both sides with respect to the iron member 432 while being provided with the gasp 450, respectively, a stronger magnetic field due to the permanent magnets and a greater magnetomotive force due to electrical current can be obtained.

Figure 54:
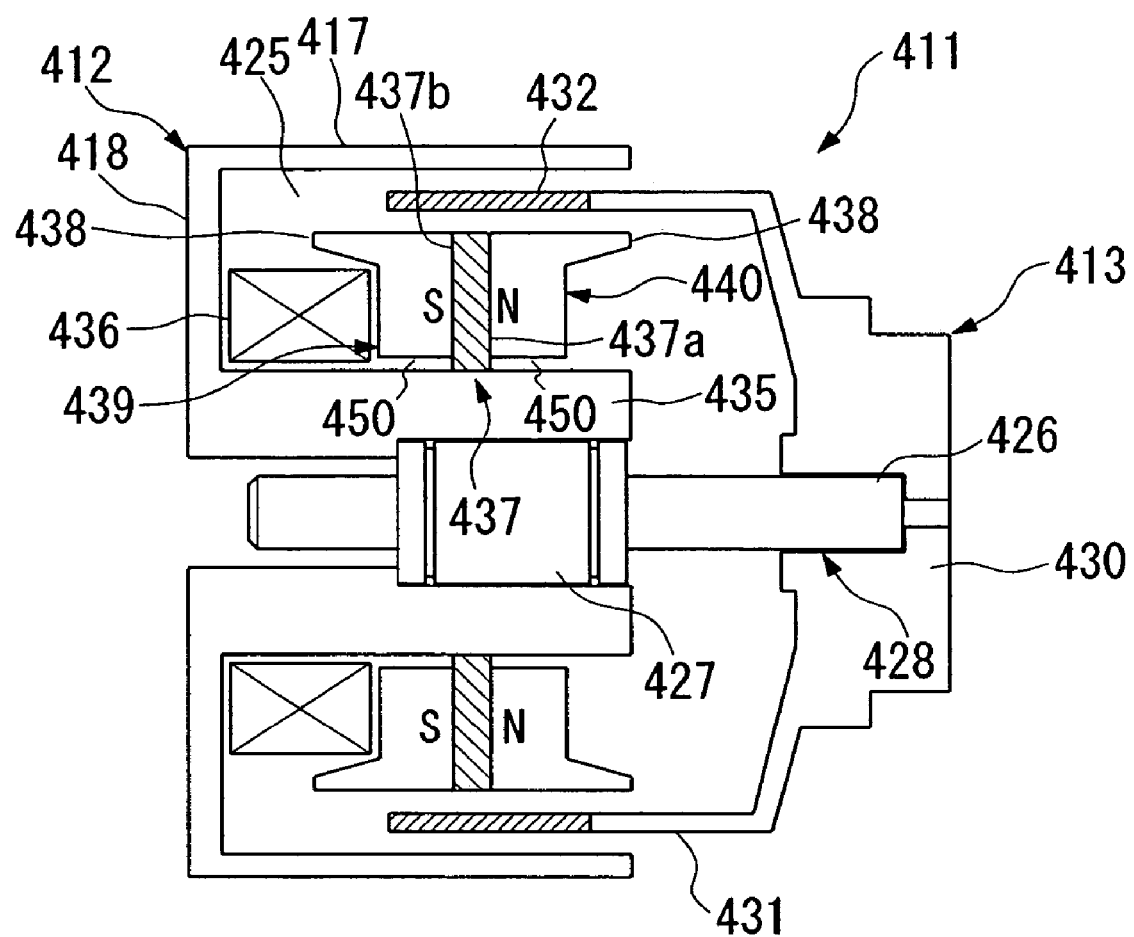
FIG. 54 is a side cross-sectional view showing a twenty-third embodiment of the liner actuator according to the present invention.

Next, a twenty-third embodiment of the linear actuator according to the present invention will be explained below with reference to FIG. 54. The same reference symbols are applied to the elements similar to that in the seventeenth embodiment, and explanations thereof are omitted.

In the linear actuator 411 of the twenty-third embodiment, instead of the connection portion 420 and the inner magnetic pole 419, an inner cylindrical portion 435, which is disposed so as to be coaxial with the outer cylindrical portion 417, is integrally formed at the radially inner portion of the yoke 412. Moreover, instead of the outer portion, at the inner portion, a coil 436 is fixed to the yoke 412 so as to be coaxial therewith in an inside corner portion where the bottom plate 418 merges with the inner cylindrical portion 435.

Moreover, instead of at the outer portion, at the inner portion, there are provided a permanent magnet 437 having a thin ring shape and made of a ferrite magnet or the like, in which two magnetic poles, i.e., an N-pole 437a and an S-pole 437b are arranged side by side in the axial direction, and annular-shaped inner magnetic poles (magnetic pole elements) 439 and 440 having L-shaped cross section and made of sintering material which are disposed at both sides in the axial direction with respect to the permanent magnet 437, and which respectively include projecting portions 438 at radially outer portion thereof that opposingly project in the axial direction. The permanent magnet 437 and the pair of inner magnetic poles 439 and 440 are coaxially fixed to the yoke 412 in such a manner that and the permanent magnet 437 is sandwiched by the annular-shaped inner magnetic poles 439 and 440 at the both sides thereof in a direction along which the magnetic poles 437a and 437b are arranged, and the pair of inner magnetic poles 439 and 440 are pressed onto the inner cylindrical portion 435 of the yoke 412. The annular gap (magnetic gap) 425 is formed between the inner magnetic poles 439 and 440 and the inner cylindrical portion 435 of the yoke 412.

The S-pole 437b of the permanent magnet 437 is disposed so as to face the bottom plate 418, and the inner magnetic pole 439 is located adjacent to the coil 436 in the axial direction. Moreover, the gap 425 is formed between the permanent magnet 437 and the pair of inner magnetic poles 439 and 440 and the outer cylindrical portion 417.

Radially inside the inner cylindrical portion 435 of the yoke 412, the bushing 428, which support the shaft 426 in a movable manner using the bushing 427, is coaxially fixed thereto at the bushing 427. The iron member 432, as a cylindrical-shaped movable magnetic pole, of the movable element 413 which is fixed to the shaft 426 of the bushing 428, is disposed in the annular gap 425 formed between the permanent magnet 437 and the pair of inner magnetic poles 439 and 440, and the outer cylindrical portion 417, as in the seventeenth embodiment. As a result, the set of permanent magnet 437 and pair of inner magnetic poles 439 and 440 is disposed only radially inside the cylindrical-shaped iron member 432.

The linear actuator 411 in the twenty-third embodiment explained above achieves the same effects as that achieved by the linear actuator 411 in the seventeenth embodiment. In addition, because the set of permanent magnet 437 and pair of outer magnetic poles 439 and 440 is disposed only radially inside the cylindrical-shaped iron member 432, the radiuses of the permanent magnet 437 and the pair of inner magnetic poles 439 and 440 can be reduced, and the weights thereof are also reduced, and thus the overall weight can be reduced.

With regard to the twenty-second and twenty-third embodiments, instead of the gap 450, the concave portions 452 according to the eighteenth embodiment, the holes 453 according to the nineteenth embodiment, or the tapered surfaces 455 according to the twentieth embodiment, may also be employed. Furthermore, the set of permanent magnet 414 and pair of outer magnetic poles 422 and 423 and the set of permanent magnet 437 and pair of outer magnetic poles 439 and 440 according to the twenty-second embodiment may be arranged in the direction of reciprocation of the moveable element 413 as in the twenty-first embodiment, or the sets of permanent magnet 437 and pair of outer magnetic poles 439 and 440 according to the twenty-third embodiment may be arranged in the direction of reciprocation of the moveable element 413 as in the twenty-first embodiment.

INDUSTRIAL APPLICABILITY

As explained above, according to the liner actuator of the first aspect of the present invention, the iron member is fixed to the movable element, the permanent magnet fixed to the stator so as to be opposed to the iron member, the coil fixed to the stator, and the iron member, i.e., the movable element is reciprocated by moving magnetic fluxes running through the iron member using the coil fixed to the stator, in which the direction of current is alternated, and the permanent magnet. Because both the coil and the permanent magnet are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element. Accordingly, reliability thereof can be improved, performance thereof can be easily improved, and the manufacturing process is simplified, and thus cost reduction can be achieved.

According to another liner actuator of the present invention, when the direction of electrical current flowing through the coil fixed to the stator is alternated, the entry of the magnetic fluxes into the iron member is alternated by the outer magnetic poles which are disposed at both sides of the permanent magnet in which the magnetic poles are arranged side by side in the direction of reciprocation of the movable element, and as a result, the iron member, i.e., the movable element reciprocates. Accordingly, the movable elements can be reciprocated with a simple structure, and the manufacturing process is simplified, which leads to further reduction in cost.

According to another liner actuator of the present invention, because the set of permanent magnet and pair of magnetic pole elements is disposed at only one side of the iron member, the overall weight can be reduced.

According to another liner actuator of the present invention, because the set of permanent magnet and pair of magnetic pole elements is disposed only radially outside the iron member, the radius of the iron member, i.e., the radius of the movable element, can be reduced, and, in particular, the weight of the movable element can be reduced.

According to another liner actuator of the present invention, because the set of permanent magnet and pair of magnetic pole elements is disposed only radially inside the iron member, the radiuses of the permanent magnet and the pair of magnetic poles can be reduced, and the weights thereof are also reduced, and thus the overall weight can be reduced.

According to another liner actuator of the present invention, because two sets of permanent magnet and pair of magnetic pole elements are disposed at both sides of the iron member, a stronger magnetic field due to the permanent magnets and a greater magnetomotive force due to electrical current can be obtained.

According to another liner actuator of the present invention, because the magnetic pole element, which is opposed to the iron member and is disposed at a position opposite to the permanent magnet, is integrally formed in the stator, a connecting operation after forming separately doe not have to be performed. Accordingly, the manufacturing process can be further simplified.

According to another liner actuator of the present invention, because the movable element is formed using a synthetic resin insert formation method in which the iron member is used as an insert, the movable element including the iron member can be easily manufactured and can be made light.

According to another liner actuator of the present invention, because the movable element is supported on the stator using a ball bushing, the movable element reciprocates accurately.

According to another liner actuator of the present invention, because plural permanent magnets arranged in the direction of reciprocation are fixed to the stator, and plural iron members arranged in the direction of reciprocation are fixed to the movable element, a greater thrust can be applied to the movable element.

According to another liner actuator of the present invention, because the stator consists of a sintered element, cost can be reduced, performance can be improved (iron loss can be reduced), and mechanical strength can be increased.

According to the liner actuator of the second aspect of the present invention, because the iron member is fixed to the movable element, the coil is fixed to the stator, and the pair of permanent magnets fixed to the stator in such a manner that the permanent magnets are arranged side by side in the direction of reciprocation while being opposed to the iron member, magnetic poles thereof are arranged in a direction perpendicular to the direction of reciprocation, and orientations of the magnetic poles thereof differ from each other, when the direction of the electrical current flowing through the coil fixed to the stator is alternated, magnetic fluxes run through the pair of permanent magnets alternatingly, and as a result, the iron member, i.e., the movable element reciprocates. Because both the coil and the permanent magnets are fixed to the stator, electrical current does not have to be supplied to the movable element, and the feeder lines connected to the coil will not be broken due to the movement of the movable element. In addition, the weight of the movable element will not be increased even when the weigh of the permanent magnet is increased in order to obtain high magnetic flux density for improvement in performance. Moreover, because the movable element does not include a magnet, a magnetizing operation does not have to be applied to the movable element. Accordingly, reliability thereof can be improved, performance thereof can be easily improved, and the manufacturing process is simplified, and thus cost reduction can be achieved.

According to another liner actuator of the present invention, because the pair of permanent magnets is disposed at only one side of the iron member, the overall weight can be reduced.

According to another liner actuator of the present invention, because the magnetic pole element, which is opposed to the iron member and is disposed at a position opposite to the permanent magnets, is integrally formed in the stator, a connecting operation after forming separately doe not have to be performed. Accordingly, the manufacturing process can be further simplified.

According to another liner actuator of the present invention, because the pair of permanent magnets is disposed at both sides of the iron member, a stronger magnetic field due to the permanent magnets and a greater magnetomotive force due to electrical current can be obtained.

According to another liner actuator of the present invention, because the coil is disposed radially outside the iron member, the radius of the iron member, i.e., the radius of the movable element, can be reduced, and, in particular, the weight of the movable element can be reduced.

According to another liner actuator of the present invention, because the coil is disposed radially inside the iron member, the weight of the coil can be reduced, and thus the overall weight can be reduced.

According to another liner actuator of the present invention, because the movable element is formed using a synthetic resin insert formation method in which the iron member is used as an insert, the movable element including the iron member can be easily manufactured and can be made light.

According to another liner actuator of the present invention, because the movable element is supported on the stator using a ball bushing, the movable element reciprocates accurately.

According to another liner actuator of the present invention, because plural sets of the pair of permanent magnets arranged in the direction of reciprocation are fixed to the stator, and plural iron members arranged in the direction of reciprocation are fixed to the movable element, a greater thrust can be applied to the movable element.

According to another liner actuator of the present invention, because the stator consists of a sintered element, cost can be reduced, performance can be improved (iron loss can be reduced), and mechanical strength can be increased.

According to the liner actuator of the third aspect of the present invention, when electrical current flows through the coil fixed to the stator in a direction, for example, magnetic flux loops, which run through the stator, one of the first pair of permanent magnets, the iron member, one of the second pair of permanent magnets that is disposed at the same position, in the direction of reciprocation, as the one of the first pair of permanent magnets, and the stator, are formed, and when the direction of electrical current flowing through the coil fixed to the stator is switched to the opposite direction, magnetic flux loops, which run through the stator, the other of the second pair of permanent magnets, the iron member, the other of the first pair of permanent magnets, and the stator, are formed. Accordingly, when the direction of electrical current flowing through the coil fixed to the stator is alternated, the entries of the magnetic fluxes into the iron member are alternated in the direction of reciprocation in the first pair of permanent magnets fixed to the stator and the second pair of permanent magnets fixed to the stator, and as a result, the iron member, i.e., the movable element reciprocates.

Because both the coil and the permanent magnets are fixed to the stator, electrical current does not have to be supplied to the movable element, and the feeder lines connected to the coil will not be broken due to the movement of the movable element. Accordingly, reliability thereof can be improved.

In addition, the weight of the movable element will not be increased even when the weigh of the permanent magnet is increased in order to obtain high magnetic flux density for improvement in performance. Accordingly, performance thereof can be easily improved.

Moreover, because the movable element does not include a magnet, a magnetizing operation does not have to be applied to the movable element. Accordingly, the manufacturing process is simplified, which leads to further reduction in cost.

In addition, because the movable element is reciprocated using the above-mentioned magnetic flux loops, a portion of the stator as a back yoke does not have to be disposed at a position opposite to the movable element with respect to the permanent magnets. Accordingly, a space located opposite to the movable element with respect to the permanent magnets can be efficiently used.

According to another liner actuator of the present invention, because plural sets of the first pair of permanent magnets and the second pair of permanent magnets are provided so that positions thereof in the direction of reciprocation coincide with each other, a stronger magnetic field due to the permanent magnets and a greater magnetomotive force due to electrical current can be obtained.

According to another liner actuator of the present invention, because plural sets of the first pair of permanent magnets and the second pair of permanent magnets are arranged side by side in the direction of reciprocation, and the iron member includes plural projecting portions which project toward the permanent magnets, and which are arranged side by side in the direction of reciprocation, a stronger magnetic field due to the permanent magnets and a greater magnetomotive force due to electrical current can be obtained, and attracting force can be efficiently applied to the end faces of the projection portions.

According to another liner actuator of the present invention, because at least one of the stator and the movable element is made of stacked steel sheets which are stacked in the direction of reciprocation, eddy current loss can be reduced when compared with the case in which the stator and the movable element are made of a solid material by machining, and hysteresis loss can be reduced when compared with the case in which the stator and the movable element are made of a sintering material or compacted iron powder. In addition, in particular, when a large stator is to be formed, it is easier to manufacture the same when compared with the case in which the stator and the movable element are made of a solid material or a sintering material. Accordingly, performance thereof can be improved, and a large stator, which is required when the overall size is increased, can be easily manufactured.

According to another liner actuator of the present invention, the stator includes windows at positions near the movable element, and the first pair of permanent magnets and the second pair of permanent magnets are accommodated in the windows. Accordingly, because the permanent magnets are mechanically restrained in the windows in contrast to the case in which the permanent magnets are fixed to the surface of the stator using adhesive, reliability regarding retention of the permanent magnets is improved. Moreover, because the size of the gaps between the stator and the movable element is not affected by positional variation of the permanent magnets due to thickness variation of adhesive, accuracy of the gaps is improved. Furthermore, even when foreign particles are jammed in the gaps, the permanent magnets will not be broken.

According to the liner actuator of the fourth aspect of the present invention, when electrical current flows through the coil fixed to the stator in a direction, for example, magnetic flux loops, which run through the iron member, one of the first pair of permanent magnets that is disposed away from the second pair of permanent magnets, the stator, one of the second pair of permanent magnets that faces the first pair of permanent magnets, and the iron member, are formed, and when the direction of electrical current flowing through the coil fixed to the stator is switched to the opposite direction, magnetic flux loops, which run through the iron member, the other of the second pair of permanent magnets, the stator, the other of the first pair of permanent magnets, and the iron member, are formed. Accordingly, when the direction of electrical current flowing through the coil fixed to the stator is alternated, the entries of the magnetic fluxes into the iron member are alternated in the direction of reciprocation in the first pair of permanent magnets fixed to the stator and the second pair of permanent magnets fixed to the stator, and as a result, the iron member, i.e., the movable element reciprocates.

Because both the coil and the permanent magnets are fixed to the stator, electrical current does not have to be supplied to the movable element, and the feeder lines connected to the coil will not be broken due to the movement of the movable element. Accordingly, reliability thereof can be improved.

In addition, the weight of the movable element will not be increased even when the weigh of the permanent magnet is increased in order to obtain high magnetic flux density for improvement in performance. Accordingly, performance thereof can be easily improved Moreover, because the movable element does not include a magnet, a magnetizing operation does not have to be applied to the movable element. Accordingly, the manufacturing process is simplified, and thus cost reduction can be achieved.

In addition, because the movable element is reciprocated using the above-mentioned magnetic flux loops, a portion of the stator as a back yoke does not have to be disposed at a position opposite to the movable element with respect to the permanent magnets. Accordingly, a space located opposite to the movable element with respect to the permanent magnets can be efficiently used.

According to another liner actuator of the present invention, because the magnetic gap is provided in the stator at a position adjacent to a boundary between the first pair of permanent magnets and the second pair of permanent magnets, the formation of magnetic fluxes through the stator and the iron member via the first pair of permanent magnets and the formation of magnetic fluxes through the stator and the iron member via the second pair of permanent magnets are ensured.

According to another liner actuator of the present invention, because the permanent magnets of the first pair of permanent magnets and of the second pair of permanent magnets adjacent to each other are a single common permanent magnet, the number of parts can be reduced. Accordingly, manufacturing cost including attaching the permanent magnets can be reduced.

According to another liner actuator of the present invention, because the magnetic gap is provided in the stator at a position adjacent to a middle point of the common permanent magnet in the direction of reciprocation, even when the single common permanent magnet is used, the formation of magnetic fluxes through the stator and the iron member via the first pair of permanent magnets and the formation of magnetic fluxes through the stator and the iron member via the second pair of permanent magnets are ensured.

According to another liner actuator of the present invention, because the iron member includes a pair of projecting portions which project toward the permanent magnets, and which are arranged side by side in the direction of reciprocation, attracting force can be efficiently applied to the end faces of the projection portions during both movements in the reciprocation.

According to the liner actuator of the fifth aspect of the present invention, because the magnetic reluctance section acts as a magnetic reluctance against magnetic flux loops that are generated by the magnetic force of the permanent magnet and run through the stator, the permanent magnet, and the pair of magnetic pole elements, the number of magnetic fluxes that are generated by the permanent magnet and run through the magnetic pole elements and the iron member can be increased. Accordingly, magnetic flux generated by a permanent magnet can be efficiently used for moving a movable element, and sufficient and stable thrust force can be applied to the movable element.

According to another liner actuator of the present invention, because the magnetic reluctance section is a magnetic gap formed between the magnetic pole elements and the stator, a magnetic reluctance can be applied, with a simple structure, to the magnetic flux loops that are generated by the magnetic force of the permanent magnet and run through the stator, the permanent magnet, and the pair of magnetic pole elements.

According to another liner actuator of the present invention, because the magnetic reluctance section is a concave portion formed in the magnetic pole elements at a position near the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator. Accordingly, the magnetic pole elements can be firmly fixed to the stator, and endurance thereof is improved.

According to another liner actuator of the present invention, because the magnetic reluctance section is a hole formed in the magnetic pole elements at a position near the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator. Accordingly, the magnetic pole elements can be firmly fixed to the stator, and endurance thereof is improved.

According to another liner actuator of the present invention, because the magnetic reluctance section is formed by making the magnetic pole elements thinner as the magnetic pole elements extend toward the stator, a magnetic reluctance can be applied to the magnetic flux loops that are generated by the magnetic force of the permanent magnet and run through the stator, the permanent magnet, and the pair of magnetic pole elements while directly fixing the magnetic pole elements to the stator. Accordingly, the magnetic pole elements can be firmly fixed to the stator, and endurance thereof is improved.

According to another liner actuator of the present invention, because plural sets of the pair of magnetic pole elements arranged in the direction of reciprocation are fixed to the stator, and plural iron members arranged in the direction of reciprocation are fixed to the movable element, a greater thrust can be applied to the movable element.

The invention claimed is:

1. A linear actuator comprising:
   a stator;
   a movable element having a cylindrical iron member which reciprocates with respect to the stator;
   a permanent magnet fixed to the stator opposed to the iron member;
   a coil fixed to the stator; and
   a first magnetic pole element on the stator facing the permanent magnet from a position which is radially inside of the iron member wherein the permanent magnet is fixed to the stator in such a manner that magnetic poles thereof are arranged side by side in a direction of reciprocation, and a pair of second magnetic pole elements is provided at both sides of the permanent magnet in the direction of reciprocation.

2. A linear actuator according to claim 1, wherein a set of the permanent magnet and the pair of second magnetic pole elements is disposed at only one side of the iron member.

3. A linear actuator according to claim 2, wherein the set of the permanent magnet and the pair of magnetic second pole elements is disposed only radially outside the iron member.

4. A linear actuator according to claim 2, wherein the iron member has a cylindrical shape, and a set of the permanent magnet and the pair of magnetic pole elements is disposed only radially inside the iron member.

5. A linear actuator according to claim 1, wherein two sets of the permanent magnet and the pair of magnetic pole elements are disposed at both sides of the iron member.

6. A linear actuator according to claim 1, wherein the first magnetic pole element is integrally formed in the stator.

7. A linear actuator according to claim 1, wherein the movable element is formed using a synthetic resin insert formation method in which the iron member is used as an insert.

8. A linear actuator according to claim 1, wherein the movable element is supported on the stator by a bushing.

9. A linear actuator according to claim 1, wherein plural permanent magnets arranged in the direction of reciprocation are fixed to the stator, and plural iron members arranged in the direction of reciprocation are fixed to the movable element.

10. A linear actuator according to claim 1, wherein the stator comprises a sintered element.

* * * * *